US007349934B2

(12) United States Patent
Bosshart

(10) Patent No.: US 7,349,934 B2
(45) Date of Patent: Mar. 25, 2008

(54) PROCESSOR SYSTEM AND METHOD WITH COMBINED DATA LEFT AND RIGHT SHIFT OPERATION

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 891 days.

(21) Appl. No.: 10/326,704

(22) Filed: Dec. 20, 2002

(65) Prior Publication Data

US 2004/0123080 A1 Jun. 24, 2004

(51) Int. Cl.
*G06F 15/00* (2006.01)

(52) U.S. Cl. .................................................. 708/209

(58) Field of Classification Search ......... 708/200–209
See application file for complete search history.

(56) References Cited

U.S. PATENT DOCUMENTS

| | | | | |
|---|---|---|---|---|
| 3,747,070 | A * | 7/1973 | Huttenhoff | 708/209 |
| 3,790,960 | A * | 2/1974 | Amdahl et al. | 708/209 |
| 4,396,994 | A * | 8/1983 | Kang et al. | 708/209 |
| 4,583,197 | A * | 4/1986 | Chappell et al. | 708/209 |
| 5,155,698 | A * | 10/1992 | Niimi | 708/209 |
| 5,918,042 | A * | 6/1999 | Furber | 708/233 |
| 6,061,783 | A | 5/2000 | Harriman | |
| 6,263,423 | B1 | 7/2001 | Coon et al. | |
| 6,430,251 | B1 * | 8/2002 | Gold | 708/210 |
| 6,622,242 | B1 * | 9/2003 | Steele, Jr. | 708/209 |
| 6,675,182 | B1 * | 1/2004 | Hofstee et al. | 708/209 |
| 6,877,019 | B2 * | 4/2005 | Bandy et al. | 708/209 |
| 2006/0026223 | A1 * | 2/2006 | Dhong et al. | 708/209 |

OTHER PUBLICATIONS

Ching Yih Tseng, et al.; *A Systolic Power-of-Two Muliplier Structure*, IEEE 1989, ISCAS '89, CH2692-2/89/0000-0146, pp. 146-149.

Z. Hu, et al.; *Implementation of One Bit Delay 2-D IIR Digital Filters*, IEEE Int'l Symp. On Circuits & Systems, ISCAS '96, vol. 2, 1996, pp. 489-492.

Cash, et al.; *N/Chip Cascadable Shift Register With Parity Predictor*, IP Com Journal, Sep. 1, 1997, entire document.

* cited by examiner

*Primary Examiner*—Chat C. Do
(74) *Attorney, Agent, or Firm*—Alan K. Stewart; W. James Brady; Frederick J. Telecky, Jr.

(57) ABSTRACT

An integrated circuit device (100) includes circuitry for providing a first shift argument (L[4:0]) indicating shift positions in a first direction and circuitry for providing a second shift argument (R[4:0]) indicating shift positions in a second direction. One rotate stage (ROTATE STAGE 1), in a plurality of rotate stages, is coupled to receive the initial data argument. Each rotate stage, other than the one rotate stage, is coupled to receive a data argument from an output of another one of the rotate stages. Further, each rotate stage is operable to rotate the data argument input into the corresponding rotate stage in response to less than all bits of at least one of the first and second shift arguments. At least one rotate stage is operable to rotate the data argument input into the corresponding rotate stage in response to a sum of respective bit positions of the first and second shift arguments.

31 Claims, 29 Drawing Sheets

FIG. 4
(L=6=00110, LX=11001)

| INPUT | OUTPUT |
|---|---|
| D31 | D0 |
| D30 | D31 |
| D29 | D30 |
| D28 | D29 |
| D27 | D28 |
| D26 | D27 |
| D25 | D26 |
| D24 | D25 |
| D23 | D24 |
| D22 | D23 |
| D21 | D22 |
| D20 | D21 |
| D19 | D20 |
| D18 | D19 |
| D17 | D18 |
| D16 | D17 |
| D15 | D16 |
| D14 | D15 |
| D13 | D14 |
| D12 | D13 |
| D11 | D12 |
| D10 | D11 |
| D9 | D10 |
| D8 | D9 |
| D7 | D8 |
| D6 | D7 |
| D5 | D6 |
| D4 | D5 |
| D3 | D4 |
| D2 | D3 |
| D1 | D2 |
| D0 | D1 |

RIGHT=1

FIG. 5
(R=10=01010)

| INPUT | OUTPUT |
|---|---|
| D0 | D1 |
| D31 | D0 |
| D30 | D31 |
| D29 | D30 |
| D28 | D29 |
| D27 | D28 |
| D26 | D27 |
| D25 | D26 |
| D24 | D25 |
| D23 | D24 |
| D22 | D23 |
| D21 | D22 |
| D20 | D21 |
| D19 | D20 |
| D18 | D19 |
| D17 | D18 |
| D16 | D17 |
| D15 | D16 |
| D14 | D15 |
| D13 | D14 |
| D12 | D13 |
| D11 | D12 |
| D10 | D11 |
| D9 | D10 |
| D8 | D9 |
| D7 | D8 |
| D6 | D7 |
| D5 | D6 |
| D4 | D5 |
| D3 | D4 |
| D2 | D3 |
| D1 | D2 |

RIGHT=1

FIG. 6
(LX[2:1]+R[2:1]=01)

| INPUT | OUTPUT |
|---|---|
| D1 | D3 |
| D0 | D2 |
| D31 | D1 |
| D30 | D0 |
| D29 | D31 |
| D28 | D30 |
| D27 | D29 |
| D26 | D28 |
| D25 | D27 |
| D24 | D26 |
| D23 | D25 |
| D22 | D24 |
| D21 | D23 |
| D20 | D22 |
| D19 | D21 |
| D18 | D20 |
| D17 | D19 |
| D16 | D18 |
| D15 | D17 |
| D14 | D16 |
| D13 | D15 |
| D12 | D14 |
| D11 | D13 |
| D10 | D12 |
| D9 | D11 |
| D8 | D10 |
| D7 | D9 |
| D6 | D8 |
| D5 | D7 |
| D4 | D6 |
| D3 | D5 |
| D2 | D4 |

RIGHT=2

FIG. 7
(LX[4:3]+R[4:3]=00)

| INPUT | OUTPUT |
|---|---|
| D3 | D3 |
| D2 | D2 |
| D1 | D1 |
| D0 | D0 |
| D31 | D31 |
| D30 | D30 |
| D29 | D29 |
| D28 | D28 |
| D27 | D27 |
| D26 | D26 |
| D25 | D25 |
| D24 | D24 |
| D23 | D23 |
| D22 | D22 |
| D21 | D21 |
| D20 | D20 |
| D19 | D19 |
| D18 | D18 |
| D17 | D17 |
| D16 | D16 |
| D15 | D15 |
| D14 | D14 |
| D13 | D13 |
| D12 | D12 |
| D11 | D11 |
| D10 | D10 |
| D9 | D9 |
| D8 | D8 |
| D7 | D7 |
| D6 | D6 |
| D5 | D5 |
| D4 | D4 |

RIGHT=0

FIG. 8
(L=16=10000; LX=00001)

| INPUT | OUTPUT |
|---|---|
| D31 | D0 |
| D30 | D31 |
| D29 | D30 |
| D28 | D29 |
| D27 | D28 |
| D26 | D27 |
| D25 | D26 |
| D24 | D25 |
| D23 | D24 |
| D22 | D23 |
| D21 | D22 |
| D20 | D21 |
| D19 | D20 |
| D18 | D19 |
| D17 | D18 |
| D16 | D17 |
| D15 | D16 |
| D14 | D15 |
| D13 | D14 |
| D12 | D13 |
| D11 | D12 |
| D10 | D11 |
| D9 | D10 |
| D8 | D9 |
| D7 | D8 |
| D6 | D7 |
| D5 | D6 |
| D4 | D5 |
| D3 | D4 |
| D2 | D3 |
| D1 | D2 |
| D0 | D1 |

RIGHT=1

FIG. 9
(R=8=01000)

| INPUT | OUTPUT |
|---|---|
| D0 | D1 |
| D31 | D0 |
| D30 | D31 |
| D29 | D30 |
| D28 | D29 |
| D27 | D28 |
| D26 | D27 |
| D25 | D26 |
| D24 | D25 |
| D23 | D24 |
| D22 | D23 |
| D21 | D22 |
| D20 | D21 |
| D19 | D20 |
| D18 | D19 |
| D17 | D18 |
| D16 | D17 |
| D15 | D16 |
| D14 | D15 |
| D13 | D14 |
| D12 | D13 |
| D11 | D12 |
| D10 | D11 |
| D9 | D10 |
| D8 | D9 |
| D7 | D8 |
| D6 | D7 |
| D5 | D6 |
| D4 | D5 |
| D3 | D4 |
| D2 | D3 |
| D1 | D2 |

RIGHT=1

FIG. 10
(LX[2:1]+R[2:1]=11)

| INPUT | OUTPUT |
|---|---|
| D1 | D7 |
| D0 | D6 |
| D31 | D5 |
| D30 | D4 |
| D29 | D3 |
| D28 | D2 |
| D27 | D1 |
| D26 | D0 |
| D25 | D31 |
| D24 | D30 |
| D23 | D29 |
| D22 | D28 |
| D21 | D27 |
| D20 | D26 |
| D19 | D25 |
| D18 | D24 |
| D17 | D23 |
| D16 | D22 |
| D15 | D21 |
| D14 | D20 |
| D13 | D19 |
| D12 | D18 |
| D11 | D17 |
| D10 | D16 |
| D9 | D15 |
| D8 | D14 |
| D7 | D13 |
| D6 | D12 |
| D5 | D11 |
| D4 | D10 |
| D3 | D9 |
| D2 | D8 |

RIGHT=6

FIG. 11
(LX[4:3]+R[4:3]=10)

| INPUT | OUTPUT |
|---|---|
| D7 | D23 |
| D6 | D22 |
| D5 | D21 |
| D4 | D20 |
| D3 | D19 |
| D2 | D18 |
| D1 | D17 |
| D0 | D16 |
| D31 | D15 |
| D30 | D14 |
| D29 | D13 |
| D28 | D12 |
| D27 | D11 |
| D26 | D10 |
| D25 | D9 |
| D24 | D8 |
| D23 | D7 |
| D22 | D6 |
| D21 | D5 |
| D20 | D4 |
| D19 | D3 |
| D18 | D2 |
| D17 | D1 |
| D16 | D0 |
| D15 | D31 |
| D14 | D30 |
| D13 | D29 |
| D12 | D28 |
| D11 | D27 |
| D10 | D26 |
| D9 | D25 |
| D8 | D24 |

RIGHT=16

(L=16)

| $V_{PRE4}$ | $TC_1$ | $TC_2$ | $MK_4$ | $V_{EXEC\_S/C}$ |
|---|---|---|---|---|
| D31 | 1 | 0 | 0 | D31 |
| D30 | 1 | 0 | 0 | D30 |
| D29 | 1 | 0 | 0 | D29 |
| D28 | 1 | 0 | 0 | D28 |
| D27 | 1 | 0 | 0 | D27 |
| D26 | 1 | 0 | 0 | D26 |
| D25 | 1 | 0 | 0 | D25 |
| D24 | 1 | 0 | 0 | D24 |
| D23 | 1 | 0 | 0 | D23 |
| D22 | 1 | 0 | 0 | D22 |
| R=21 → D21 | 1 | 1 | 1 | S/C |
| D20 | 1 | 1 | 1 | S/C |
| D19 | 1 | 1 | 1 | S/C |
| D18 | 1 | 1 | 1 | S/C — BL₁ |
| D17 | 1 | 1 | 1 | S/C |
| D16 | 1 | 1 | 1 | S/C |
| D15 | 1 | 1 | 1 | S/C |
| L=14 → D14 | 1 | 1 | 1 | S/C |
| D13 | 0 | 1 | 0 | D13 |
| D12 | 0 | 1 | 0 | D12 |
| D11 | 0 | 1 | 0 | D11 |
| D10 | 0 | 1 | 0 | D10 |
| D9 | 0 | 1 | 0 | D9 |
| D8 | 0 | 1 | 0 | D8 |
| D7 | 0 | 1 | 0 | D7 |
| D6 | 0 | 1 | 0 | D6 |
| D5 | 0 | 1 | 0 | D5 |
| D4 | 0 | 1 | 0 | D4 |
| D3 | 0 | 1 | 0 | D3 |
| D2 | 0 | 1 | 0 | D2 |
| D1 | 0 | 1 | 0 | D1 |
| D0 | 0 | 1 | 0 | D0 |

*FIG. 31*

PROCESSOR SYSTEM AND METHOD WITH COMBINED DATA LEFT AND RIGHT SHIFT OPERATION

CROSS-REFERENCES TO RELATED APPLICATIONS

This application is related to U.S. patent application Ser. No. 10/326,515, entitled Processor System With Efficient Shift Operations Including Extract Operation, and filed on the same date as the present application.

STATEMENT REGARDING FEDERALLY SPONSORED RESEARCH OR DEVELOPMENT

Not Applicable.

BACKGROUND OF THE INVENTION

The present embodiments relate to electronic processors such as microprocessors or digital signal processors ("DSPs"), and are more particularly directed to providing such a processor operable in response to an instruction to efficiently shift a data argument in response to respective left and right shift count indicators.

Electronic processors including microprocessors and DSPs have become prevalent in numerous applications, including uses for devices in personal, business, and other environments. Demands of the marketplace affect many aspects of processor design, including factors such as device power consumption and speed. As a result, constant evaluation is performed by processor designers in an effort to provide improvements in these and other factors. The present embodiments also endeavor toward this end.

The present embodiments are directed to providing an improved processor functional unit for purposes of rotating a data argument. Rotation of a data argument is intended to cover the instance where data is to be shifted twice, once in a first direction and then thereafter in an opposite direction. Thus, two possibilities exist, namely, a right shift followed by a left shift or a left shift followed by a right shift. Two such successive shifts may be required in various instances, where by way of example the present commercially available DSPs sold by Texas Instruments Incorporated under the TMS320C6xxx family include an EXTRACT instruction in the DSP instruction set, and that instruction calls for two successive and opposite-direction shifts. The use of such operations is typically beneficial to manipulate or isolate a portion of data within a data word, where the word in contemporary processors is often a 32-bit data argument. Further, these two shifts can be used with additional operations, such as arithmetic or logical operations with another data argument, in order to achieve an intended result. In any event, in previous processors, such operations required either the use of two successive shift instructions, or the use of the EXTRACT instruction, with either approach being executed in the processor by performing a complete shift in one direction followed by another complete shift in the opposite direction. In this regard, either two independent operations are expended, one for each shift, or the two shifts might be executed simultaneously, thereby requiring however the complexity of two different 32-bit shifters (i.e., one for each of the two shifts). Additional delay and/or additional complexity, such as that required by these prior art approaches, are considered drawbacks in contemporary processor design.

In view of the above, there arises a need to address the drawbacks of the prior art, as is achieved by the preferred embodiments described below.

BRIEF SUMMARY OF THE INVENTION

In the preferred embodiment, there is an integrated circuit device, comprising an input for receiving an initial data argument comprising a plurality of bits. The device also includes circuitry for providing a first shift argument indicating a number of shift positions in a first direction, the first shift argument comprising a plurality of bits, and circuitry for providing a second shift argument indicating a number of shift positions in a second direction, the second shift argument comprising a plurality of bits. The device also includes a plurality of rotate stages, each comprising an input and an output. One rotate stage in the plurality of rotate stages, is coupled to receive the initial data argument. Each rotate stage, in the plurality of rotate stages, other than the one rotate stage, is coupled to receive a data argument from an output of another one of the rotate stages in the plurality of rotate stages. Further, each rotate stage, in the plurality of rotate stages, is operable to rotate the data argument input into the corresponding rotate stage in response to less than all bits of at least one of the first and second shift arguments. Lastly, at least one rotate stage, in the plurality of rotate stages, is operable to rotate the data argument input into the corresponding rotate stage in response to a sum of respective bit positions of the first and second shift arguments.

Other aspects are also disclosed and claimed.

BRIEF DESCRIPTION OF THE SEVERAL VIEWS OF THE DRAWING

FIG. 4 illustrates the same 32-bit data argument D[31:0] from FIG. 1, where this data argument is shown to the left of FIG. 4 as input to ROTATE STAGE 1, and the data argument to the right of FIG. 4 is the output from the ROTATE STAGE 1.

FIG. 5 illustrates to its left the 32-bit data argument D[31:0] received by ROTATE STAGE 2 from ROTATE STAGE 1, and the argument to the right of FIG. 5 is the output from the ROTATE STAGE 2.

FIG. 6 illustrates the ROTATE STAGE 3 operation for the shift arguments in the example of FIG. 1, that is, where L equals decimal 6 and R equals decimal 10.

FIG. 7 illustrates the ROTATE STAGE 4 operation for the shift arguments in the example of FIG. 1, where L equals decimal 6 and R equals decimal 10.

FIG. 8 illustrates the operation of ROTATE STAGE 1 to rotate its input right 1 bit position in response to the FIG. 2 example where L=16 and R=8.

FIG. 9 illustrates the operation of ROTATE STAGE 2 to rotate its input right 2 bit positions in response to the FIG. 2 example where L=16 and R=8.

FIG. 10 illustrates the operation of ROTATE STAGE 3 to rotate its input right 6 bit positions in response to the FIG. 2 example where L=16 and R=8.

FIG. 11 illustrates the operation of ROTATE STAGE 4 to rotate its input right 16 bit positions in response to the FIG. 2 example where L=16 and R=8.

FIG. 31 illustrates an example of the operation of the system of FIG. 29, with additional illustrations of various codes and masks.

DETAILED DESCRIPTION OF THE INVENTION

Figure 1:
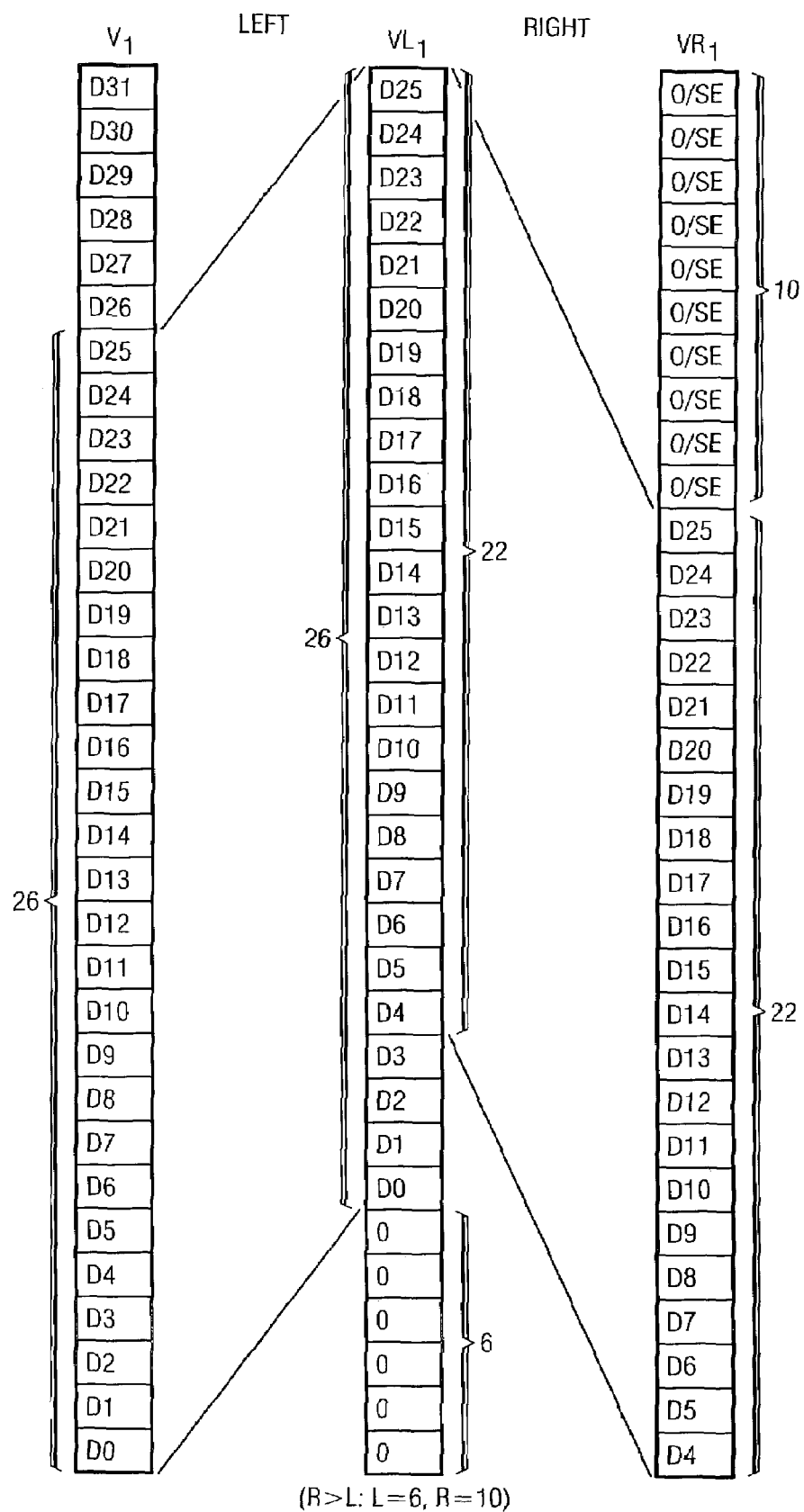
FIG. 1 illustrates a 32-bit data value $V_1$, and to demonstrate a shift example the shift arguments are R=10 and L=6 such that right shift R is greater than the left shift L.
Figure 2:
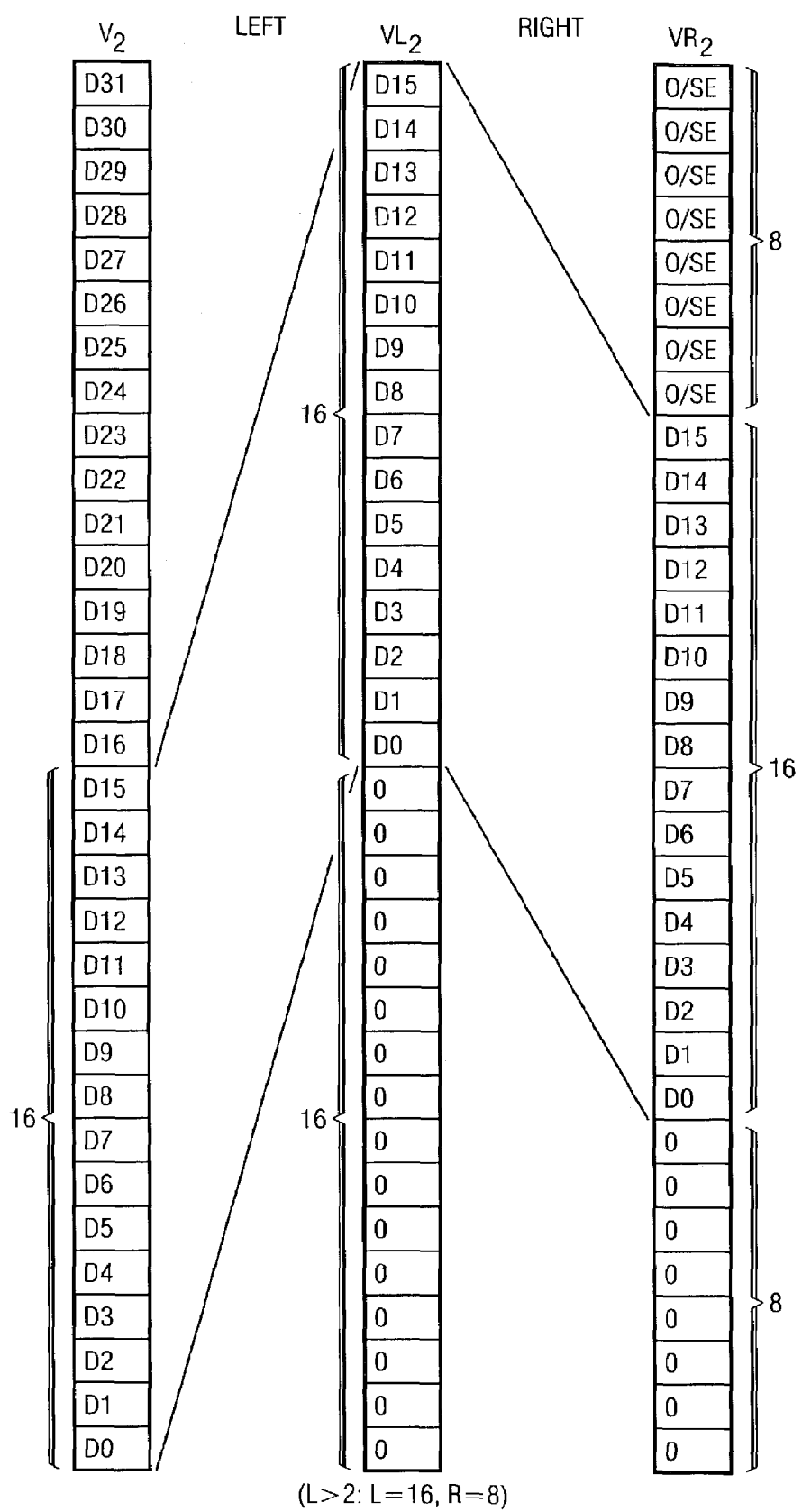
FIG. 2 illustrates a 32-bit data value $V_2$, and to demonstrate a shift example the shift arguments are R=8 and L=16 such that right shift R is less than the left shift L.

By way of introduction to the preferred embodiment processor and its operability to shift a data argument in response to separate left and right shift count indicators, FIGS. 1 and 2 illustrate respective examples of shifting operations with respect to 32-bit data. Each example indicates a left shift in an amount L followed by a right shift in an amount R, and as mentioned earlier in the Background Of The Invention section of this document, such operations are performed in the prior art using two separate shift units or two independent shift operations.

FIG. 1 illustrates a 32-bit data value $V_1$, where for sake of example its bits are designated D31 through D0. In the example of FIG. 1, R=10 and L=6 and, thus, the right shift R is greater than the left shift L. The left shift is first performed, during which the 32-bit value $V_1$ is shifted left 6 bit positions, thereby discarding bits D26 through D31 with the left shift and causing the shifted value $VL_1$ to begin with and include the remaining 26 bits of the 32 bits of $V_1$; further, the remaining 6 least significant bits ("LSBs") of $VL_1$ are filled with zeros. The right shift is next performed, during which the 32-bit value $VL_1$ is right shifted 10 bit positions, thereby filling the 10 most significant bits ("MSBs") of the right shifted value, $VR_1$, with zeros; alternatively, these bits may each be a sign extension bit, as abbreviated in FIG. 1 as "SE." Following the 10 shifted in zeros (or sign extension bits), and thereby completing the 32-bit value $VR_1$, is the 22 most significant bits from value $VL_1$, that is, bits D25 through D4.

FIG. 2 illustrates a 32-bit data value $V_2$, using the FIG. 1 convention of D31 through D0 for its data bits. In the example of FIG. 2, R=8 and L=16 and, thus, the left shift L is greater than the right shift R. The left shift is first performed, during which the 32-bit value $V_2$ is shifted left 16 bit positions, thereby discarding bits D31 through D16 so that the left shifted value $VL_2$ begins with and includes the remaining 16 bits of the 32 bits of $V_2$, and the remaining 8 LSBs are filled with zeros. The right shift is next performed, during which the 32-bit value $VL_2$ is right shifted 8 bit positions, thereby filling the 8 MSBs of the right shifted value, $VR_2$, with zeros (or alternatively, sign extension bits). Following the 8 shifted-in zeros (or sign extension bits), and thereby completing the 32-bit value $VR_2$, is the 24 MSBs from value $VR_1$; however, of those 24 bits, only the 16 data bits D15 through D0 remain from the original value $V_2$, where the remaining 8 LSBs are values of zero.

Figure 3:
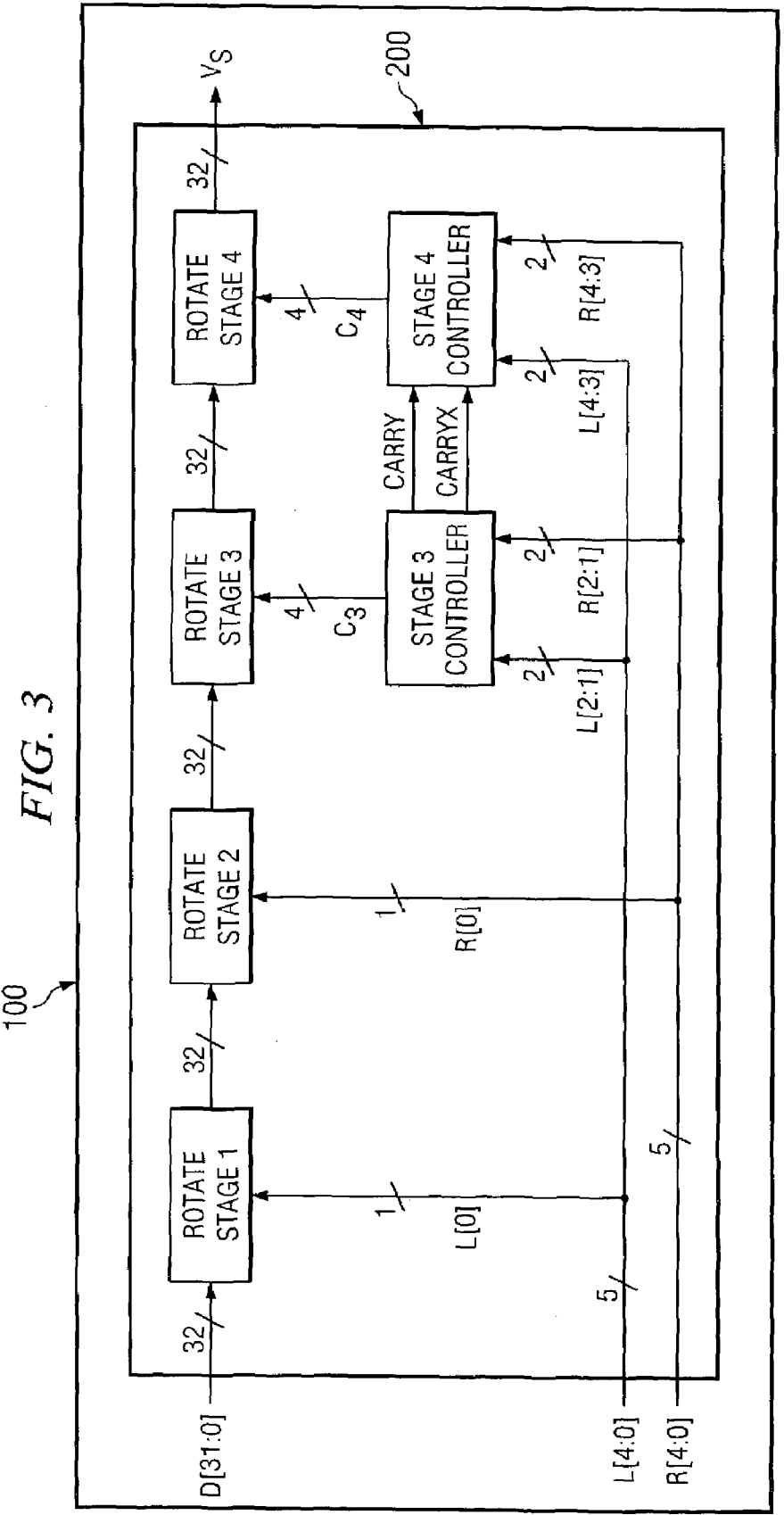
FIG. 3 illustrates a block diagram of a processor according to one preferred embodiment and including a data rotate unit.

FIG. 3 illustrates a block diagram of a processor 100, where processor 100 may be a microprocessor or DSP or still other computing integrated circuit. Processor 100 includes numerous aspects known in the art and, to focus on aspects of the preferred embodiment, such known aspects are neither shown nor described. Generally, however, one skilled in the art will recognize that processor 100 will include one or more functional units, where each such functional unit typically includes some type of sub-division of functionality and may be referred to herein as a subunit. As known in the art, processor 100 has an associated instruction set, and each sub-unit operates to perform data operations with respect to one or more data arguments according to any one of the instructions in that instruction set. Such sub-units may be, by way of example, an arithmetic logic unit ("ALU"), a logical operator block that is operable to perform various logical operations, such as are known in the art to include by ways of example logical AND, OR, and so forth, as well as others. Further with reference to the sub-unit functionality, FIG. 3 illustrates a specific sub-unit 200 that is directed to the left/right shifting introduced above, where sub-unit 200 may exist separately from other sub-units or may be combined with the functionality of one of those sub-units. Thus, sub-unit 200 may be considered to be a part of a shifter unit. The specific terminology is not critical, where one skilled in the art will appreciate from the remainder of this document that sub-unit 200 performs what will be referred to as a rotation operation with respect to both the left and right shift arguments and, thus, sub-unit 200 may be considered a data rotate unit 200.

Additional introduction is now provided with respect to the name "data rotate unit" in that the unit rotates a 32-bit data input in response to a left and right shift argument L and R, respectively. To further understand this aspect, attention is returned to FIGS. 1 and 2, so the individual shift operations therein can be combined into rotate operations. For example, with reference to FIG. 1, recall it illustrates first a left shift of L=6 followed by a right shift of R=10. In a sense, therefore, the final result in value $VR_1$ reflects a net shift, or a rotation, of R−L=10−6=4, that is, a shift to the right of 4 data bits, as shown in that the value $VR_1$ does not include the 4 data bits, D3, D2, D1 and D0 of $V_1$. Further, the first data bit, D25, in the final value $VR_1$, as retained from the original value of $V_1$, is the most significant bit retained following the left shift of 6 bits (which thereby discards bits D31 through D28). As another example, with reference to FIG. 2, recall it illustrates first a left shift of L=16 followed by a right shift of R=8. In a comparable sense to the FIG. 1 example, therefore, the final result in value $VR_2$ reflects a net shift, or a rotation, of R−L=8−16=−8, where the negative indication in this result indicates a net shift to the left, and the shift is of the difference of 8 data bits; further, the first data bit, D15, in the final value, $VR_2$, as retained from the original value, $V_2$, is the most significant bit retained following the left shift of 16 bits. Given these two examples, one skilled in the art should appreciate that the left shift followed by the right shift provides, in effect a rotation of the original value $V_x$, where other circuitry, if needed, will insert the most significant bit zeros (or sign extensions) and the lest significant bit values of zero.

Having demonstrated the rotation functionality of two opposite direction shifts, the preferred embodiments achieve such functionality without two separate shifters or two independent and complete shifts which require that the data argument is fully shifted in one direction followed by next shifting it in the opposite direction. Instead, in one embodiment, such approach may be implemented by providing a control circuit sufficient to determine R−L and to rotate the values accordingly (with sufficient additional most significant bit zeros or sign extensions when appropriate). However, such an approach may be unduly complex and give rise to considerable delay. Therefore, various preferred embodiments implement data rotate unit 200 in view of the notion of the R−L function, but in a way that first expresses that function in a different manner and that also breaks down the function based on subsets of the bits in the data shift arguments R and L. These aspects are further explored in the remainder of this document.

In the preferred embodiment, it is recognized that the net shift of R−L as described above is equally realized as in the following Equation 1:

$$R-L=R+LX+1 \qquad \text{Equation 1}$$

In Equation 1, the "X" indication following a variable, as used throughout this document, is an indication of the inverted signal; thus, in this example, LX is the logical inverse (i.e., binary complement) of L. Further, the Equation 1 principle by itself is known in the art of data shifting, that is, that a rotation of R−L equals a rotation of R+LX+1. To further appreciate this principle, consider it as applied to the examples of FIGS. 1 and 2. With reference to FIG. 1, where L=6 and R=10, then R−L=10−6=4. In a 5-bit binary representation, R=01010, L=00110, and LX=11001, then R+LX+1=00100 (ignoring a sixth bit carry), which equals decimal 4; thus, both R−L and R+LX+1=4. With reference now to FIG. 2, where L=16 and R=8, then R−L=8−16=8, thereby indicating a left shift of 8. In a 5-bit binary representation, R=01000, L=10000, and LX=01111, then the R+LX+1=11000, which equals decimal 24. Note in this case, therefore, that R−L indicates a left shift, as indicated by the negative result, while R+LX+1 indicates a right shift, as indicated by the positive result. However, for a 32-bit quantity, which is the data argument at issue, a left rotation of 8 bit positions is equivalent to a right rotation of 24 bit positions. Thus, for shifting purposes, once more a rotation of R−L equals a rotation of R+LX+1.

Returning now to FIG. 3 and the preferred embodiment data rotate unit 200, it includes various ROTATE STAGEs and connections to determine the value R+LX+1 with respect to a 32-bit data argument D[31:0], where R and L are both 5-bit shift argument values shown as L[4:0] and R[4:0]. Each of these three arguments may be provided from various locations within processor 100, such as in response to an instruction and as loaded from a register, register file, memory, or the like. Each ROTATE STAGE represents a group of 32 multiplexers that is connected to either pass the 32-bit input straight through, or to right rotate it a number of locations, that is, to shift the input to the right such that any bits shifted out of one end of the stage wrap around to an input of the other end of the stages. Further, the amount of rotation for each stage differs for certain of the various stages as detailed later. Turning now to the specific connections, the data argument D[31:0] is connected to a ROTATE STAGE 1 that is connected to receive the LSB, L[0], of the left shift argument. In the preferred embodiment, it is presumed that the inverse of each shift argument is also available, or one skilled in the art may readily implement sufficient circuitry to provide such inverses, and in any event therefore and as detailed later each stage that receives a shift argument is further connected to receive the inverse of that argument. Thus, the ROTATE STAGE 1, while not explicitly illustrated due to the above-stated assumption, also receives or has access to the inverse of L[0], referred to hereafter as LX[0]. The 32-bit output of the ROTATE STAGE 1 is connected as an input to a ROTATE STAGE 2. The ROTATE STAGE 2 is connected to receive the least significant bit, R[0], of the right shift argument and, thus, as stated above, it is also preferably connected to receive its inverse, RX[0]. Thus, given the connections described thus far, note that the 5-bit shift argument values L and R are connected such that the least significant bit of each provides a control to the ROTATE STAGE 1 or the ROTATE STAGE 2. As detailed later, each of these STAGEs is operable to right rotate its 32-bit input in response to the value of the single bit portion of the shift argument that is also input to the respective STAGE.

Continuing with FIG. 3 and data rotate unit 200, the 32-bit output of ROTATE STAGE 2 is connected as an input to ROTATE STAGE 3. ROTATE STAGE 3 also receives a 4 bit control signal, $C_3$, from a STAGE 3 CONTROLLER. The STAGE 3 CONTROLLER is connected to receive the second and third LSBs from each of the left and right shift arguments and, thus, these inputs are indicated in FIG. 3 as L[2:1] and R[2:1], respectively. STAGE 3 controller also outputs a CARRY signal, as well as its logical inverse, CARRYX. Both the CARRY and CARRYX signals are connected as inputs to a STAGE 4 CONTROLLER. The STAGE 4 CONTROLLER also receives the two MSBs from each of the left and right shift argument values and, thus, these inputs are indicated in FIG. 3 as L[4:3] and R[4:3], respectively. In response to these various inputs, the STAGE 4 CONTROLLER outputs a 4-bit control signal, $C_4$, to a ROTATE STAGE 4. Lastly, ROTATE STAGE 4 receives at an input the 32-bit output of STAGE 3, and as detailed later, in response to the control signal $C_4$, STAGE 4 is operable to shift this 32-bit input and provide a final 32-bit shifted output signal, $V_S$.

The operation of data rotate unit 200 is now discussed, and is further explored later at a device level after a discussion of the preferred embodiment functionality of the various blocks shown in FIG. 3. First, recall that each ROTATE STAGE represents a group of 32 multiplexers that is connected to either pass the 32-bit data input straight through, or to right rotate it a number of locations. The rotate resolution for each such group of multiplexers depends on the values of the shift arguments controlling the stage, as is now discussed. By way of introduction, this rotate resolution is as follows, with additional detail given to each stage's operation below. The right rotation, if any, of the ROTATE STAGE 1 is controlled solely by bit LX[0] of the left shift argument value (and its complement) and, therefore, it may shift one of two extents based on the value of LX[0]. The right rotation, if any, of the ROTATE STAGE 2 is controlled solely by bit R[0] of the right shift argument value (and its complement) and, therefore, it may shift one of two extents based on the value of R[0]. The right rotation, if any, of the ROTATE STAGE 3 is controlled by the sum of bits LX[2:1] and R[2:1] and, therefore, it may shift one of four extents based on the modulo 4 sum of LX[2:1] and R[2:1]. Lastly, the right shifting, if any, of STAGE 4 is controlled by the sum of bits LX[4:3] and R[4:3], as well as any carry that is generated from the control bits of STAGE 3; therefore, it may shift one of four extents based on the modulo 4 sum of LX[4:3] and R[4:3], plus an additional shift if a carry is provided. Each of these shifting operations is detailed separately, below.

Looking in detail to the ROTATE STAGE 1, recall it is controlled solely by bit LX[0]; thus, its rotating, if any, is independent of the right shift argument, R, and also of any of the more significant bits LX[4:1] of the left shift argument, L. The ROTATE STAGE 1 rotates the 32-bit data argument D[31:0] to the right one position if LX[0]=1, and no rotation (i.e., a rotation of 0 bit positions) is performed if LX[0]=0. To illustrate an example of the operation of the ROTATE STAGE 1, FIG. 4 illustrates the same 32-bit data argument D[31:0] from FIG. 1, where this data argument is shown to the left of FIG. 4 in the form as input to the ROTATE STAGE 1. Next, recalling the example of FIG. 1, then L=6; in a binary value, this decimal value of 6 equals 00110, and its complement is therefore LX=11001. Thus, in this example, LX[0]=1. Accordingly, FIG. 4 illustrates a right rotation of one bit position by the ROTATE STAGE 1, as shown by the output to the right of FIG. 4. As a result, bits D31 through D0 are right-rotated once and, thus, the bit D0 is shifted out of the right end of the sequence, with the out-shifted bit D0 wrapping around (i.e., rotated) to the left side of the sequence and, hence, preceding bit D31.

Looking in detail to the ROTATE STAGE 2, recall it is controlled solely by bit R[0]; thus, its rotation, if any, is independent of the left shift argument, L, and also of any of the more significant bits R[4:1] of the right shift argument, R. In response to R[0], the ROTATE STAGE 2 rotates its 32-bit data argument input to the right one position if R[0]=1, and no rotation is performed if R[0]=0. Recall further that the preferred embodiment also effects a rotation of the Equation 1 value of R+LX+1; thus, this equation includes an element of "+1", that is, a right rotation of one position in addition to the rotation of "R+LX." In one preferred embodiment, this additional increment is achieved in connection with the ROTATE STAGE 2. Thus, in combination with the value of R[0], the ultimate right rotation of the ROTATE STAGE 2 is such that it rotates its 32-bit data argument input to the right two bit positions if R[0]=1 (i.e., one bit position for the sum of one, and another bit position for the element "+1" in Equation 1), and it rotates its 32-bit data argument input to the right one bit position if R[0]=0 (i.e., only one bit position for the element "+1" in Equation 1). To continue with the example of the operation of the ROTATE STAGE 1 and FIG. 1 as now applied to the ROTATE STAGE 2, FIG. 5 illustrates to its left the 32-bit data argument D[31:0] received by the ROTATE STAGE 2 from the ROTATE STAGE 1. Next, continuing the example of FIG. 1, where R is a decimal value of 10, then FIG. 5 illustrates the rotation in response to that value. Specifically, in a binary value, the value of R equals 01010 to correspond to R equal to decimal 10. Thus, in this example, R[0]=0. Accordingly, the R[0] bit alone provides no right rotation, but the inclusion of a single increment in the ROTATE STAGE 2 to effect the value of "+1" from Equation 1 then causes the ROTATE STAGE 2, for the present example as shown in FIG. 5, to provide a right rotation by one bit position, as shown by the output to the right of FIG. 5. Accordingly, bits D31 through D0 are right-rotated once and, thus, the bit D1 is rotated out of the right end of the sequence, with the out-rotated bit D1 wrapping around (i.e., rotated) to the left side of the sequence and, hence, preceding bit D0.

Looking in detail to the ROTATE STAGE 3, recall it is controlled by the 4-bit control signal $C_3$ from STAGE 3 CONTROLLER, and the ROTATE STAGE 3 CONTROLLER receives the bits L[2:1] and R[2:1] (and their complements). In connection with accomplishing Equation 1, the ROTATE STAGE 3 CONTROLLER adds LX[2:1] and R[2:1] to form a two-bit sum, with any carry from the MSB location of that sum used to set an asserted state of CARRY to the STAGE 4 CONTROLLER. Thus, the various possibilities generated by the addition of LX[2:1] and R[2:1] are as shown in the following Table 1, along with the resulting state of CARRY and its complement, CARRYX.

TABLE 1

| LX[2:1]; R[2:1] | LX[2:1] + R[2:1] | CARRY | CARRYX |
|---|---|---|---|
| 00; 00 | 00 | 0 | 1 |
| 00; 01 | 01 | 0 | 1 |
| 00; 10 | 10 | 0 | 1 |
| 00; 11 | 11 | 0 | 1 |
| 01; 00 | 01 | 0 | 1 |
| 01; 01 | 10 | 0 | 1 |
| 01; 10 | 11 | 0 | 1 |
| 01; 11 | 11 | 1 | 0 |
| 10; 00 | 10 | 0 | 1 |
| 10; 01 | 11 | 0 | 1 |
| 10; 10 | 00 | 1 | 0 |
| 10; 11 | 01 | 1 | 0 |
| 11; 00 | 11 | 0 | 1 |
| 11; 01 | 00 | 1 | 0 |
| 11; 10 | 01 | 1 | 0 |
| 11; 11 | 10 | 1 | 0 |

In addition, the two bits of the sum generated by the STAGE 3 CONTROLLER determine the state of control signal $C_3$; specifically, the sum is decoded such that only one of the four bits in $C_3$ is asserted, with a different bit asserted for each of the four different sums provided by LX[2:1]+R[2:1]. Thus, a truth table for these four combinations is as shown in the following Table 2:

TABLE 2

| LX[2:1]; R[2:1] | LX[2:1] + R[2:1] | $C_3$ |
|---|---|---|
| 00; 00 | 00 | 0001 |
| 00; 01 | 01 | 0010 |
| 00; 10 | 10 | 0100 |
| 00; 11 | 11 | 1000 |
| 01; 00 | 01 | 0010 |
| 01; 01 | 10 | 0100 |
| 01; 10 | 11 | 1000 |
| 01; 11 | 00 | 0001 |
| 10; 00 | 10 | 0100 |
| 10; 01 | 11 | 1000 |
| 10; 10 | 00 | 0001 |
| 10; 11 | 01 | 0010 |
| 11; 00 | 11 | 1000 |
| 11; 01 | 00 | 0001 |
| 11; 10 | 01 | 0010 |
| 11; 11 | 10 | 0100 |

Lastly, because ROTATE STAGE 3 responds to the second and third least significant bit positions, note that each sum in Table 2 corresponds to a factor times two, that is, each sum 00, 01, 10, and 11 in a binary sense corresponds to a decimal value of 0, 2, 4, and 6, respectively. Accordingly, in response to the value of $C_3$, the ROTATE STAGE 3 rotates its 32-bit input data argument a bit position distance of either 0, 2, 4, or 6 bit positions, depending on the respective indication of $C_3$, and as shown in the following Table 3:

TABLE 3

| LX[2:1] + R[2:1] | $C_3$ | STAGE 3 rotation |
|---|---|---|
| 00 | 0001 | 0 positions |
| 01 | 0010 | 2 positions |
| 10 | 0100 | 4 positions |
| 11 | 1000 | 6 positions |

To further appreciate the preceding discussion of the operation of the ROTATE STAGE 3, FIG. 6 illustrates the ROTATE STAGE 3 operation for the shift arguments in the example of FIG. 1, that is, where L equals decimal 6 and R equals decimal 10, meaning in binary values L=00110 and R=01010, and LX=11001. Thus, the second and third least significant binary bit positions are LX[2:1]=00 and R[2:1]=01. From Table 1, therefore, the sum L[2:1]+R[2:1]=01 and CARRY=0. From Table 2, therefore, $C_3$=0010 and from Table 3, that value of $C_3$ gives rise to a right rotation of 2 bit positions. Accordingly, FIG. 6 illustrates, at its left side, the 32-bit data argument D[31:0] received as an input to the ROTATE STAGE 3 from the ROTATE STAGE 2, and to the right FIG. 6 illustrates the result after the right rotation of 2 bit positions. Accordingly, the bits are right-rotated twice and, thus, bits D3 and D2 are rotated out of the right end of the sequence, with the out-rotated bits D3 and D2 wrapping around to the left side of the sequence and, hence, preceding bit D1.

Looking in detail to ROTATE STAGE 4, recall it is controlled by the 4-bit control signal $C_4$ from the STAGE 4 CONTROLLER, and the STAGE 4 CONTROLLER receives both bits L[4:3] and R[4:3] (and their complements). In connection with accomplishing Equation 1, the STAGE 4 CONTROLLER adds LX[4:3] and R[4:3], and also accounts for any asserted CARRY from the STAGE 3 CONTROLLER, to form a two-bit sum. Mathematically the carry can be added to the sum of LX[4:3] and R[4:3], but as detailed later, in the preferred embodiment to increase speed the carry is instead provided to change the decoded value of $C_4$ that results solely from the sum of LX[4:3] and R[4:3]. Looking first to the sum of LX[4:3] and R[4:3], and temporarily not considering the CARRY from the STAGE 3 CONTROLLER, first note that any carry from the MSB location of that sum of LX[4:3] and R[4:3] may be disregarded, as it represents a set bit in the sixth bit position of a binary number, thereby corresponding to a shift of 32 positions; however, since the preferred embodiment is directed to a 32-bit data argument, then a shift of 32 positions simply would return the same value as the input, that is, the set-up is of a modulo 32 structure. Accordingly, there is no need to retain or respond to a carry bit in this sixth bit position. Thus, the two-bits of the sum generated by the STAGE 4 CONTROLLER determine the state of control signal $C_4$, where like the STAGE 3 CONTROLLER here again the sum is decoded such that only one of the four bits in $C_4$ is asserted, with a different bit asserted for each of the four different sums possible for LX[4:3]+R[4:3]. The table for these combinations is the same as that shown above in Table 2, but here as applied to the most significant bit positions (i.e., the fourth and fifth bits) of the shift arguments L and R. However, because the ROTATE STAGE 4 responds to the fourth and fifth significant bit positions, then each sum in Table 2, as applied to the ROTATE STAGE 4, corresponds to a factor times eight, that is, each sum 00, 01, 10, 11 in a binary sense corresponds to a decimal value of 0, 8, 16, and 24, respectively. Accordingly, in response to the value of $C_4$, the ROTATE STAGE 4 shifts its 32-bit input data argument a bit distance of either 0, 8, 16, or 24 positions, depending on the respective indication of $C_4$, and as shown in the following Table 4.1:

TABLE 4.1

| LX[4:3] + R[4:3] | $C_4$ | STAGE 4 rotation |
|---|---|---|
| 00 | 0001 | 0 positions |
| 01 | 0010 | 8 positions |
| 10 | 0100 | 16 positions |
| 11 | 1000 | 24 positions |

In addition to the rotation from Table 4.1, however, recall that the STAGE 4 CONTROLLER also responds to the CARRY that may be generated from the STAGE 3 CONTROLLER. If no such CARRY is generated for a given set of values of the left and right shift arguments, then the STAGE 4 rotation is as shown above in Table 4.1. However, if a CARRY is generated by the STAGE 3 CONTROLLER, then that carry is used to change the decoded value of $C_4$ so as to rotate its value one bit to the left in response to the CARRY, thereby accomplishing a same result that would be obtained if the CARRY were instead added by the STAGE 4 CONTROLLER into the sum of LX[4:3] and L[4:3]. Thus, the effect of the CARRY on the control signal $C_4$ is as shown in the following Table 4.2:

TABLE 4.2

| LX[4:3] + R[4:3] | $C_4$, with no CARRY | $C_4$, with CARRY |
|---|---|---|
| 00 | 0001 | 0010 |
| 01 | 0010 | 0100 |
| 10 | 0100 | 1000 |
| 11 | 1000 | 0001 |

To further appreciate the preceding discussion of the operation of the ROTATE STAGE 4, FIG. 7 illustrates the ROTATE STAGE 4 operation for the shift argument values in the example of FIG. 1, where L equals decimal 6 and R equals decimal 10 and the respective binary values are L=00110 and R=01010, and LX=11001. Thus, the fourth and fifth least significant binary bit positions are LX[2:1]=11 and R[2:1]=01. These two values provide a sum LX[4:3]+R[4:3]=00, and in this example no CARRY is provided by the STAGE 3 CONTROLLER. Thus, from Tables 4.1 and 4.2, then $C_4$=0001. Further, from Table 4.1, the value of $C_4$=0001 gives rise to a right rotation of 0 bit positions. Accordingly, FIG. 7 illustrates, at its left side, the 32-bit data argument D[31:0] received as an input to the ROTATE STAGE 4 from the ROTATE STAGE 3, and to the right FIG. 7 illustrates the result after the right rotation; however, in the present example, the right rotation is 0 bit positions and, thus, the output value is the same as the input.

From the preceding discussion of the operation of data rotate unit 200, one skilled in the art may appreciate that it achieves a result situated in the same bit positions as achieved by the two independent shifts described earlier in connection with the example of FIG. 1. By way of example, FIGS. 4 through 7 have shown the operation of the ROTATE STAGEs 1 through 4, respectively, for a case that is comparable to the example of FIG. 1 (i.e., L=6; R=10). Thus, by comparing the right shifted value, $VR_1$, from FIG. 1, with the resulting output of FIG. 7, one skilled in the art will recognize that the 22 data bits D4 through D25 from FIG. 1 are ultimately located in the same bit positions in the OUTPUT of FIG. 7. As an additional observation, however, note that the OUTPUT of FIG. 7 also includes preceding data bits (i.e., D3 through D0 followed by D31 through D26), whereas the right shifted value, $VR_1$, from FIG. 1 is preceded by zeros (or sign extensions). If desired, therefore, one skilled in the art may readily implement appropriate functionality to remove the preceding data bits, such as a masking function as may be implemented in various manners, including a logic mask that logically ANDs each preceding bit with a value of zero, or with other circuitry for properly sign extending such bits. Still other preferred embodiments are detailed later so as to further modify the FIG. 7 OUTPUT so as to provided the 10 zero or sign extension bits in the MSBs of the OUTPUT.

With FIGS. 4 through 7 having illustrated the operation of data rotate unit 200 for the example of FIG. 1 wherein R>L, the example of FIG. 2 wherein L>R also is readily performed by data rotate unit 200, as is now explored in connection with FIGS. 8 through 11. Given the previous example and accompanying details with respect to FIGS. 4 through 7, a more simplified discussion is provided with respect to FIGS. 8 through 11 since one skilled in the art should readily appreciate various comparable details as between the two examples.

In the example of FIG. 2, recall that L=16 and R=8 and, thus, in the operation of data rotate unit 200 the binary values are L=10000, LX=01111, and R=01000. These binary values and the responsive rotation of each ROTATE STAGE is now examined in connection with FIGS. 8 through 11. First, the ROTATE STAGE 1 rotates right one bit position, that is, there is one rotation right because LX[0]=1. This result is shown in FIG. 8, where the bits input to ROTATE STAGE 1 of D31 through D0 are rotated one bit position, thereby causing bit D0 to be out-shifted and wrapping around to precede bit D31. Next, the ROTATE STAGE 2 rotates right one bit position; here, R[0]=0, but recall that the ROTATE STAGE 2 also adds one right rotation due to the "+1" element of Equation 1, thereby giving rise to the right rotation of one bit position in the example of FIG. 9. Thus, as shown in FIG. 9, bits D0 and D31 through D1 are right rotated once, thereby causing bit D1 to be out-shifted and wrapping around to precede bit D30. Next, the ROTATE STAGE 3 rotates right six positions in response to LX[2:1]+R[2:1]=11+00=11. This result is shown in FIG. 10, where bits D1 and D0 and D31 through D2 are right rotated six bit positions, thereby causing bits D7 through D2 to be out-shifted and wrapping around to precede bit D1. Lastly, the ROTATE STAGE 4 rotates right sixteen positions in response to LX[4:3]+R[4:3]=01+01=10. This result is shown in FIG. 11, where bits D7 through D0 and D31 through D8 are right rotated sixteen positions, thereby causing bits D23 through D8 to be out-shifted and wrapping around to precede bit D7. Thus, by comparing the right shifted value, $VR_2$, from FIG. 2, with the resulting output of FIG. 11, one skilled in the art will recognize that the 16 data bits D15 through D30 from FIG. 2 are ultimately located in the same bit positions in the OUTPUT of FIG. 11. Further, the remaining bits, as was the case discussed above with respect to FIG. 7, may be masked or otherwise manipulated to become appropriate other values such as zeros or sign extension bits.

From the above, the preferred embodiments have been shown to achieve, with respect to a data argument that is 32 bits by way of example, a result that includes equivalent bit positioning as is achieved by two independent and opposite-directions shifts, where the extent of the shifts is dictated by respective shift arguments. Rather than separate shifts of the entire data argument, the preferred embodiment instead uses multiple rotate stages, where the distance of rotation of each stage is controlled in response to only a portion of at least one of the two shift arguments. In other words, each of the ROTATE STAGEs 1 and 2 rotates the data argument only with respect to a portion, namely, bit [0], of the L and R shift arguments, respectively. Further, the ROTATE STAGE 3 rotates the data argument only with respect to a portion, namely, bits [2:1] of both the L and R shift arguments. Lastly, the ROTATE STAGE 4 rotates the data argument only with respect to a portion, namely, bits [4:3] of both the L and R shift arguments, as well as in response to a carry bit from STAGE 3. As further appreciated below by the preferred embodiment schematics for implementing the various stages, this breaking down of the shift arguments into portions and controlling respective stages with such portions permits for considerably improved throughput in that the completed shifting (or rotating) operations may be achieved faster than two independent shift operations, each of which shifts the data argument fully in response to the entire respective shift argument.

Figure 12:
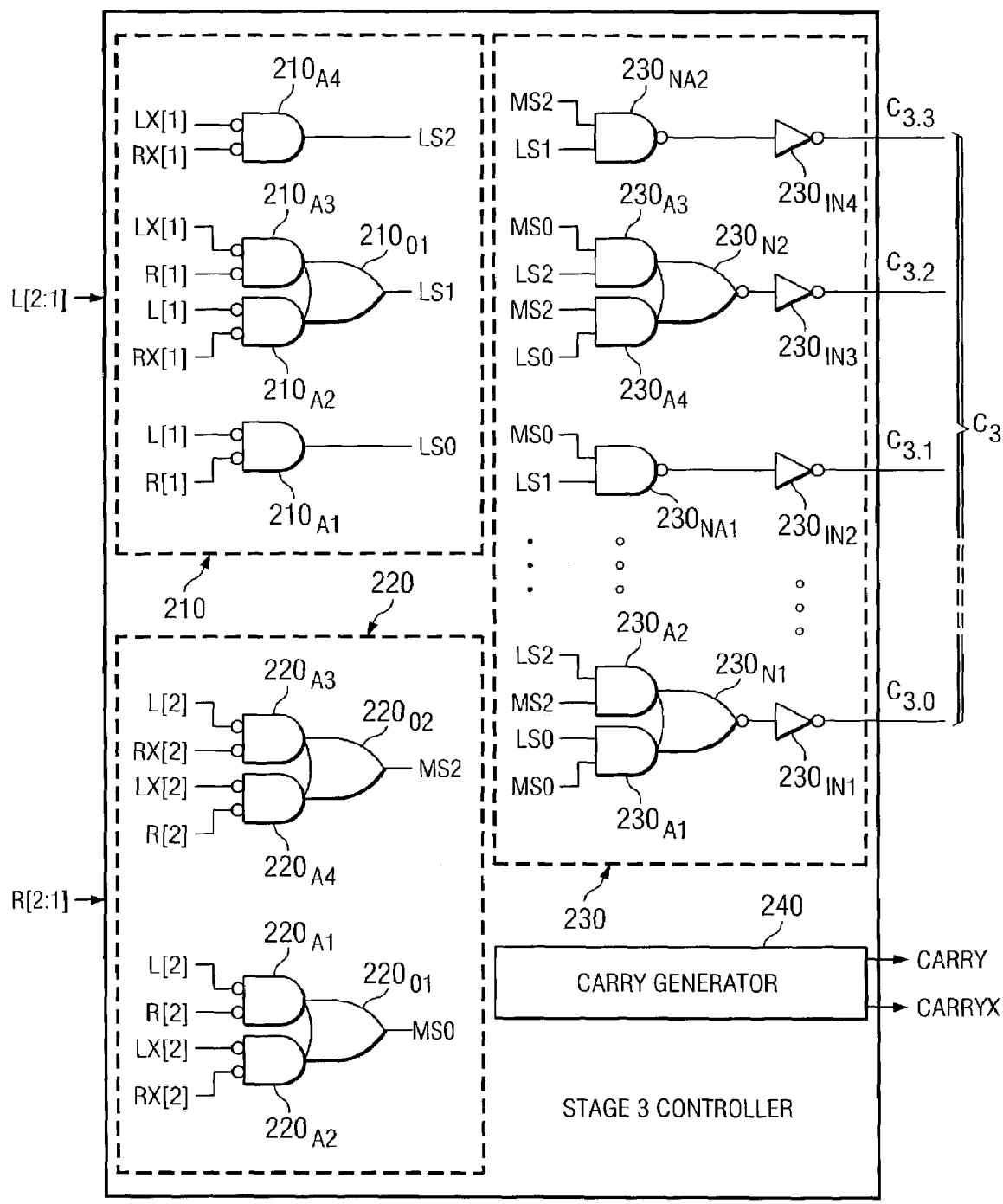
FIG. 12 illustrates a logic diagram of the preferred embodiment for constructing the STAGE 3 CONTROLLER of FIG. 3.

FIG. 12 illustrates a logic diagram of the preferred embodiment for constructing the STAGE 3 CONTROLLER of FIG. 3, where the various logic elements in FIG. 12 are readily constructed by one skilled in the art using known static logic circuits. By way of introduction, recall that functionally the STAGE 3 CONTROLLER performs an addition of the portions of the L and R shift argument values that consist of LX[2:1] and R[2:1]. In the preferred embodiment, this addition is accomplished via logical circuitry to provide the proper output for each possible input combination from these portions of the L and R shift argument values. By way of introduction, within the STAGE 3 CONTROLLER of FIG. 12, a set 210 of logic gates provides the logical equivalent of adding the respective least significant bits of these two portions, that is, it provides the outputs with respect to bits L[1] and R[1], while a set 220 of logic gates provides the logical equivalent of adding the respective most significant bits of these two portions, that is, it provides the outputs with respect to bits L[2] and R[2]. Note also with respect to the shift argument L that FIG. 12 and many of the remaining schematics indicate bits of L as opposed to its complement, LX; this approach is for clarity and consistency in the corresponding use of individual bits of R, and one skilled in the art should appreciate that L may be inverted externally of the remaining schematics in view of the LX from in Equation 1; in doing so, the remaining schematics will achieve the R+LX+1 approach of Equation 1 and the above-described block diagrams. Finally, the outputs from sets 210 and 220 are decoded by a decode set 230, which thereby provides the 4-bit control signal, $C_3$, from the STAGE 3 CONTROLLER. Each of these logic sets is described below.

Looking to logic set 210, its logic circuitry is now derived with respect to the functionality discussed above for the STAGE 3 CONTROLLER and further by focusing on the bits L[1] and R[1] processed by that set. First, noting that bits L[1] and R[1] are respective portions of what may be observed here as bit sets L[2:1] and R[2:1], then set 210 can be considered to be providing the equivalent of adding the least significant bit in each 2-bit portion L[2:1] and R[2:1]. Thus, each bit L[1] and R[1] corresponds to a decimal value of either 0 or 1, and the possible sums provided by adding L[1] and R[1] are either decimal 0, 1, or 2. Accordingly, three different states, corresponding to these three possible sums, may be realized by logic set 210. Specifically, a sum of decimal 0 is obtained only when L[1] and R[1] both equal 0. Such conditions may be stated in logic form, as in the following Equation 2:

Sum 0 occurs for: (LX[1] AND RX[1])  Equation 2

Next, a sum of decimal 1 is obtained only when either L[1]=0 while R[1]=1, or when L[1]=1 while R[1]=0. Such conditions may be stated in logic form, as in the following Equation 3:

Sum 1 occurs for:(LX[1] AND R[1]) OR (L[1] AND RX[1])  Equation 3

Lastly, a sum of decimal 2 is obtained only when both L[1]=1 and R[1]=1. Such a condition may be stated in logic form, as in the following Equation 4:

Sum 2 occurs for: (L[1] AND R[1])  Equation 4

Having developed Equations 2 through 4, one skilled in the art will readily appreciate that they are implemented in logic set 210, as further detailed below.

With respect to Equation 2, which recall corresponds to a sum equal to 0, it is implemented in the bottom of logic set 210; specifically, an AND gate $210_{A1}$, having inverted inputs, is connected to receive bits L[1] and R[1], where one skilled in the art will recognize that the combination of inverted inputs with AND gate $210_{A1}$ provides a logical NOR operation and, thus, in implementation a single NOR gate may be used. These inputs are the same as those in Equation 2, although their complements are used because AND gate $210_{A1}$ has inverted inputs. Further in this regard, note that the use of inverted inputs is preferred, as is used in the other input gates of logic set 210 in order to provide sufficient drive power and remove the load with respect to each of the input bits. By way of convention, because AND gate $210_{A1}$ therefore represents the case when the least significant bits of bit sets L[2:1] and R[2:1] sum to 0, then the output of AND gate $210_{A1}$ is indicated as LS0, where the "LS" indicates the least significant bits and the "0" indicates the sum of 0.

With respect to Equation 3, which recall corresponds to a sum equal to 1, it is implemented in the middle of logic set 210. Specifically, an AND gate $210_{A2}$, having inverted inputs, is connected to receive bits L[1] and RX[1]. These inputs are the same as the first two logic signals in Equation 4, where again complements are used because AND gate $210_{A2}$ has inverted inputs. Similarly, an AND gate $210_{A3}$, having inverted inputs, is connected to receive bits LX[1] and R[1], where these inputs are the same as the second two logic signals in Equation 4, where again complements are used because AND gate $210_{A3}$ has inverted inputs. Finally, to complete Equation 4, the output of AND gates $210_{A2}$ and $210_{A3}$ are connected to the input of an OR gate $201_{O1}$. By way of convention, because OR gate $210_{O1}$ therefore represents the case when the LSBs of bit sets L[2:1] and R[2:1] sum to 1, then the output of OR gate $210_{O1}$ is indicated as LS1. Lastly, note that the schematic of FIG. 12, as well as in other schematics shown in the Figures, the depiction of AND gates $210_{A2}$ and $210_{A3}$ are such that they abut the inputs of an OR gate $201_{O1}$; as known in the art, this depiction is intended to illustrate that these three devices may be implemented as a single so-called OR-AND-INVERT gate, which thereby provides a lesser delay as compared to separately constructed gates.

With respect to Equation 4, which recall corresponds to a sum equal to 2, it is implemented in the top of logic set 210; specifically, an AND gate $210_{A4}$, having inverted inputs, is connected to receive bits LX[1] and RX[1]. These inputs are the same as those in Equation 4, although their complements are used because AND gate $210_{A4}$ has inverted inputs. Also, again the combination of AND gate $210_{A4}$ with inverted inputs may be implemented as a single NOR gate. Lastly, by way of convention, because AND gate $210_{A4}$ therefore represents the case when the LSBs of bit sets L[2:1] and R[2:1] sum to 2, then the output of AND gate $210_{A4}$ is indicated as LS2.

Looking to logic set 220, its logic circuitry is now derived with respect to the functionality discussed above for the STAGE 3 CONTROLLER and further by focusing on the bits L[2] and R[2] processed by that set. First, note that bits L[2] and R[2] are also portions of the bit sets L[2:1] and R[2:1], where here logic set 220 can be considered to be providing the equivalent of adding the MSB in each 2-bit portion L[2:1] and R[2:1]. Further, because bits L[2] and R[2] are in the second bit position for bit sets L[2:1] and R[2:1], then when either bit L[2] or R[2] is set, it represents a decimal value of 2; thus, each bit L[2] or R[2] represents a decimal value of either 0 or 2, and the possible sums provided by adding L[2] and R[2] are either decimal 0, 2, or 4; however, when the sum reaches 4, it wraps around to represent a modulo 4 output (and as also handled through the separate generation of a carry bit, detailed later). Accordingly, there are only two possible different states, corresponding to these two possible sums, and they are realized by logic set 220. Specifically, a sum of decimal 0 is obtained either when L[1] and R[1] both equal decimal 0, or when L[1] and R[1] both equal decimal 2 because this provides a value of 0 due to the wraparound. Such conditions may be stated in logic form, as in the following Equation 5:

Sum 0 occurs for: (LX AND RX) OR (L AND R)　　Equation 5

Next, a sum of decimal 2 is obtained only when either L[2]=0 while R[2]=1, or when L[2]=1 while R[2]=0. Such conditions may be stated in logic form, as in the following Equation 6:

Sum 2 occurs for:(LX[2] AND R[2]) OR (L[2] AND RX[2])　　Equation 6

Having developed Equations 5 and 6, one skilled in the art will readily appreciate that they are implemented in logic set 220, as further detailed below.

With respect to Equation 5, which recall corresponds to a sum equal to 0, it is implemented in the bottom of logic set 220. Specifically, an AND gate 220$_{A1}$, having inverted inputs, is connected to receive bits L[2] and R[2]. These inputs are the same as the first two logic signals in Equation 5, where again complements are used because AND gate 220$_{A1}$ has inverted inputs. Similarly, an AND gate 220$_{A2}$, having inverted inputs, is connected to receive bits LX[2] and RX[2], where these inputs are the same as the second two logic signals in Equation 5, where again complements are used because AND gate 220$_{A2}$ has inverted inputs and the AND gate with inverted inputs can be implemented as a single NOR gate. Finally, to complete Equation 5, the output of AND gates 220$_{A1}$ and 220$_{A2}$ are connected to the input of an OR gate 220$_{O1}$. By way of convention, because OR gate 220$_{O1}$ therefore represents the case when the MSBs of bit sets L[2:1] and R[2:1] sum to 0, then the output of OR gate 220$_{O1}$ is indicated as MS0.

With respect to Equation 6, which recall corresponds to a sum equal to 2, it is implemented in the top of logic set 220. Specifically, an AND gate 220$_{A3}$, having inverted inputs, is connected to receive bits L[2] and RX[2]. These inputs are the same as the first two logic signals in Equation 6, where again complements are used because AND gate 220$_{A3}$ has inverted inputs. Similarly, an AND gate 220$_{A4}$, having inverted inputs, is connected to receive bits LX[2] and R[2], where these inputs are the same as the second two logic signals in Equation 6, where again complements are used because AND gate 220$_{A4}$ has inverted inputs. Finally, to complete Equation 6, the output of AND gates 220$_{A3}$ and 220$_{A4}$ are connected to the input of an OR gate 220$_{O2}$ and, thus, the combination of the AND gates, with inverted inputs, followed by the OR gate, is preferably implemented as a single OR-AND-INVERT gate. By way of convention, because OR gate 220$_{O2}$ therefore represents the case when the MSBs of bit sets L[2:1] and R[2:1] sum to 2, then the output of OR gate 220$_{O2}$ is indicated as MS2.

Turning now to decode set 230, it provides the 4 bit control signal, $C_3$, in response to the outputs from logic sets 210 and 220; further in this regard, the signal outputs and inputs are labeled, but to simplify the illustration, the actual connections from sets 210 and 220 to decode set 230 are eliminated in FIG. 12 so as not to unduly complicate the drawing. Looking to decode set 210, its logic circuitry is now derived with respect to the functionality discussed above with respect to the control signal $C_3$. Specifically, recall that $C_3$ provides a 4-bit control signal, where only one of those 4 bits is enabled at a time, and the specific enabled bit corresponds to an indication for the ROTATE STAGE 3 to shift its input either 0, 2, 4, or 6 bits, and where the extent of the shift depends on the sum of L[2:1] and R[2:1]. Specifically, because the STAGE 3 CONTROLLER is a modulo 4 system, then the sum of its inputs are either decimal 0, 1, 2 or 3. Thus, each of these sums corresponds to a respective shift control in the ROTATE STAGE 3 and as achieved through the control signal $C_3$, of either 0, 2, 4, or 6 bits. Accordingly, to derive the logic of decode set 230, each combination of inputs providing a sum of 0 should be decoded to assert a line $C_{3.0}$ of control signal $C_3$, thereby indicating a rotation of zero bit positions by the ROTATE STAGE 3, while each combination of inputs providing a sum of 1 should be decoded to assert a line $C_{3.1}$ of control signal $C_3$, thereby indicating a right rotation of two bit positions by the ROTATE STAGE 3, while each combination of inputs providing a sum of 2 should be decoded to assert a line $C_{3.2}$ of control signal $C_3$, thereby indicating a right rotation of four bit positions by the ROTATE STAGE 3, and lastly each combination of inputs providing a sum of 3 should be decoded to assert a line $C_{3.3}$ of control signal $C_3$, thereby indicating a right rotation of six bit positions by the ROTATE STAGE 3. Indeed, these various obtainable sums and the corresponding desired right rotations also may be characterized by the state of the least significant bit, LSn, and the most significant bit, MSn, from logic sets 210 and 200. Particularly, the following Table 4.3 designates each possible state of these two bits, as well as the sum provided by those states and the desired value for the 4-bit control signal, $C_3$, corresponding to each sum:

TABLE 4.3

| LSn (decimal) | MSn (decimal) | Sum (decimal) | $C_3$ |
|---|---|---|---|
| 0 | 0 | 0 | 0001 |
| 1 | 0 | 1 | 0010 |
| 2 | 0 | 2 | 0100 |
| 0 | 2 | 2 | 0100 |
| 1 | 2 | 3 | 1000 |
| 2 | 2 | 0 (modulo 4) | 0001 |

Each of these combinations is further derived below.

Looking toward the bottom of decode set 230, it includes the logic for each combination of inputs providing a sum of 0, and which is thereby decoded to assert line $C_{3.1}$ of control signal $C_3$ to indicate a shift of zero positions by the ROTATE STAGE 3. Specifically, returning to set 220, recall its output MS0 is asserted when its inputs total 0, and returning to set 210, recall its output LS0 is asserted when its inputs total 0. Thus, when both of these outputs are asserted, then the sum of the least and most significant bits of L[2:1] and R[2:1] also equals zero and, hence, it is desirable to indicate a right rotation of zero positions, that is, to assert output $C_{3.0}$.

Accordingly, such conditions may be stated in logic form, as in the following Equation 7a:

Sum 0 occurs for: LS0 AND MS0    Equation 7a

However, recalling that the STAGE 3 CONTROLLER is in part a modulo 4 system, then in addition to the condition of Equation 7a, when each of sets 210 and 220 provides an output of 2 (i.e., when LS2 and MS2 are asserted), then the sum corresponding to those two outputs equals 4, thereby wrapping back to a total of 0. Accordingly, Equation 7a may be re-written to add these additional conditions, as shown in the following Equation 7b:

Sum 0 occurs for: (LS0 AND MS0) OR (LS2 AND MS2)    Equation 7b

Looking then to the devices that provide the output $C_{3.0}$, one skilled in the art will appreciate that they implement the logic of Equation 7b. Specifically, as to the first two logic states in Equation 7b, they are connected as inputs to an AND gate $230_{A1}$, and as to the second two logic states in Equation 7b, they are connected as inputs to an AND gate $230_{A2}$. The output of each of AND gates $230_{A1}$ and $230_{A2}$ is connected as an input to a NOR gate $230_{N1}$. Note, however, that Equation 7b calls for an OR function rather than a NOR as provided by NOR gate $230_{N1}$. Further in this regard, however, the output of NOR gate $230_{N1}$ is connected as input to an inverter $230_{IN1}$, which thereby in combination with NOR gate $230_{N1}$ provides an equivalent logical OR function. This combination of the AND gates and the NOR gate is preferably implemented as a single AND-OR-INVERT gate. As an additional benefit, however, the inclusion of inverter $230_{IN1}$ provides signal buffering for signal $C_{3.0}$ prior to its provision to the ROTATE STAGE 3. Similar buffering is provided for the remaining signals in control signal $C_3$, as further appreciated below.

Continuing with decode set 230, it also includes the logic for each combination of inputs providing a sum of 1, and which are thereby decoded to assert line $C_{3.1}$ to indicate a right rotation of two bit positions by the ROTATE STAGE 3. Returning to sets 210 and 200 and as shown in Table 4.3, the only combination of an output from each that will total 1 occurs when both LS1 is asserted and MS0 is asserted, that is, at that time, the 2 LSBs of the sum of L[2:1] and R[2:1] equals 1 and, hence, it is desirable to indicate a right rotation of two bit positions by asserting output $C_3$. Accordingly, such conditions may be stated in logic form, as in the following Equation 8:

Sum 1 occurs for: LS1 AND MS0    Equation 8

Looking then to the devices that provide the output $C_{3.1}$, one skilled in the art will appreciate that they implement the logic of Equation 8. Specifically, the two logic states in Equation 8 are connected as inputs to a NAND gate $230_{NA1}$. Note, however, that Equation 8 calls for an AND function rather than a NAND as provided by NAND gate $230_{NA1}$. Further in this regard, however, the output of NAND gate $230_{NA1}$ is connected as input to an inverter $230_{IN2}$, which thereby in combination with NAND gate $230_{NA1}$ provides an equivalent logical AND function. Also, as introduced above, the inclusion of inverter $230_{IN2}$ provides signal buffering for signal $C_{3.1}$ prior to its provision to the ROTATE STAGE 3.

Continuing with decode set 230, it also includes the logic for each combination of inputs providing a sum of 2, and which are thereby decoded to assert line $C_{3.2}$ to indicate a rotation of four bit positions by the ROTATE STAGE 3. Returning to sets 210 and 220 and as shown in Table 4.3, there are two combinations of an output from each that will sum to 2. Specifically, as a first combination, when MS0 is asserted, corresponding to an MSB total of 0, and when at the same time LS2 is asserted, corresponding to an LSB total of 2, then the sum of the two is decimal 2. Further, as a second combination, when MS2 is asserted, corresponding to an MSB total of decimal 2, and when at the same time LS0 is asserted, corresponding to an LSB total of 0, then the sum of the two is also decimal 2. In either case, it is desirable to indicate a right rotation of four bit positions by asserting output $C_{3.2}$. Accordingly, such conditions may be stated in logic form, as in the following Equation 9:

Sum 2 occurs for: (MS0 AND LS2) OR (MS2 AND LS0)    Equation 9

Looking then to the devices that provide the output $C_{3.2}$, one skilled in the art will appreciate that they implement the logic of Equation 9. Specifically, the first two logic states in Equation 9 are connected as inputs to an AND gate $230_{A3}$, and the second two logic states in Equation 9 are connected as inputs to an AND gate $230_{A4}$. Further, the output of each of AND gates $230_{A3}$ and $230_{A4}$ is connected as an input to a NOR gate $230_{N2}$, which in combination with providing its output to an inverter $230_{IN3}$, provides the logical equivalent of the OR function from Equation 9, as well as a buffering aspect as discussed above. Additionally, this combination of the AND gates and the NOR gate is preferably implemented as a single AND-OR-INVERT gate.

Completing decode set 230, it also includes the logic for each combination of inputs providing a sum of decimal 3, and which is thereby decoded to assert line $C_{3.3}$ to indicate a rotation of six bit positions by the ROTATE STAGE 3. Returning to sets 210 and 220 and as shown in Table 4.3, the only combination of an output from each that will total decimal 3 occurs when LS1 is asserted and MS2 is asserted, that is, at the time the 2 LSBs of the sum of L[2:1] and R[2:1] equals 3 and, hence, it is desirable to indicate a right rotation of six bit positions by asserting output $C_{3.3}$. Accordingly, such conditions may be stated in logic form, as in the following Equation 10:

Sum 3 occurs for: LS1 AND MS2    Equation 10

Looking then to the devices that provide the output $C_{3.3}$ and thereby implement the logic of Equation 10, the two logic states in Equation 10 are connected as inputs to a NAND gate $230_{NA2}$. Further, the output of NAND gate $230_{NA2}$ is connected to an inverter $230_{IN4}$, which thus in combination with NAND gate $230_{NA2}$ provides the logical equivalent of the AND function from Equation 10, as well as a buffering aspect as discussed above.

Figure 13:
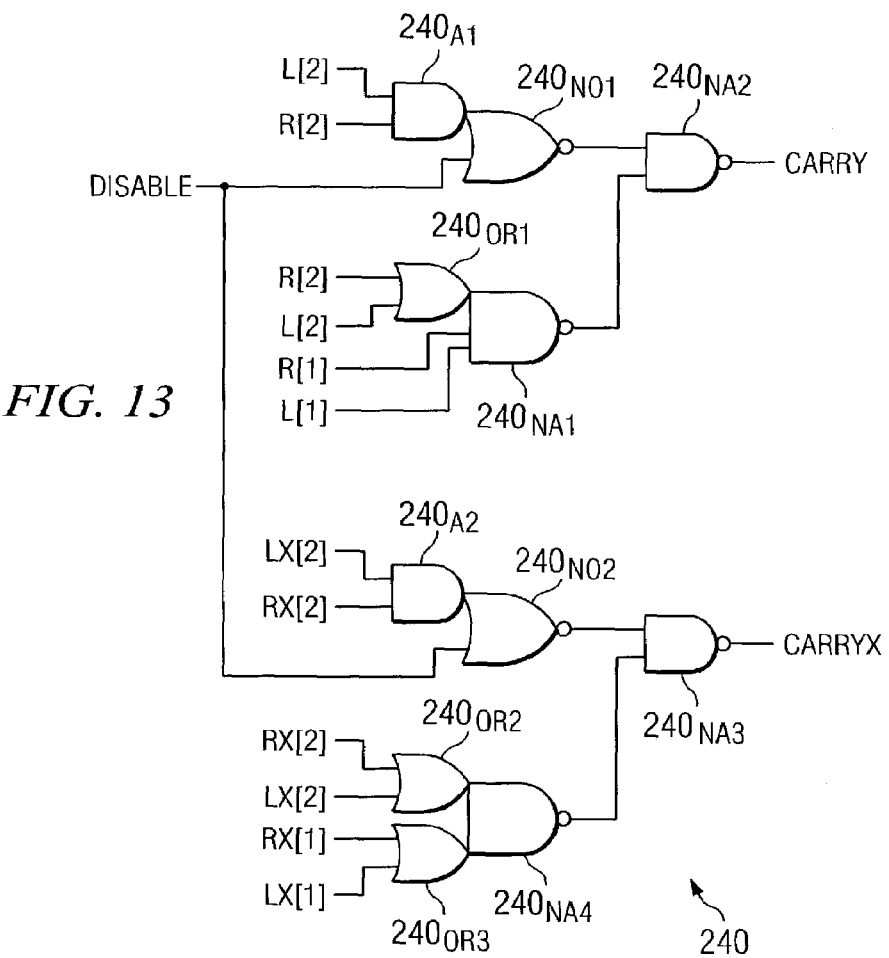
FIG. 13 illustrates a schematic for a carry generator block of the STAGE 3 CONTROLLER of FIG. 12.

FIG. 12 also illustrates a carry generator block 240, which is shown in greater detail in FIG. 13. Looking to FIG. 13 and carry generator block 240, its logic circuitry is now derived with respect to the functionality discussed above for the STAGE 3 CONTROLLER and further by focusing on the bits L[2:1] and R[2:1] processed by that controller. Generally, the STAGE 3 CONTROLLER functions as a 2-bit adder (i.e., operable to add one 2-bit quantity with another 2-bit quantity), where as discussed above with respect to FIG. 12 it has been shown to be provided not by an adder per se, but by direct logic circuitry based on the logical states of the input bits L[2:1] and R[2:1]. Thus, for the same 2-bit adder, known principles may be applied to generate a carry bit for that adder. Briefly describing such aspects, when adding each single bit of a first 2-bit addend to a corresponding single bit of a second 2-bit addend, the two single bits can provide one of four different cases by taking four different binary values, namely, 0 and 0, 0 and 1, 1 and 0, or 1 and 1. The results of adding these bits are shown in the following Table 5:

TABLE 5

| Case | Addends, result | Carry status |
|---|---|---|
| 1 | 0 + 0 = 0 | None |
| 2 | 0 + 1 = 1 | None |
| 3 | 1 + 0 = 1 | None |
| 4 | 1 + 1 = 0 | Carry generate |

Table 5 illustrates that case 4, that is, when both 1-bit addends equal 1, is referred to as a carry generate because those addends alone give rise to a carry.

In addition to the notion of a carry generate as provided by Table 5, note also that cases 2 and 3 (i.e., addends of 0,1 or 1,0) are referred to in the art as a carry propagate, because if there is a carry generated in immediately lesser significant bits, then that same carry is propagated onward by cases 2 and 3. To further elaborate, for example, consider the addition in the following Equation 11, with bit positions [0] and [1]:

$$\begin{array}{r} 1\ 0 \\ +\ 0\ 0 \\ \hline 1\ 0 \end{array}$$  Equation 11

In Equation 12, case 3, a carry propagate, is shown in the MSBs at position [1]. However, the next lesser significant bits in position [0], namely the values of 0 and 0, do not generate a carry. Therefore, there is no carry to propagate onward by the case 3 bits. In contrast, consider now the following Equation 12:

$$\begin{array}{r} 1 \\ 1\ 1 \\ +\ 0\ 1 \\ \hline 1\ 0\ 0 \end{array}$$  Equation 12

In Equation 11, once again, a carry propagate is shown in the bit position [1]. However, here the next lesser significant bits, in position [0], namely the values of 1 and 1, do generate a carry. That carry is taken to, and shown vertically over, the bits 1 and 0 in position [1]; due to their value, however, those bits effectively propagate that carry upward to position [2]. Therefore, it can be seen how the propagate case 3 from Table 5 passes the carry bit to the next most significant bit position, and the same holds true for case 2 from Table 5.

Given the preceding, a logic equation now may be derived to indicate when a carry bit should be generated for an adder that adds two 2-bit quantities. First, Table 5 demonstrates that a carry is always generated when case 4 is provided. Second, Equation 12 demonstrates that a carry is also provided when case 2 or 3 is provided, and when at the same time a carry is generated in the immediately-lesser significant bit position. Thus, these conditions may be stated logically as in the following Equation 13:

CARRY=CASE 1+[(CASE 2 OR CASE3) AND
(CASE 4 at preceding bit position)]  Equation 13

Next, recalling that the STAGE 3 CONTROLLER is providing the equivalent to adding L[2:1] and R[2:1], and that carry generator 240 is therefore providing a carry for those bits, then these values may be substituted into Equation 13 to provide the following Equation 14:

CARRY=(L[2]AND R[2])OR [(L[2]OR R[2]) AND
(L[1]AND R[1])]  Equation 14

Looking now to the schematic of FIG. 13, one skilled in the art will appreciate that with respect to the CARRY signal the logic elements implement Equation 14, along with a DISABLE signal which, when asserted, causes the CARRY signal to be asserted high. Specifically, to achieve the first two states in Equation 14, L[2] and R[2] are connected as inputs to an AND gate $240_{A1}$; however, rather than connecting the output of AND gate $240_{A1}$ to an OR gate as shown in Equation 14, an equivalent function is realized by connecting the output of AND gate $240_{A1}$ as an input to a NOR gate $240_{NO1}$, where the DISABLE signal is also connected as an input to NOR gate $240_{NO1}$, and the output of NOR gate $240_{NO1}$ is connected as an input to a NAND gate $240_{NA2}$. Thus, when the inputs L[2] and R[2] as connected to AND gate $240_{A1}$ are true, then CARRY is asserted high, as will also occur when DISABLE is asserted. In an alternative manner, and where this alterative is the functional implementation of the first-listed OR function in Equation 14, the CARRY signal can be asserted high in response to an OR gate $240_{OR1}$ and a NAND gate $240_{NA1}$, where these two gates also are preferably implemented as a single complex gate. Specifically, L[2] and R[2] are connected as input to OR gate $240_{OR1}$, thereby implementing the elements (L[2] OR R[2]) of Equation 14, and the output of OR gate $240_{OR1}$ is connected as an input to NAND gate $240_{NA1}$ along with inputs R[1] and L[1]. Due to the NAND to NAND connection of gates $240_{NA1}$ and $240_{NA2}$, then when all of the inputs to NAND gate $240_{NA1}$ are true, then CARRY is asserted.

FIG. 13 also illustrates the preferred embodiment logic for generating the complement of CARRY, namely, CARRYX. In the preferred embodiment, CARRYX is generated using the same number of gate delays as the CARRY signal so that both signals are available at the same time. To appreciate the logic that provides the CARRYX signal, note now that case 1 in Table 5 is referred to in the art as a carry kill situation, that is, in binary math and for a 2-bit adder, no matter what the bits and carry situation are in the immediately-lesser significant bit position, case 1 will neither cause a carry nor allow one to propagate. For example, consider the case in the following Equation 15:

$$\begin{array}{r} 1 \\ 0\ 1 \\ +\ 0\ 1 \\ \hline 1\ 0 \end{array}$$  Equation 15

In Equation 15, the bits in position [0] generate a carry; however, the bits in position [1] are a carry kill. Thus, the example illustrates that the carry from position [0] does not pass beyond position [1], that is, due to the bit values in position [1], they are said to kill the carry. Accordingly, one condition in which case CARRYX should be asserted is when a kill occurs in the most significant bit position of the 2-bit addends, and thus, this condition may be stated according to the following Equation 16a:

$$CARRYX = (LX[2] \text{ AND } RX[2]) \quad \text{Equation 16a}$$

Further, however, one skilled in the art can confirm that a carry also will not be generated whenever at least one addend of both positions of the two bit positions is a zero. Thus, this condition may be stated as in the following Equation 16b:

$$CARRYX = [(LX[2] \text{ OR } RX[2]) \text{ AND } (LX[1] \text{ OR } RX[1])] \quad \text{Equation 16b}$$

Thus, by combining the conditions of Equations 16a and 16b, the following logic Equation 16c is formed to depict the instance when no carry occurs and, hence, when CARRYX should be asserted.

$$CARRYX = (LX[2] \text{ AND } RX[2]) \text{ OR } [(LX[2] \text{ OR } RX[2]) \text{ AND } (LX[1] \text{ OR } RX[1])] \quad \text{Equation 16c}$$

Returning now to the schematic of FIG. 13, one skilled in the art will appreciate that the remaining gates of FIG. 13 implement the logic elements of Equation 16c, again along with the DISABLE signal which, when asserted, causes the CARRYX signal to be asserted high. Specifically, to achieve the first two states in Equation 16c, LX[2] and RX[2] are connected as inputs to an AND gate $240_{A2}$; however, rather than connecting the output of AND gate $240_{A2}$ to an OR gate as shown in Equation 16c, an equivalent function is realized by connecting the output of AND gate $240_{A2}$ as an input to a NOR gate $240_{NO2}$, where the DISABLE signal is also connected as an input to NOR gate $240_{NO2}$, and the output of NOR gate $240_{NO2}$ is connected as an input to a NAND gate $240_{NA3}$. Thus, when the inputs LX[2] and RX[2] as connected to AND gate $240_{A2}$ are true, then CARRYX is asserted high, as will also occur when DISABLE is asserted. In an alternative manner, the CARRYX signal can be asserted high in response to high outputs from both an OR gate $240_{OR2}$ and an OR gate $240_{OR3}$. Specifically, LX[2] and RX[2] are connected as inputs to OR gate $240_{OR2}$, thereby implementing the elements (LX[2] OR RX[2]) of Equation 16c, and the output of OR gate $240_{OR2}$ is connected as an input to NAND gate $240_{NA4}$. Additionally, LX[1] and RX[1] are connected as inputs to OR gate $240_{OR3}$, thereby implementing the elements (LX[1] OR RX[1]) of Equation 16c, and the output of OR gate $240_{OR3}$ is connected as an input to NAND gate $240_{NA4}$. Due to the NAND to NAND connection of gates $240_{NA4}$ and $240_{NA3}$, then when all of the inputs to NAND gate $240_{NA4}$ are true, then CARRYX is asserted. Once more, the preceding gates may be consolidated and implemented as single complex gates.

Figure 14:
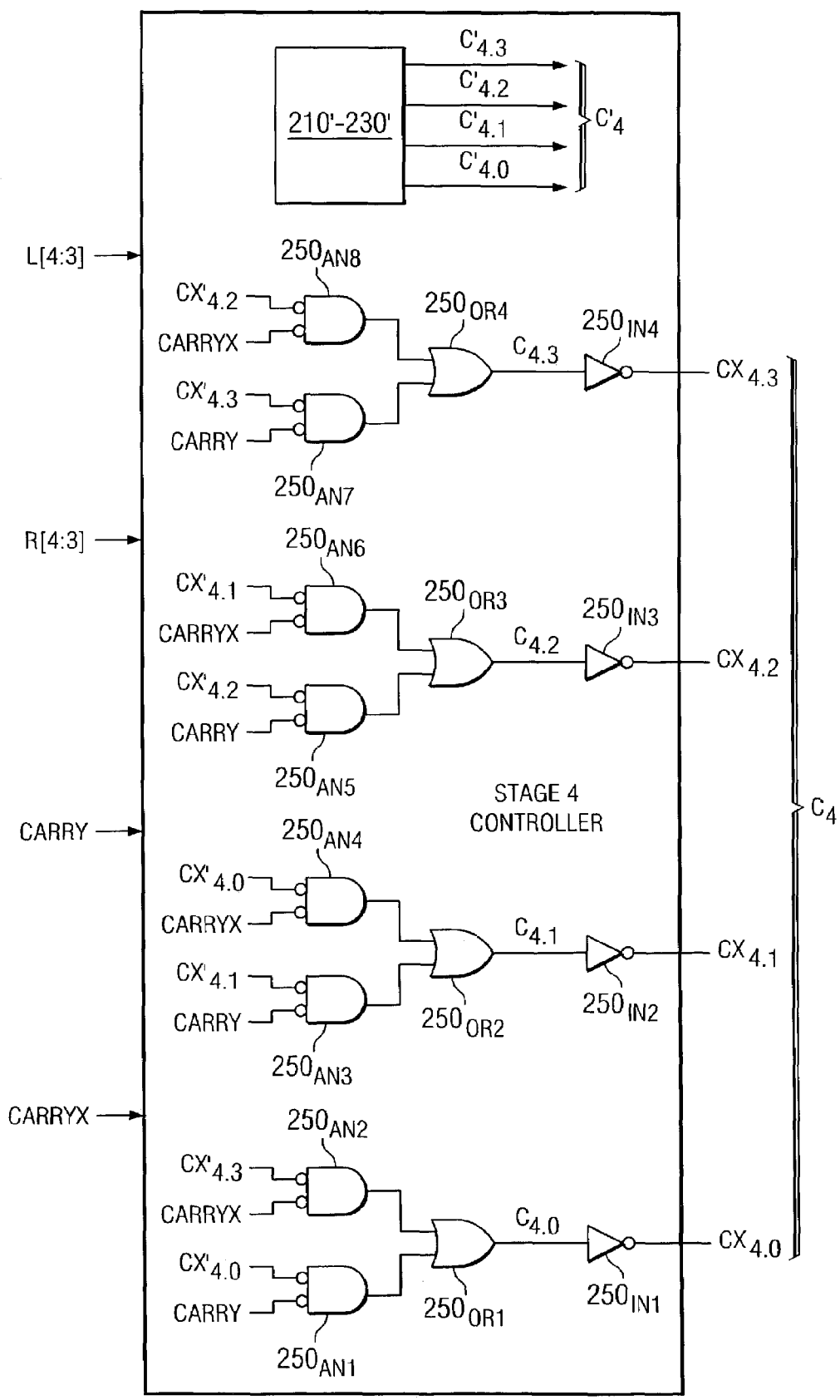
FIG. 14 illustrates a block and logic diagram of the preferred embodiment for constructing the STAGE 4 CONTROLLER of FIG. 3.

FIG. 14 illustrates a block and logic diagram of the preferred embodiment for constructing the STAGE 4 CONTROLLER of FIG. 3. First, recalling that the STAGE 4 CONTROLLER is a two-bit adder, then it may use the same logic circuits as used by the 2-bit adder of the STAGE 3 CONTROLLER shown in FIG. 12 (although without the final output inverters $230_{IN1}$, $230_{IN2}$, $230_{IN3}$, and $230_{IN4}$), and to simplify FIG. 14 therefore such comparable circuits are shown in a block identified as 210'-230'. However, in the preferred embodiment, the outputs of those blocks do not provide the ultimate control signal, $C_4$, for the ROTATE STAGE 4 because there also must be an accounting for any carry generated by the STAGE 3 CONTROLLER. Thus, the outputs of block 210'-230' are only preliminary signals and, hence, each is designated with an apostrophe to form a total signal $C_4'$ and to thereby indicate that it may be further changed in response to the CARRY and CARRYX signals, which also are shown as inputs to the STAGE 4 CONTROLLER. The remaining logic shown in FIG. 14 is directed to such possible signal changes, as further detailed below.

Recalling the relationship of the ROTATE STAGE 3 and the ROTATE STAGE 4 and their respective controllers, it has been shown that a carry in STAGE 3 should cause an increment in the sum of STAGE 4. However, as mentioned earlier, rather than having the CARRY signal from STAGE 3 change the sum of STAGE 4, instead in the preferred embodiment and to increase speed the carry is instead provided to change the decoded value of $C_4$ that results solely from the sum of LX[4:3] and R[4:3]. Thus, in FIG. 14, $C_4$ is originally provided in a decoded form in the signals $C_{4.0}'$, $C_{4.1}'$, $C_{4.2}'$, and $C_{4.3}'$, which without any other change would indicate to the ROTATE STAGE 4 a shift of 0, 8, 16, or 24 shift positions, respectively. Thus, in any one cycle, only one of those four signals $C_{4.x}'$ is asserted. Additionally, however, if CARRY is asserted, then these control signals are rotated once to the right so that the next number of rotations is effected as opposed to that indicated by the one asserted signal in $C_{4.0}'$, $C_{4.1}'$, $C_{4.2}'$, and $C_{4.3}'$. For example, if $C_{4.0}'$ is asserted corresponding to a rotation of 0 bit positions, and if CARRY is also asserted, then the assertion of $C_{4.0}'$ is effectively rotated right once to indicate a rotation of 8 bit positions. Similarly, if $C_{4.0}'$ is asserted corresponding to a rotation of 8 bit positions, and if CARRY is also asserted, then the assertion of $C_{4.1}'$ is effectively rotated right once to indicate a rotation of 16 bit positions. Also similarly, if $C_{4.2}'$ is asserted corresponding to a rotation of 16 bit positions, but if CARRY is also asserted, then the assertion of $C_{4.2}'$ is effectively rotated right once to indicate a shift of 24 bit positions. Lastly, therefore, if $C_{4.3}'$ is asserted corresponding to a rotation of 24 bit positions, but if CARRY is also asserted, then the assertion of $C_{4.3}'$ is used to indicate a rotation of 0 bit positions. Each of these rotations of the control signal is achieved by relocating the asserted signal $C_{4.x}'$ to the next highest conductor in the ultimate output signal $C_4$, that is, $C_{4.x}'$ is adjusted to be asserted as $C_{4.x+1}$ (i.e., without the apostrophe), with the additional wrap-around such that $C_{4.3}'$ is adjusted to wraparound and thereby assert $C_{4.0}$ if CARRY is asserted.

To implement the above-described shift between $C_4'$ and $C_4$, the logic needed may be stated according to the following Equation 17, with the exception of the case when the bits in $C_4'$ wrap around due to the assertion of CARRY such that an asserted MSB in $C_4'$ wraps around to become an asserted LSB in $C_4$:

$$C_{4.x} = (C_{4.x}' \text{ AND } CARRYX) + (C_{4.x-1}' \text{ AND } CARRY) \quad \text{Equation 17}$$

Equation 17a, therefore, demonstrates that when CARRY is not asserted (and hence CARRYX is asserted), then the output $C_{4.x}$ is the same as the corresponding output $C_{4.x}'$ output from blocks 210'-230'. Alternatively, when CARRY is asserted, then each output $C_{4.x}$ is the next lesser significant bit $C_{4.x-1}'$ output from blocks 210'-230'. Thus, the assertion of CARRY shifts the decoded value as desired and as discussed above. In addition, however, in the preferred embodiment, the signals for $C_4$ are negative logic (i.e., active low). Accordingly, to achieve negative logic signals the CARRY and CARRYX signals from Equation 17 are inverted. Each active low signal is also inverted locally inside the multiplexer of STAGE 4 that receives the $C_{4.x}$ signal to generate the complementary signals for the transfer gates, so either polarity of select signal is acceptable.

One skilled in the art will readily appreciate that Equation 17 is implemented for each of the four signals to be used for $C_4$, also taking into account the wraparound case of $C_4$ as discussed above. For example, looking to the gates at the bottom of FIG. 14, they provide the signal $C_{4.1}$. From Equation 17, therefore, the inputs to a first AND gate would be $C_{4.1}'$ AND CARRYX. However, in the preferred embodiment, the AND gate provided is AND gate $250_{AN1}$, which has inverted inputs; thus, its inputs are $CX_{4.1}'$ AND CARRY. Similarly, the inputs to a second AND gate would be $C_{4.4}'$ AND CARRY. However, in the preferred embodiment, the AND gate provided is AND gate $250_{AN2}$, which also has inverted inputs; thus, its inputs are $CX_{4.4}'$ AND CARRYX. The output of each of AND gates $250_{AN1}$ and $250_{AN2}$ is connected as an input to an OR gate $250_{OR1}$, which therefore provides the $C_{4.0}$ signal; thereafter, that signal is inverted by an inverter $250_{INV1}$, providing an inverted output signal $CX_{4.0}$. Given these connections, one skilled in the art will appreciate the comparable devices and connections to provide each of $CX_{4.1}$, $CX_{4.2}$, and $CX_{4.3}$.

Figure 15:
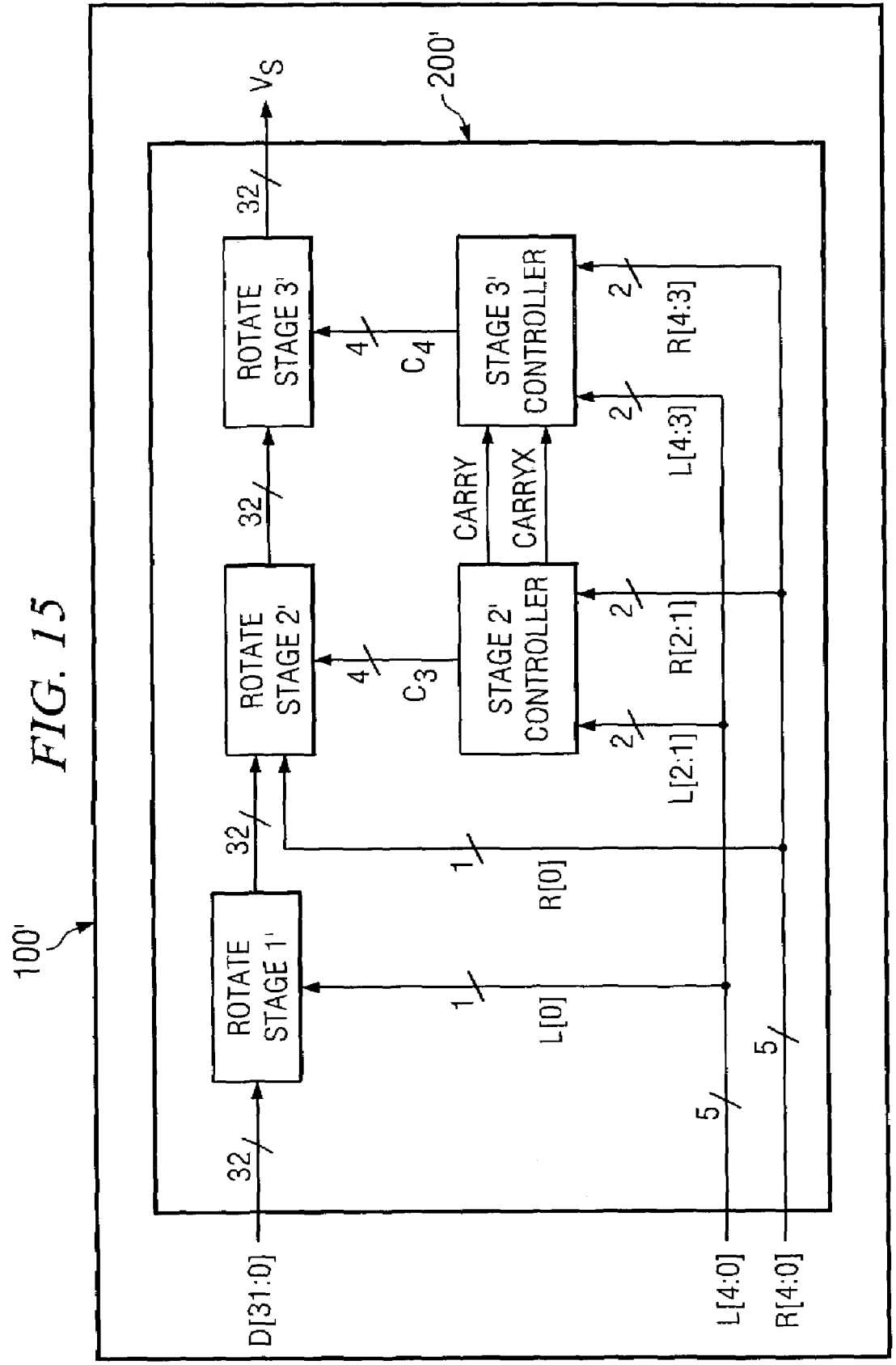
FIG. 15 illustrates a block diagram of a processor according to an alternative preferred embodiment to that illustrated in FIG. 3.

FIG. 15 illustrates a block diagram of a processor 100' according to an alternative preferred embodiment to processor 100 of FIG. 3, where processor 100' also may be a microprocessor or DSP or still other computing integrated circuit. Processor 100', like processor 100, may include numerous aspects known in the art and that are neither shown nor described in order to simplify the remaining discussion. Processor 100' also includes an alternative data rotate unit 200', which shares many aspects with data rotate unit 200 of processor 100. Thus, these common aspects are not detailed again as the reader is assumed to be familiar with the earlier discussion. Instead, the following concentrates on the differences between data rotate unit 200' and the above-described data rotate unit 200. By way of introduction to these differences, in the preferred embodiment data rotate unit 200' is constructed using dynamic logic circuitry, as further detailed below in various schematics, where recall that data rotate unit 200 may be more readily implemented using static logic. As known in the dynamic logic circuitry art, dynamic logic operates in two phases, a precharge phase during which various precharge nodes are precharged to a first voltage, and an evaluate phase during which the data is read based on the voltage at the precharge node, where the precharge voltage therefore may be read as a first logic state if undisturbed or where that precharge voltage may be first discharged and then read as a second logic that that is complimentary to the first logic state; also in dynamic logic circuitry, typically dual rail signals are provided. Looking now to the overall block structure of data rotate unit 200' and its ROTATE STAGE 1', its overall functionally is comparable to the ROTATE STAGE 1 of unit 200, although it is constructed and operates using dynamic logic. However, the ROTATE STAGE 2' of unit 200' combines the functionality of the ROTATE STAGEs 2 and 3 of unit 200 and, thus, as shown in FIG. 15, the ROTATE STAGE 2' receives the control signal $C_3$ as well as the least significant bit of the L shift argument value, L[0] (and its complement, not separately shown). Note that this combination within ROTATE STAGE 2' is not by way of limitation with respect to the inventive scope, but rather illustrates in block form how the preferred embodiment schematic is implemented to provided both functions as discussed below; accordingly, ROTATE STAGE 2' also may be considered to comprise two stages, one directed to the sum of LX[2:1]+R[2:1] and the other directed to R[0]. Lastly, the overall functionality of the ROTATE STAGE 3' is comparable to the ROTATE STAGE 4 of unit 200, although it is constructed and operates using dynamic logic.

Figure 16:
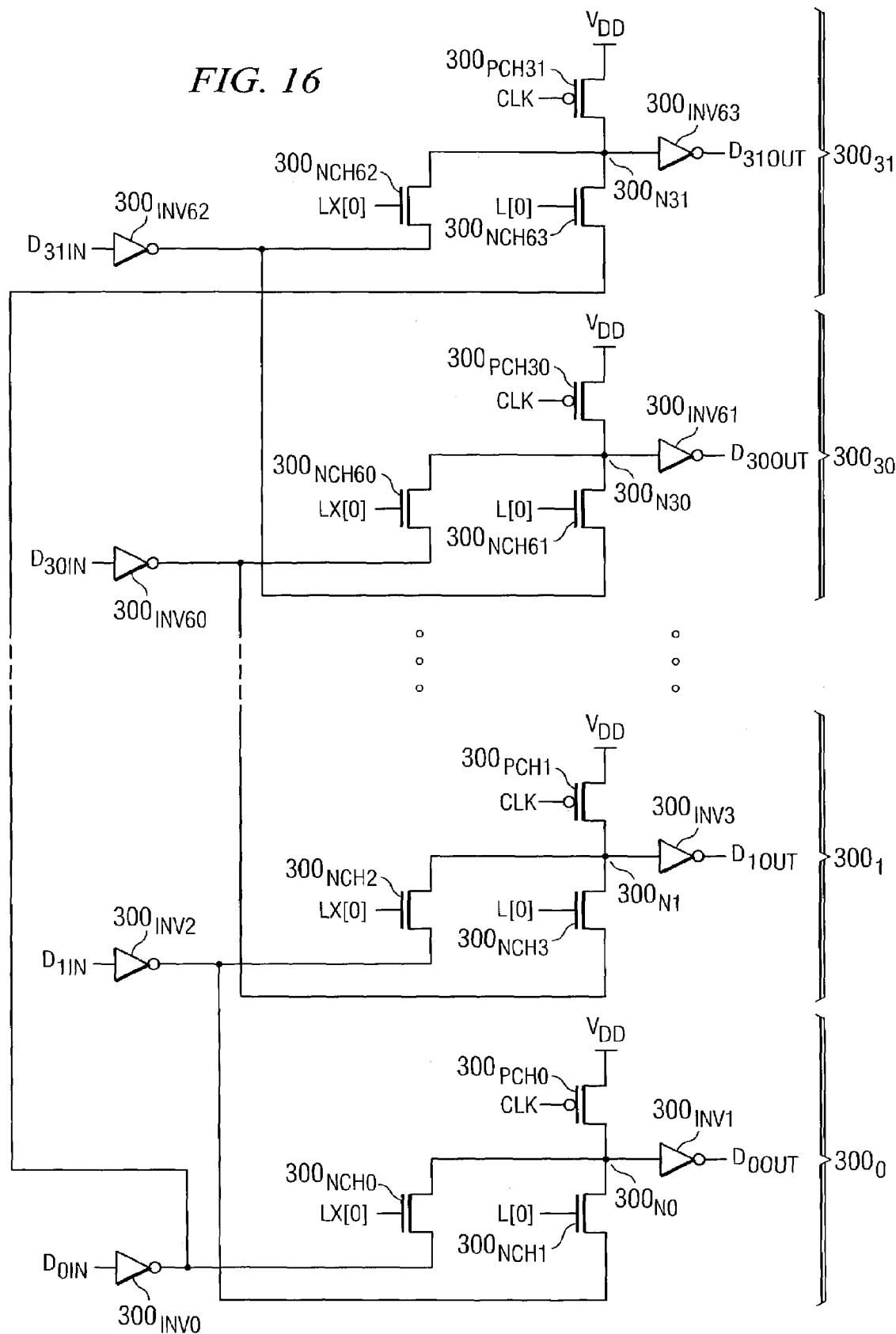
FIG. 16 illustrates a schematic of ROTATE STAGE 1' from FIG. 15.

FIG. 16 illustrates a schematic of the ROTATE STAGE 1' from FIG. 15. In general, the FIG. 16 schematic circuitry is for receiving a 32-bit input having bits $D3_{1IN}$ through $D_{0IN}$ and outputting a 32-bit output having bits $D_{31OUT}$ through $D_{0OUT}$. To simplify the discussion, note that the FIG. 16 schematic includes 32 identical sub-circuits $300_0$ through $300_{31}$, each associated with a respective and different one of the outputs. Further, to simplify the illustration, only four of these sub-circuits are shown, where one skilled in the art will appreciate the comparable connections to the remaining circuits. The following discussion concentrates on only the illustrated circuits. Looking to sub-circuit $300_0$, it receives the data bit input $D_{0IN}$ to an inverter $300_{INV0}$, which has its output connected to the source of an n-channel transistor $300_{NCH0}$. The gate of n-channel transistor $300_{NCH0}$ is connected to LX[0] and the source of that same transistor is connected to a node $300_{N0}$. Node $300_{N0}$ is also connected to the drain of a p-channel transistor $300_{PCH0}$, which has its source connected to a reference voltage, $V_{DD}$, and its gate connected to receive a clock signal CLK. Node $300_{N0}$ is also connected to the drain of an n-channel transistor $300_{NCH1}$, which has its gate connected to L[0] and its source connected to the output of an inverter $300_{INV2}$ from sub-circuit $300_1$. Completing sub-circuit $300_0$, node $300_{N0}$ is connected to an input of an inverter $300_{INV1}$, and the output of inverter $300_{INV1}$ provides the output signal $D_{0OUT}$. Given the above connections, one skilled in the art will readily appreciate that each remaining sub-circuit $300_x$ in FIG. 16 has a same set of devices and a same type of connections, where the difference is to receive a different corresponding input $D_{xIN}$ and to provide a corresponding output $D_{xOUT}$. Lastly, note that FIG. 16, by way of simplification, only shows one of the two dual rail circuits for ROTATE STAGE 1'; one skilled in the art will appreciate that in the preferred embodiment, the illustrated circuitry is duplicated with inverse data and identical select signals so as to provide a dual rail output for each output data signal.

The operation of the ROTATE STAGE 1', as implemented using the sub-circuits of FIG. 16, is now described. Overall, the entirety of the sub-circuits operate so that the 32-bit input, $D_{31IN}$ through $D_{0IN}$, is passed directly to outputs $D_{31OUT}$ through $D_{0OUT}$ if LX[0] is true, whereas if LX[0] is false (i.e., L[0] is true), then the input is shifted once to the right such that each input $D_{xIN}$ is connected to an output $D_{x-1OUT}$, and the LSB $D_{0IN}$ thereby wraps around to be output by $D_{31OUT}$. This operation is now examined in greater detail, and by looking to sub-circuit $300_0$ by way of example. First, during a precharge phase of operation, CLK goes low. In response, p-channel transistor $300_{PCH0}$ is enabled, and node $300_{N0}$ is precharged. Thus, also during this precharge phase, the comparable p-channel transistors $300_{PCHx}$ in the remaining sub-circuits of FIG. 16 are also enabled, thereby precharging their respective nodes $300_{Nx}$. Second, during an evaluate phase of operation, CLK goes high. At this time, the voltage at each node $300_{Nx}$ either remains in its precharged phase or it is discharged, where the result depends on the value of LX[0] as well as the input data. Specifically, looking to sub-circuit $300_0$, if LX[0] is true, then node $300_{N0}$ is connected through n-channel transistor $300_{NCH0}$ to the output of inverter $300_{INV0}$. Accordingly, if the output of inverter $300_{INV0}$ is low (i.e., because its input, $D_{0IN}$ is high), then the precharged voltage at node $300_{N0}$ is discharged, and in response a rising voltage is created at the output of inverter $300_{INV1}$ to the output $D_{0OUT}$. Conversely, if the output of inverter $300_{INV0}$ is high (i.e., because its input, $D_{0IN}$ is low), then the precharged high voltage at node $300_{N0}$ is undisturbed and, thus, inverter $300_{INV1}$ continues to output a low voltage to the output $D_{0OUT}$. The two alternatives just provided are for the case when LX[0] is true; however, if LX[0] is false, then its complement L[0] is true, thereby enabling n-channel transistor $300_{NCH0}$ (while n-channel transistor $300_{NCH0}$ remains disabled). In this case, the data to sub-circuit $300_0$ is not provided by input $D_{0IN}$, but instead it is provided by input $D_{1IN}$, and in inverted form due to inverter $300_{INV2}$. Thus, when LX[0] is false, there is a shift of data one bit position to the right. With the data as provided by input $D_{1IN}$, it will either discharge node $300_{N0}$ if that data is high and thus inverted to a low via inverter $300_{INV2}$, or it will leave the precharge voltage on node $300_{N0}$ undisturbed if that data is low and thus inverted to a high via inverter $300_{INV2}$.

Figure 17:
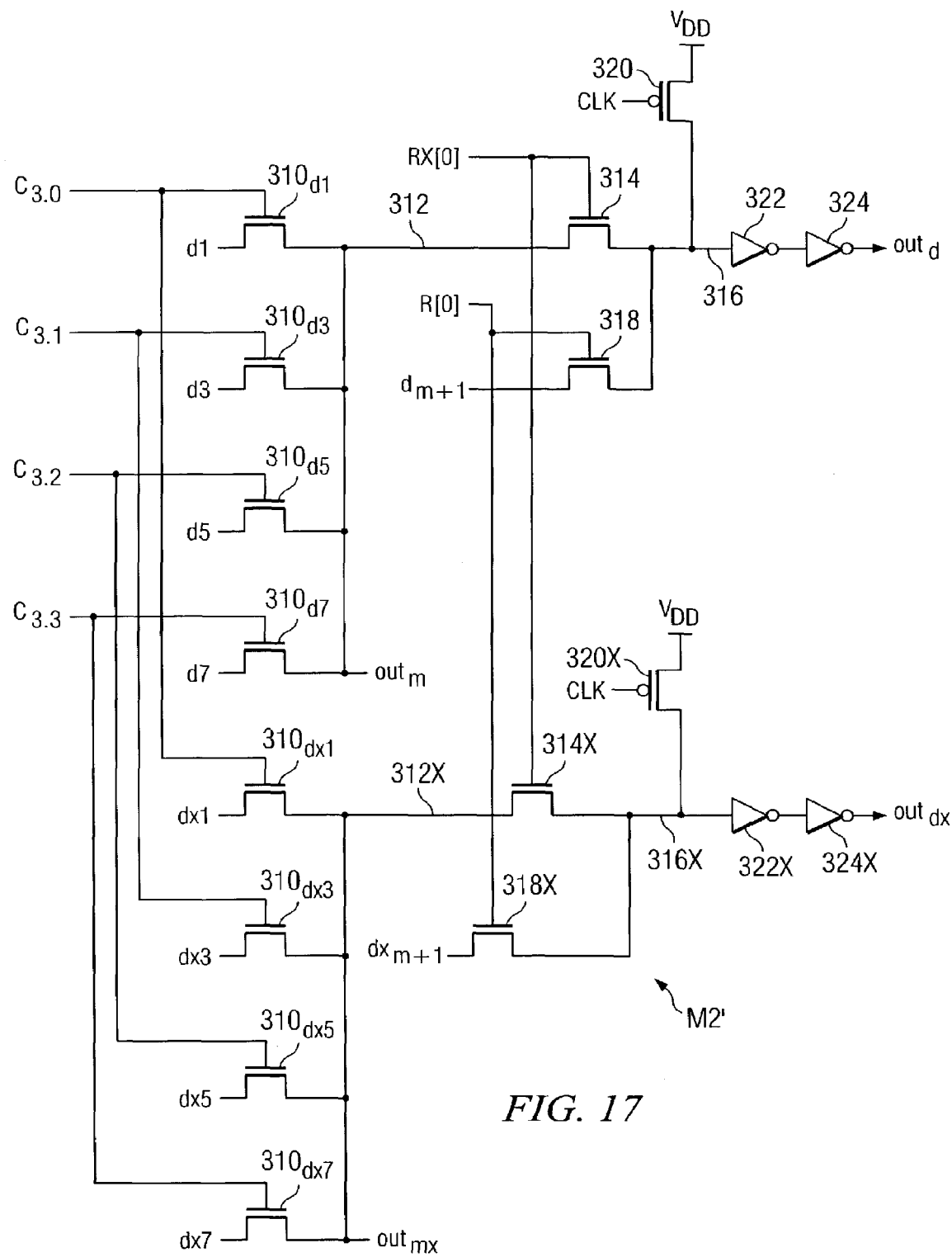
FIG. 17 illustrates a schematic of one multiplexer M2' of ROTATE STAGE 2' from FIG. 15.

FIG. 17 illustrates a schematic of one multiplexer M2' of the ROTATE STAGE 2' from FIG. 15. One skilled in the art should appreciate that the same circuitry as shown in FIG. 17 for multiplexer M2' is duplicated 31 times to provide a total of 32 multiplexers for the ROTATE STAGE 2'. The total set of 32 multiplexers is therefore operable to accommodate a 32-bit input and to rotate it in various manners. By way of introduction, a first rotation occurs in that the data inputs are right-rotated one bit position to accommodate the "+1" aspect of Equation 1, where that aspect was introduced earlier. Further, a right rotation possibility of 0, 2, 4, or 6 bit positions occurs based on the control signal, $C_3$, and another rotation possibility of one bit position occurs based on the value of L[0]. Thus, multiplexer M2' right rotates its input from 1 to 8 bit positions. Each of these aspects is further detailed below. Lastly, in FIG. 17, the dual rail signals are shown for the illustrated multiplexer M2'.

Looking more specifically to the connections and devices of multiplexer M2', it includes four data inputs d1, d3, d5, and d7, where the "d" indicates data and the number indicates a relative bit offset from the multiplexer. Looking first to input d1, it has an offset of one bit position, meaning this input receives a bit that is right-rotated one bit position relative to the output from ROTATE STAGE 1', and it is then provided as an input d1 to multiplexer M2'. This one bit position rotation, therefore, is a hardwire implementation of the "+1" aspect of Equation 1, that is, for all data bits output from ROTATE STAGE 1' to ROTATE STAGE 2', each of those bits is necessarily right-rotated one bit position. Continuing with input d3, it has an offset of three bit positions, meaning this input receives a bit that is right-rotated three bit positions relative to the output from ROTATE STAGE 1'. One of these three bit positions accommodates the hardwiring of the "+1" aspect of Equation 1, while the remaining two bit positions represent a potential right-rotation due to the state of $C_3$ and, more particularly, due to the state of $C_{3,2}$. In a comparable manner but for greater potential offsets, input d5 has an offset of five bit positions relative to the output from ROTATE STAGE 1' and input d7 has an offset of seven bit positions relative to the output from ROTATE STAGE 1'. Lastly, dual rail inputs dXn are provided for each respective input dn.

Each data input dn is connected to a first source/drain of a respective n-channel transistor $310_{dn}$, and each data input dXn is connected to a first source/drain of a respective n-channel transistor $311_{dXn}$. The gate of n-channel transistor $310_{d1}$ is connected to receive the control signal $C_{3,0}$, which is intended to serve the same function as provided from the static embodiment FIG. 12 and which is shown later in a dynamic logic embodiment, and which in any event corresponds to an additional right rotation of 0 bit positions, that is, zero rotations in addition to the one hardwired rotation described above. The gate of n-channel transistor $310_{d3}$ is connected to receive the control signal $C_{3,1}$, which corresponds to a right rotation of 2 additional bit positions. The gate of n-channel transistor $310_{d5}$ is connected to receive the control signal $C_{3,2}$, which corresponds to a right rotation of 4 additional bit positions. The gate of n-channel transistor $310_{d7}$ is connected to receive the control signal $C_{3,3}$, which corresponds to a right rotation of 6 additional bit positions. The second source/drain of each n-channel transistor $310_{dn}$ is connected to a node 312. Symmetric connections are made for each dual-rail input dXn to a first source/drain of a corresponding n-channel transistor $310_{dXn}$, and the second source/drain of each n-channel transistor $310_{dXn}$ is connected to a node 312X.

Node 312 is connected to a first source/drain of an n-channel transistor 314 that has its gate connected to bit RX[0] of the R shift argument value, and the second source drain of n-channel transistor 314 is connected to a node 316. Node 316 is also connected to a first source/drain of an n-channel transistor 318 that has its gate connected to bit R[0] of the R shift argument value and its second source/drain connected to a data bit input $d_{m+1}$. Data bit input $d_{m+1}$ is intended to depict an output from the multiplexer just to the left of multiplexer M2' (not expressly shown), where that specific output is from the first set of n-channel transistors that are comparable to n-channel transistors $310_{d1}$ through $310_{d7}$ in FIG. 17. In other words, as shown below, data input $d_{m+1}$ can be selected to achieve an additional right rotation of one bit position, so to achieve that one bit rotation the data is provided from the multiplexer just to the left of multiplexer M2'; however, input $d_{m+1}$ is not from the final output of that to-the-left multiplexer, but instead it is taken from the node that is comparable to node 312 in FIG. 17. Indeed, also in FIG. 17, note that node 312 provides an output $out_m$ (and node 312X provides a dual rail output $out_{mX}$). This output is therefore available to the multiplexer that is immediately to the right of multiplexer M2' to serve a comparable value to that received by the illustrated input $d_{m+1}$. As a result of this connection, the one-bit right rotation achieved via n-channel transistor 318 is in addition to either a 0, 2, 4, or 6 bit right rotation achieved via the first group of n-channel transistors in the multiplexer immediately to the left of multiplexer M2'. Node 316 is also connected to the drain of a p-channel transistor 320 which has its gate connected to the CLK signal and its source connected to $V_{DD}$. Further, node 316 is connected to the input of an inverter 322 that has its output connected to the input of an inverter 324. The output of inverter 324 provides one of the dual rail outputs of multiplexer M2'.

The operation of multiplexer M2' is now described, and it might well be readily understood given the various functional descriptions provided above with respect to the connections of the Figure as well as the understood operation of the ROTATE STAGE 2'. During the precharge phase, CLK is low and p-channel transistors 320 and 320X are enabled, thereby precharging nodes 316 and 316X, respectively. During the evaluate phase, CLK transitions high, and in response to the various select signals and the data, one of these two precharged nodes 316 and 316X is discharged. First, recall that one of the four signals $C_{3,x}$ of $C_3$ is asserted, and that asserted signal enables the n-channel transistor $310_{dx+1}$ to which it is connected; the data dn connected to the enabled transistor is thereby connected to node 312 and is also available at the output $out_m$ to the multiplexer located at one bit position to the right of multiplexer M2' (while the complementary data dXn is connected to node 312X and which also provides $out_{mx}$ to the multiplexer located at one bit position to the right of multiplexer M2'). Next, the state of R[0] enables only one of n-channel transistors 314 or 318, that is, if RX[0] is true, then n-channel transistor 314 is enabled, whereas if RX[0] is false, then its complement R[0] enables n-channel transistor 318. In the former case, the data at node 312 is connected to node 316, and in the latter case the data, $d_{m+1}$, is connected to node 316. In either event, if the connected data is low, it thereby discharges the precharge voltage at node 316. Finally, the voltage at node 316, whether remaining precharged or whether discharged, is inverted twice and provided as the output $out_{d+1}$, thereby presenting an active low signal.

Figure 18:
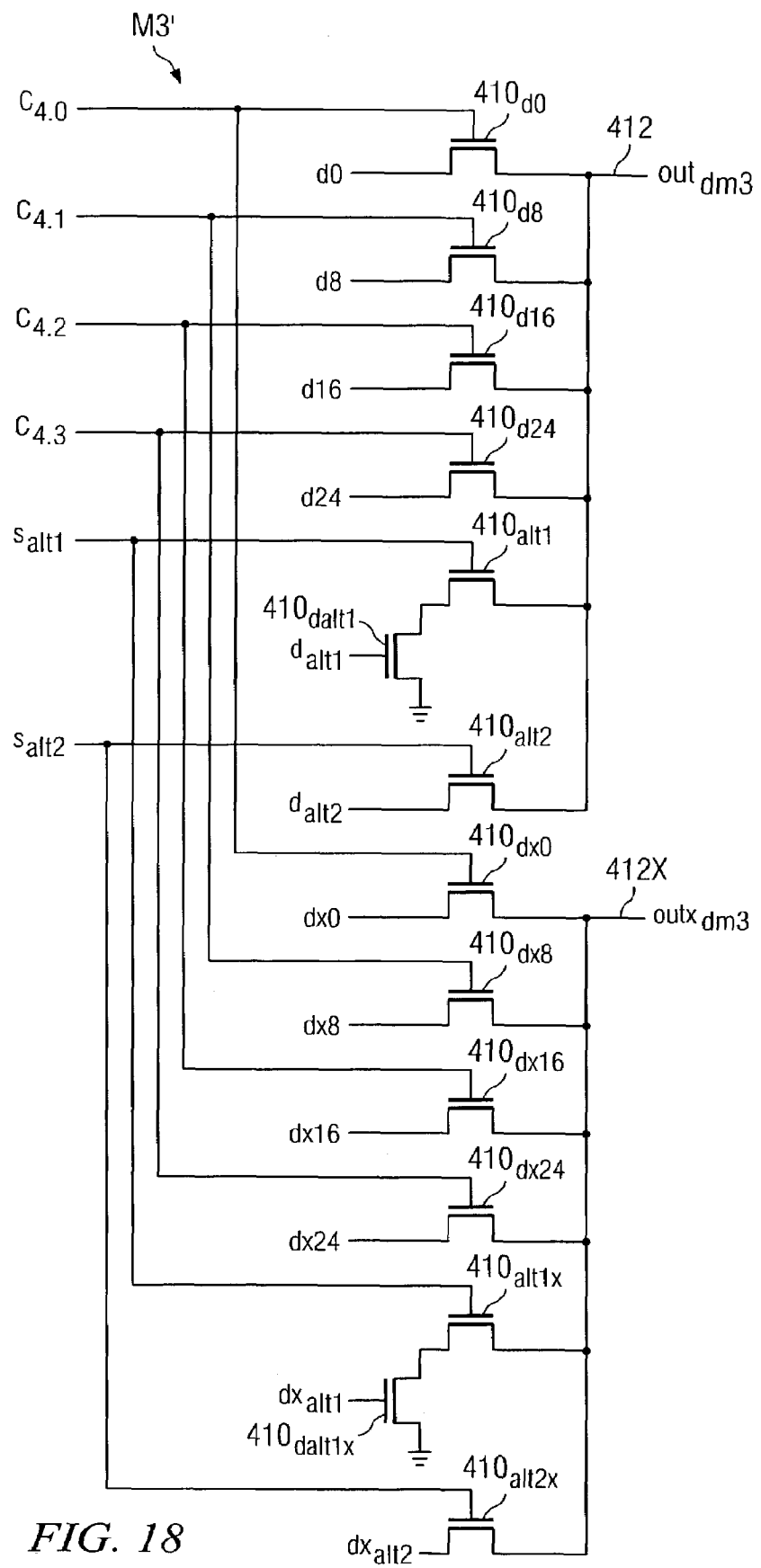
FIG. 18 illustrates a schematic of one multiplexer M3' of ROTATE STAGE 3' from FIG. 15.

FIG. 18 illustrates a schematic of one multiplexer M3' of the ROTATE STAGE 3' from FIG. 15, and one skilled in the art should appreciate therefore that the same circuitry as shown in FIG. 18 for multiplexer M3' is duplicated 31 times to provide a total of 32 multiplexers in the ROTATE STAGE 3'. The total set of 32 multiplexers is operable to accommodate a 32-bit input and to either pass that input directly through to the respective output of each multiplexer, or to rotate it 0, 8, 16, or 24 bit positions to the right. Lastly, in FIG. 18, the dual rail signals are shown for the illustrated multiplexer M3'.

Looking more specifically to the connections and devices of multiplexer M3', it includes four data inputs d0, d8, d16, and d24, where the "d" indicates data and the number indicates a relative bit offset from the multiplexer. More particularly, input d0 has no offset from multiplexer M3', but input d8 is data that is offset by 8 bit positions so that it can be selected to achieve a right rotation of 8 bit positions. In other words, the input d8 is the same bit that would be an input d0 to another multiplexer in ROTATE STAGE 3' that is 8 bit positions to the left of multiplexer M3'. Similarly, therefore, input d16 is data that is offset by 16 bit positions so that it can be selected to achieve a right rotation of 16 bit positions, and input d24 is data that is offset by 24 bit positions so that it can be selected to achieve a right rotation of 24 bit positions. Lastly, dual rail inputs dXn are provided for each respective input dn. In addition to the preceding inputs, both rails also include two additional inputs, $d_{alt1}$ and $d_{alt2}$ (with respective dual rail signals $dX_{alt1}$ and $d_{alt2}$). These two additional inputs are included to demonstrate that multiplexer M3' may perform with respect to inputs that are not provided by the preceding ROTATE STAGE 2', but rather, are provided from some other circuit that still benefits from the functionality provided by multiplexer M3'.

Each data input dn is connected to a first source/drain of a respective n-channel transistor $410_{dn}$, and each data input dXn is connected to a first source/drain of a respective n-channel transistor $410_{dXn}$. The gate of n-channel transistor $410_{d0}$ is connected to receive the control signal $C_{4.0}$, which is intended to serve the same function as provided from the static embodiment FIG. 14 and which is shown later in a dynamic logic embodiment, and which in any event corresponds to a rotation shift of 0 bit positions. The gate of n-channel transistor $410_{d8}$ is connected to receive the control signal $C_{4.1}$, which corresponds to a right rotation of 8 bit positions. The gate of n-channel transistor $410_{d16}$ is connected to receive the control signal $C_{3.2}$, which corresponds to a right rotation of 16 bit positions. The gate of n-channel transistor $310_{d24}$ is connected to receive the control signal $C_{3.3}$, which corresponds to a right rotation of 24 bit positions. The second source drain of each n-channel transistor $410_{dn}$ is connected to a node 412. Symmetric connections are made for each dual-rail input dXn to a first source/drain of a corresponding n-channel transistor $410_{dXn}$, and the second source/drain of each n-channel transistor $410_{dXn}$ is connected to a node 412X. Also to contrast two different approaches, recall there are two additional data inputs, $d_{alt1}$ and $d_{alt2}$. The input $d_{alt1}$ is a gate-driving data bit, that is, it is connected to the gate of an n-channel transistor $410_{dalt1}$ that has its source connected to ground and its drain connected to a first source/drain of an n-channel transistor $410_{alt1}$. The gate of n-channel transistor $410_{alt1}$ is connected to $s_{alt1}$, and the second source/drain of n-channel transistor $410_{alt1}$ is connected to node 412. The input $d_{alt2}$ is a source-driving data bit, that is, it is connected to the source of an n-channel transistor $410_{dalt2}$ that has its gate connected to $s_{alt2}$ and its drain connected to node 412.

The operation of multiplexer M3' is now described, although it should be readily understood from the comparable operation of the front end portion of multiplexer M2' described above as well as the understood operation of the ROTATE STAGE 3'. When the preceding ROTATE STAGE 2' performs its evaluate phase, it passes active low data to multiplexer M3' of ROTATE STAGE 3'. These inputs are multiplexed together along with the additional inputs $d_{alt1}$ and $d_{alt2}$ that is, from the entire set of inputs, one at a time may be selected, either by the assertion of one of the signals $C_{4.x}$ or $s_{altx}$. Further in this regard, therefore, note that during a cycle wherein one of inputs $d_{alt1}$ and $d_{alt2}$ is to be selected, then none of the signals $C_{4.x}$ is asserted. In any event, therefore, the one input selected during a clock cycle and of the various input signals is connected to node 412, and its inverse is connected to node 412X.

Figure 19:
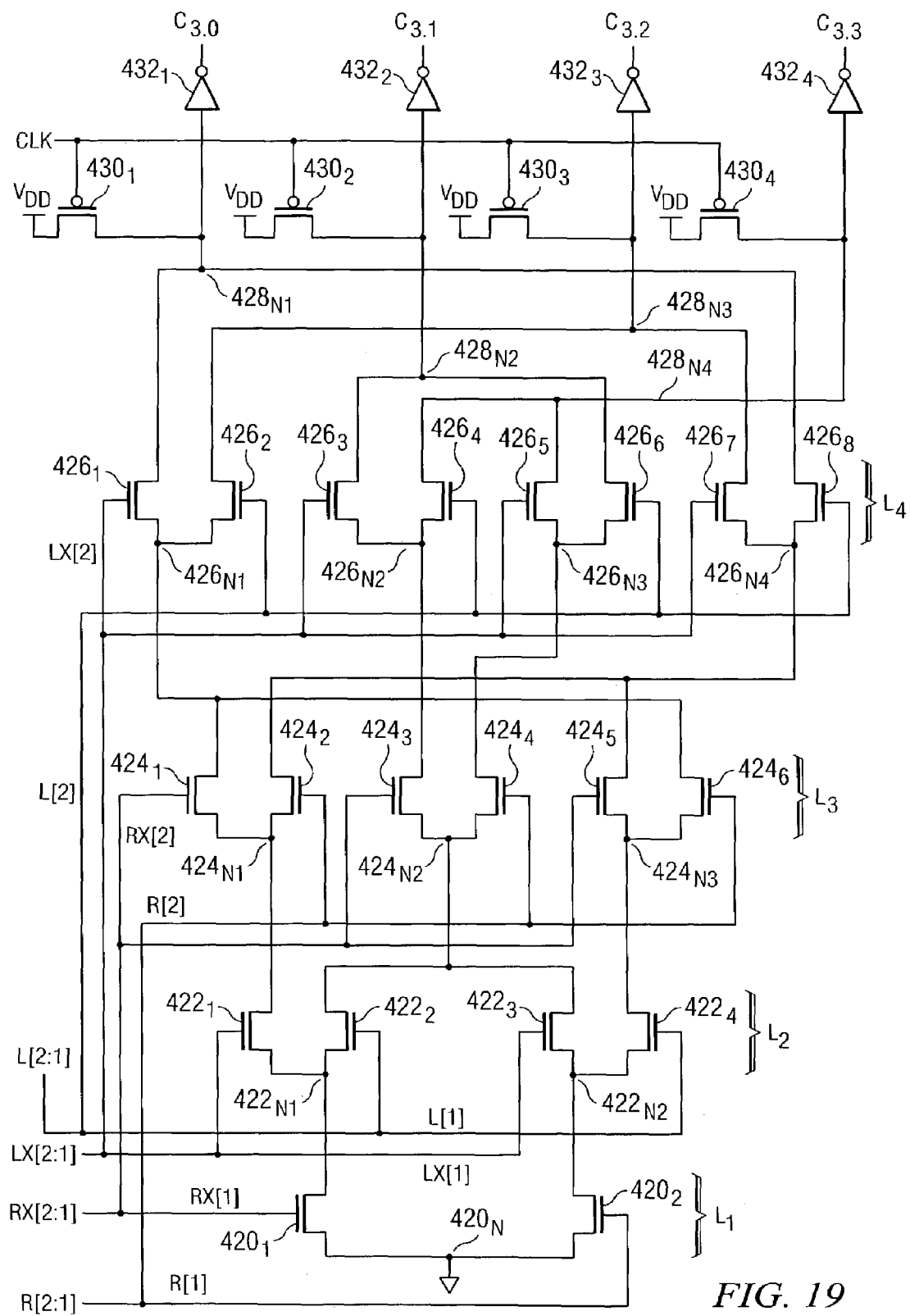
FIG. 19 illustrates a schematic of the preferred embodiment for implementing the portion of STAGE 2' CONTROLLER of FIG. 15, using dynamic logic, to properly decode the addition of L[2:1]+R[2:1].

FIG. 19 illustrates a schematic of the preferred embodiment for implementing the portion of STAGE 2' CONTROLLER of FIG. 15, using dynamic logic, to properly decode the addition of L[2:1]+R[2:1]. For purposes of discussion, consider that the schematic of FIG. 19 includes four levels $L_1$, $L_2$, $L_3$, and $L_4$ of transistors, where such a structure is further appreciated also with the operational description provided later.

Starting at the bottom of FIG. 19 with level $L_1$, the schematic includes two n-channel transistors, each having a source connected to a node 420N, which is connected to ground. The gate of n-channel transistor $420_1$ is connected to RX[1] and its drain is connected to a node 422N1. The gate of n-channel transistor $420_2$ is connected to R[1] and its drain is connected to a node 422N2.

The next level upward from the bottom of FIG. 19, level $L_2$, includes four n-channel transistors $422_1$, $422_2$, $422_3$, and $422_4$. The sources of n-channel transistors $422_1$ and $422_2$ are connected to node 422N1, and the sources of n-channel transistors $422_3$ and $422_4$ are connected to node 422N2. The gates of n-channel transistors $422_1$ and $422_3$ are connected to LX[1], and the gates of n-channel transistors $422_2$ and $422_4$ are connected to L[1]. The drain of n-channel transistor $422_1$ is connected to a node 424N1, the drains of n-channel transistors $422_2$ and $422_3$ are connected to a node 424N2, and the drain of n-channel transistor $422_3$ is connected to a node 424N3.

The next level upward from the bottom of FIG. 19, level $L_3$, includes six n-channel transistors $424_1$, $424_2$, $424_3$, $424_4$, $424_5$, and $424_6$. The sources of n-channel transistors $424_1$ and $424_2$ are connected to node 424N1, the sources of n-channel transistors $424_3$ and $424_4$ are connected to node 424N2, and the sources of n-channel transistors $424_5$ and $424_6$ are connected to node 424N3. The gates of n-channel transistors $424_1$, $424_3$, and $424_5$ are connected to RX[2], and the gates of n-channel transistors $424_2$, $424_4$, and $424_6$ are connected to R[2]. The drain of n-channel transistors $424_1$ and $424_6$ are connected to a node 426N1, the drains of n-channel transistors $424_2$ and $424_5$ are connected to a node

426N4, the drain of n-channel transistor $424_3$ is connected to a node 426N2, and the drain of n-channel transistor $424_4$ is connected to a node 426N3.

The top level of FIG. 19, level $L_4$, includes eight n-channel transistors $426_1$, $426_2$, $426_3$, $426_4$, $426_5$, $426_6$, $426_7$, and $426_8$. The gates of n-channel transistors $426_1$, $426_3$, $426_5$, and $426_7$ are connected to LX[2], and the gates of n-channel transistors $426_2$, $426_4$, $426_6$, and $426_8$ are connected to L[2]. The sources of n-channel transistors $426_1$ and $426_2$ are connected to node 426N1, the sources of n-channel transistors $426_3$ and $426_4$ are connected to node 426N2, the sources of n-channel transistors $426_5$ and $426_6$ are connected to node 426N3, and the sources of n-channel transistors $426_7$ and $426_8$ are connected to node 426N4. The drains of n-channel transistors $426_7$ and $426_8$ are connected to a node 428N1, the drains of n-channel transistors $426_3$ and $426_6$ are connected to a node 428N2, the drains of n-channel transistors $426_2$ and $426_7$ are connected to a node 428N3, and the drains of n-channel transistors $426_4$ and $426_5$ are connected to a node 428N4. Each of nodes 428N1, 428N2, 428N3 and 428N4 is connected to a drain of a respective p-channel transistor $430_1$, $430_2$, $430_3$ and $430_4$, and the gate of each of p-channel transistors $430_1$, $430_2$, $430_3$ and $430_4$ is connected to CLK while the sources of those p-channel transistors are connected to $V_{DD}$. Lastly, each of nodes 428N1, 428N2, 428N3 and 428N4 is connected to an input of a respective inverter $432_1$, $432_2$, $432_3$ and $432_4$, where the outputs of those inverters provide the respective signals $C_{3.0}$, $C_{3.1}$, $C_{3.2}$, and $C_{3.3}$.

The operation of the schematic of FIG. 19 is now described. First, recall that the function of the multi-level structure of FIG. 19 is to decode the sum of L[2:1]+R[2:1], where L is externally inverted so as to achieve LX in the Equation 1 aspect of LX+R+1; for each possible input for those values, the structure should produce a modulo 4 output. More particularly, if the modulo 4 sum is 0 then output $C_{3.1}$ is asserted, if the modulo 4 sum is 1 then output $C_{3.2}$ is asserted, if the modulo 4 sum is 2 then output $C_{3.3}$ is asserted, and if the sum is 3 then output $C_{3.4}$ is asserted. By way of further introduction, the following Table 6 illustrates the sum for each possible input of L[2:1] and R[2:1], given the decimal values of L[2:1] and R[2:1].

TABLE 6

|  | L[2:1] = 0 | L[2:1] = 1 | L[2:1] = 2 | L[2:1] = 3 |
|---|---|---|---|---|
| R[2:1] = 0 | 0 | 1 | 2 | 3 |
| R[2:1] = 1 | 1 | 2 | 3 | 0 |
| R[2:1] = 2 | 2 | 3 | 0 | 1 |
| R[2:1] = 3 | 3 | 0 | 1 | 2 |

Figure 20:
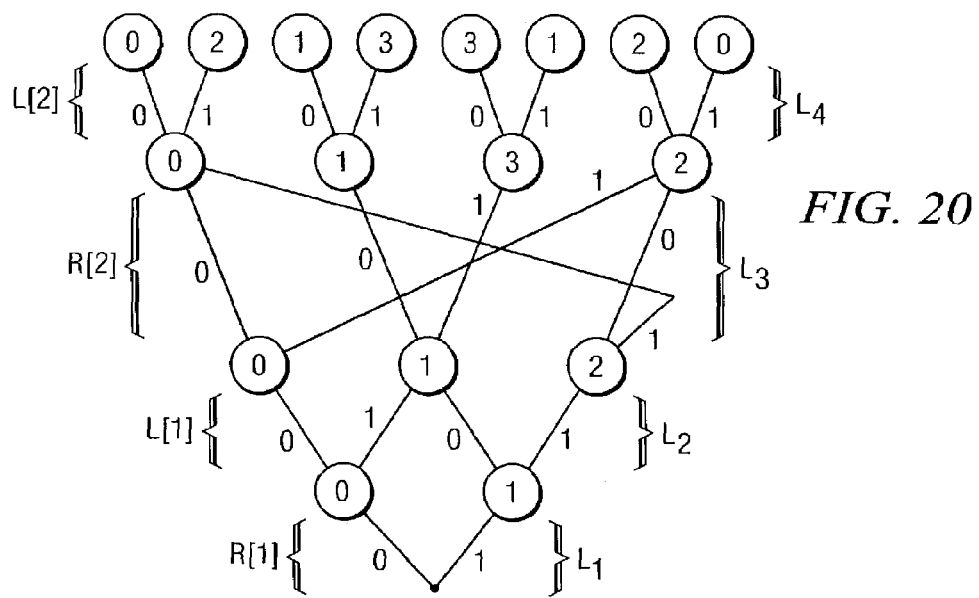
FIG. 20 illustrates a graphical depiction of the operation of the multi-level structure of FIG. 19.

For further demonstrating the operation of the schematic of FIG. 19, the description is further facilitated with reference to the functional diagram of FIG. 20. FIG. 20 represents the same multi-level structure of FIG. 19, but rather than depicting individual transistors at each level, the sum provided by enabling each given transistor is provided. Further, at each point in the structure, there is shown a path to the left and a path to the right. The path to the left represents the resulting operation of a transistor in FIG. 20 when the input bit is 0, whereas the path to the right represents the resulting operation of a transistor in FIG. 20 when the input bit is 1. For example, looking at level 0, then if the input bit, R[1], equals 0, then the structure conducts toward the left path, which at that point indicates that the one input then considered, namely R[1], has provided a total as shown in the circle at the end of the path, that is, equal to 0.

Looking back to FIG. 19, the left path in level $L_1$ of FIG. 20 corresponds to n-channel transistor $420_1$ being enabled because R[1]=0 and thus RX[1]=1, at which point it couples node 420N to node 422N1. Alternatively in FIG. 20 and looking still at level $L_1$, then if the input bit R[1] equals 1, then the tree structure conducts toward the right path, which at that point indicates that the one input then considered, namely R[1], has provided a total as shown in the circle at the end of the path, that is, equal to 1. Looking back to FIG. 19, the right path in level $L_1$ of FIG. 20 corresponds to n-channel transistor $420_2$ being enabled because R[1]=1, at which point it couples node 420N to node 422N2. This same flow continues for each additional level, taking into account the additional one-bit input for that level, with level $L_2$ considering L[1], level $L_3$ considering R[2], and level $L_4$ considering L[2]. Various examples are provided below to further demonstrate this operation.

Consider the case of Table 6 where L[2:1]=R[2:1]=00 (i.e., both equal decimal zero), as with respect to FIGS. 20 and 19. At level $L_1$, R[1]=0, and thus flow continues along the left branch to the level $L_1$ circle with a sum of 0. Next, at level $L_2$, L[1]=0, and thus flow continues along the left branch to the level $L_2$ circle with a sum of 0. Thus, at this point, the LSB of both L[2:1] and R[2:1] have been summed to the value of 0, as shown in the level $L_2$ circle with a sum of 0. Next, at level $L_3$, R[2]=0, and thus flow continues along the left branch to the level $L_3$ circle with a sum of 0. Finally, at level $L_4$, L[2]=0, and thus flow continues along the left branch to the level $L_4$ circle with a sum of 0. Looking back to FIG. 19, in the precharge phase, CLK is asserted, thereby precharging each of nodes 428N1, 428N2, 428N3, and 428N4; then in the evaluate phase, and in the same relative manner as was described with respect to FIG. 20, the states of L[2:1]=R[2:1]=00 create only one conductive path all the way from ground to the top level in FIG. 19, namely, through n-channel transistors $420_1$, $422_1$, $424_1$, and $426_1$. Thus, node 428N1 is discharged through this path, and that falling signal is inverted by inverter $432_1$, thereby providing an asserted high signal at $C_{3.0}$, while the other outputs $C_{3.1}$, $C_{3.2}$, and $C_{3.3}$ remain low (because the respective precharge nodes for those signals remain charged and inverted by the respective inverters $423_2$, $423_3$, and $432_4$).

Now consider the case of Table 6, where L[2:1]=00 (i.e., decimal 0) and R[2:1]=11 (i.e., decimal 3), as with respect to FIGS. 20 and 19. At level $L_1$, R[1]=1, and thus flow continues along the right branch to the level $L_1$ circle with a sum of 1. Thus, at this point, the one bit that has been considered totals 1. Next, at level $L_2$, L[1]=0, and thus flow continues along the left branch to the level $L_2$ circle with a sum of 1. Thus, at this point, the LSB of both L[2:1] and R[2:1] have been summed to the value of 1, as shown in the level $L_2$ circle with a sum of 1. Next, at level $L_3$, R[2]=1, and thus flow continues along the right branch to the level $L_3$ circle with a sum of 3; note here that because this level is considering the second bit in the shift argument R, then that bit represents a value times 2, and since the bit equals one then it represents a decimal value of 2; accordingly, this decimal value of 2 added with the previous value of 1 provides a total of 3, as shown in the level $L_3$ circle. Finally, at level $L_4$, L[2]=0, and thus flow continues along the left branch to the level $L_4$ circle with a sum of 3. Looking to the corresponding operation in FIG. 19, after the precharge phase wherein nodes 428N1, 428N2, 428N3, and 428N4 are precharged, then in the evaluate phase, and in the same relative manner as was described with respect to FIG. 20, the states of L[2:1]=00 and R[2:1]=11 create only one conductive path all the way from ground to the top level in FIG. 19, namely, through n-channel transistors $420_2$, $422_3$, $424_4$, and $426_5$. Thus, node 428N4 is discharged through this path, and that falling signal is inverted by inverter $432_4$, thereby providing an asserted high signal at $C_{3.3}$, while the other outputs $C_{3.0}$, $C_{3.1}$, and $C_{3.2}$ remain low.

As a final example, consider the case of Table 6, where L[2:1]=01 (i.e., decimal 1) and R[2:1]=11 (i.e., decimal 3); in a decimal total, this sum equals 4, but recall the encoder is modulo 4 and, hence, the sum provided should be 0. Such a sum and its operation with respect to FIGS. 20 and 19 are now confirmed. At level $L_1$, R[1]=1, and thus flow continues along the right branch to the level $L_1$ circle with a sum of 1. Thus, at this point, the one bit that has been considered totals 1. Next, at level $L_2$, L[1]=1, and thus flow continues along the right branch to the level $L_2$ circle with a sum of 2. Thus, at this point, the LSB of both L[2:1] and R[2:1] have been summed to the value of 2, as shown in the level $L_2$ circle with a sum of 2. Next, at level $L_3$, R[2]=1, and thus flow continues along the right branch to the level $L_3$ circle with a sum of 0; note here that because this level has added 2 to the previous sum of 2, then the result of 4 is returned modulo 4 to a value of 0, as shown in the level $L_3$ circle. Finally, at level $L_4$, L[2]=0, and thus flow continues along the left branch to the level $L_4$ circle with a sum of 0. Looking to the corresponding operation in FIG. 19, after the precharge phase wherein nodes 428N1, 428N2, 428N3, and 428N4 are precharged, then in the evaluate phase, and in the same relative manner as was described with respect to FIG. 20, the states of L[2:1]=01 and R[2:1]=11 create only one conductive path all the way from ground to the top level in FIG. 19, namely, through n-channel transistors $420_2$, $422_4$, $424_6$, and $426_1$. Thus, node 428N1 is discharged through this path, and that falling signal is inverted by inverter $432_1$, thereby providing an asserted high signal at $C_{3.0}$, while the other outputs $C_{3.1}$, $C_{3.2}$, and $C_{3.3}$ remain low.

Figure 21:
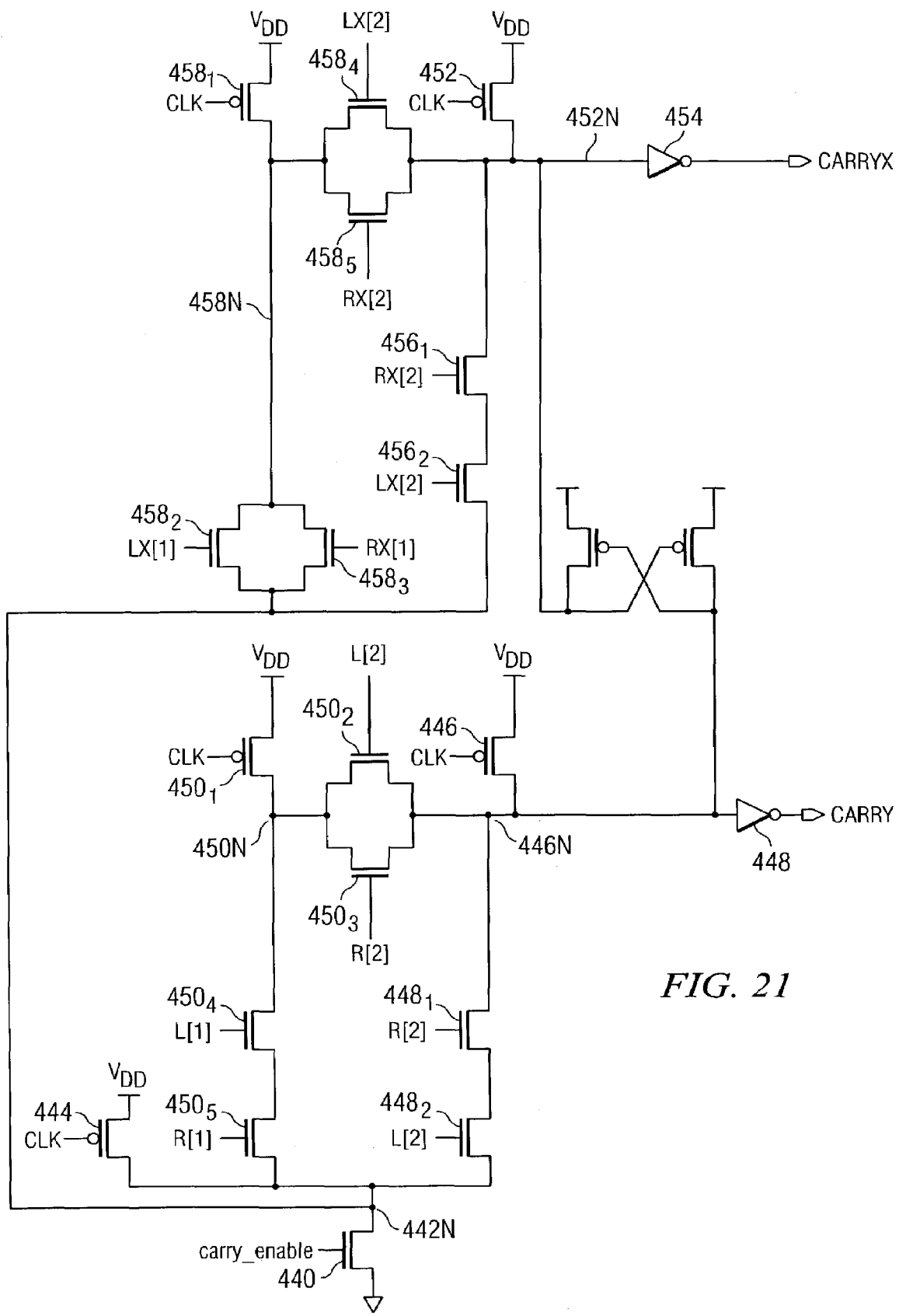
FIG. 21 illustrates a schematic of a preferred embodiment dynamic logic structure for realizing the carry generator for the STAGE 2' controller of FIG. 15.

FIG. 21 illustrates a schematic of a preferred embodiment dynamic logic structure for implementing the carry generator for the STAGE 2' CONTROLLER of FIG. 15, that is, to generate both the CARRY and CARRYX signals for use by the STAGE 3' CONTROLLER. In general, FIG. 21 provides a network of devices for realizing the logic of Equations 14 and 16c, derived above. In addition, a carry enable feature is provided so that the entire structure may be disabled when the carry generation feature is not desired, such as when the ROTATE STAGE 3' is to operate with respect to inputs other than from the ROTATE STAGE 2'. With respect to the carry enable feature, it is enabled by an n-channel transistor 440 that has its source connected to ground, its gate connected to a control signal carry_enable, and its drain connected to a node 442N. Node 422N is also connected to a drain of a p-channel transistor 444 that has its gate connected to CLK and its source connected to $V_{DD}$.

Turning to the circuitry for generating the CARRY signal, it includes a p-channel transistor 446 having a source connected to $V_{DD}$, a gate connected to CLK, and a drain connected to a node 446N, which is connected to the input of an inverter 448. The output of inverter 448 provides the CARRY signal. Two n-channel transistors $448_1$ and $448_2$ have their source/drain conductive paths connected in series between nodes 446N and 442N, and their respective gates are connected to R[2] and L[2]. An additional p-channel transistor $450_1$ has its source connected to $V_{DD}$, its gate connected to CLK, and its drain connected to a node 450N. Two n-channel transistor $450_2$ and $450_3$ have their source/drain conductive paths connected in parallel between nodes 450N and 446N, with the gate of n-channel transistor $450_2$ connected to L[2] and the gate of n-channel transistor $450_3$ connected to R[2]. Two n-channel transistors $450_4$ and $450_5$ have their source/drain conductive paths connected in series between nodes 450N and 442N, and their respective gates are connected to L[1] and R[1].

The operation of the circuitry for generating the CARRY signal in FIG. 21 will be understood by one skilled in the art given the elements of Equation 14. Particularly, n-channel transistors $448_1$ and $448_2$ provide the function of (L[2] AND R[2]) in that, after the precharge phase wherein node 446N is precharged and assuming the carry_enable is asserted, then node 446N is discharged during the evaluate phase if that function is met, thereby enabling those two n-channel transistors. Alternatively, n-channel transistors $450_2$, $450_3$, $450_4$, and $450_5$ provide the function of [(L[2] OR R[2]) AND (L[1] AND R[1])], where if either n-channel transistor $450_2$ or $450_3$ is enabled while at the same time both n-channel transistors $450_4$ and $450_5$ are enabled, then node 446N is discharged. In any event, if node 446N is discharged, then the output of inverter 448 rises, thereby asserting the CARRY signal.

Turning to the circuitry for generating the CARRYX signal, it includes a p-channel transistor 452 having a source connected to $V_{DD}$, a gate connected to CLK, and a drain connected to a node 452N, which is connected to the input of an inverter 454. The output of inverter 454 provides the CARRYX signal. Two n-channel transistors $456_1$ and $456_2$ have their source/drain conductive paths connected in series between nodes 452N and 442N, and their respective gates are connected to RX[2] and LX[2]. An additional p-channel transistor $458_1$ has its source connected to $V_{DD}$, its gate connected to CLK, and its drain connected to a node 458N. Two n-channel transistor $458_2$ and $458_3$ have their source/drain conductive paths connected in parallel between nodes 458N and 442N, with the gate of n-channel transistor $458_2$ connected to LX[1] and the gate of n-channel transistor $458_3$ connected to RX[1]. Two n-channel transistor $458_4$ and $458_5$ have their source/drain conductive paths connected in parallel between nodes 452N and 458N, with the gate of n-channel transistor $458_4$ connected to LX[2] and the gate of n-channel transistor $458_5$ connected to RX[2].

The operation of the circuitry for generating the CARRYX signal in FIG. 21 will be understood by one skilled in the art given the elements of Equation 16c. Particularly, n-channel transistors $456_1$ and $456_2$ provide the function of (LX[2] AND RX[2]) in that, after the precharge phase wherein node 452N is precharged and assuming the carry_enable is asserted, then node 452N is discharged during the evaluate phase if that function is met, thereby enabling those two n-channel transistors. Alternatively, n-channel transistors $458_2$, $458_3$, $458_4$, and $458_5$ provide the function of [(LX[2] OR RX[2]) AND (LX[1] OR RX[1])], where if either n-channel transistor $458_2$ or $458_3$ is enabled while at the same time either n-channel transistor $458_4$ or $458_5$ is enabled, then node 452N is discharged. In any event, if node 452N is discharged, then the output of inverter 454 rises, thereby asserting the CARRYX signal.

Figure 22:
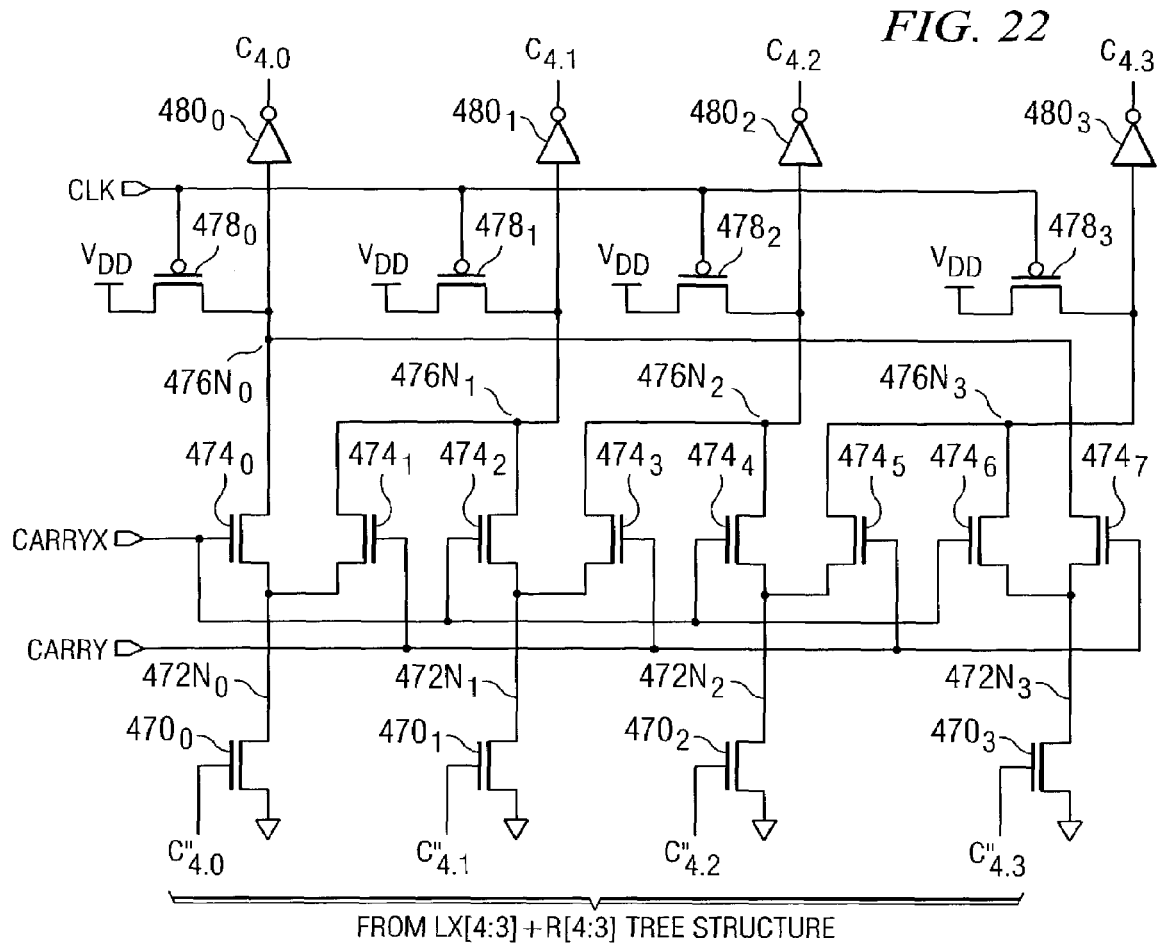
FIG. 22 illustrates a schematic of a portion of the preferred embodiment for implementing the portion of the STAGE 3' CONTROLLER of FIG. 15, using dynamic logic, to properly decode the addition of L[4:3]+R[4:3].

FIG. 22 illustrates a schematic of a portion of the preferred embodiment for implementing the portion of the STAGE 3' CONTROLLER of FIG. 15, using dynamic logic, to properly decode the addition of L[4:3]+R[4:3]. Note that only a portion is shown in that an additional portion is identical to that of the multi-level structure schematic of FIG. 19 with respect to the STAGE 2' CONTROLLER, but instead of inputting L[2:1] and R[2:1] as was the case for that Figure the portion not shown in FIG. 22 inputs L[4:3] and R[4:3]. Accordingly, consider that the schematic of FIG. 19 is duplicated for the preferred embodiment STAGE 3'

CONTROLLER in FIG. 22, but assume also that the outputs of the output inverter stage of the FIG. 19 circuit (i.e., comparable to that of inverters $432_1$ through $432_4$) are designated $C_{4.0}''$, $C_{4.1}''$, $C_{4.2}''$, and $C_{4.3}''$; thus, only one of those outputs is asserted at a time and in response to the modulo 4 sum of L[4:3]+R[4:3]. As shown in FIG. 22, these signals $C_{4.0}''$, $C_{4.1}''$, $C_{4.2}''$, and $C_{4.3}''$ are provided as inputs to the remaining circuitry therein.

Continuing with the schematic of FIG. 22, each of the signals $C_{4.0}''$, $C_{4.1}''$, $C_{4.2}''$, and $C_{4.3}''$ is connected to the gate of a respective n-channel transistor $470_0$, $470_1$, $470_2$, and $470_3$, where each of those n-channel transistors has its source connected to ground and its drain connected to a respective node $472N_0$, $472N_1$, $472N_2$, and $472N_3$. Node $472N_0$ is connected to the source of an n-channel transistor $474_0$ and the source of an n-channel transistor $474_1$, node $472N_1$ is connected to the source of an n-channel transistor $474_2$ and the source of an n-channel transistor $474_3$, node $472N_2$ is connected to the source of an n-channel transistor $474_4$ and the source of an n-channel transistor $474_5$, and node $472N_3$ is connected to the source of an n-channel transistor $474_6$ and the source of an n-channel transistor $474_7$. The gates of each of n-channel transistors $474_0$, $474_2$, $474_4$, and $474_6$ are connected to CARRYX, and the gates of each of n-channel transistors $474_1$, $474_3$, $474_5$, and $474_7$ are connected to CARRY. The drains of n-channel transistors $474_0$ and $474_7$ are connected to a node $476N_0$, the drains of n-channel transistors $474_1$, and $474_2$ are connected to a node $476N_1$, the drains of n-channel transistors $474_3$ and $474_4$ are connected to a node $476N_2$, and the drains of n-channel transistors $474_5$ and $474_6$ are connected to a node $476N_3$. Each node $476N_0$, $476N_1$, $476N_2$, and $476N_3$ is connected to the drain of a respective p-channel transistor $478_0$, $478_1$, $478_2$, and $478_3$, and the drain of each of those p-channel transistors is also connected to an input of a respective inverter $480_0$, $480_1$, $480_2$, and $480_3$. The gates of all of those p-channel transistors $478_0$, $478_1$, $478_2$, and $478_3$ are connected to CLK, and the sources of all of those p-channel transistors are connected to $V_{DD}$. The outputs of inverters $480_0$, $480_1$, $480_2$, and $480_3$ provides respective control signals $C_{4.0}$, $C_{4.1}$, $C_{4.2}$ and $C_{4.3}$, to thereby control the ROTATE STAGE 3' as described above.

The operation of the schematic of FIG. 22 is now described. First, during a precharge phase, CLK goes low and each p-channel transistor $478_0$, $478_1$, $478_2$, and $478_3$ is enabled and thereby precharges its respective drain-connected node $476N_0$, $476N_1$, $476N_2$, and $476N_3$. Next, during the evaluate phase, only one of $C_{4.0}''$, $C_{4.1}''$, $C_{4.2}''$, and $C_{4.3}''$ is asserted in response to the addition of L[4:3]+R[4:3] as implemented in the multi-level structure (not explicitly shown). Consequently, the asserted one of $C_{4.0}''$, $C_{4.1}''$, $C_{4.2}''$, and $C_{4.3}''$ enables the one of n-channel transistors $470_0$, $470_1$, $470_2$, and $470_3$ to which it is connected. Further, however, either the CARRY or CARRYX signal will be asserted during the evaluate phase. If the CARRYX signal is asserted, then each node $476N_x$ is connected by the respective n-channel transistor $474_x$ to a respective node $472N_x$. However, if the CARRY signal is asserted, then note that the illustrated structure rotates the 4-bit input of $C_{4.0}''$, $C_{4.1}''$, $C_{4.2}''$, and $C_{4.3}''$ one bit position to the right. For example, if $C_{4.0}''$ is asserted while CARRY is also asserted, then n-channel transistor $474_1$ connects node $472N_0$ to node $476N_1$; that same high signal is then inverted by inverter $480_1$, thereby providing an active low signal for $C_{4.1}$. Similar examples of this right-shifting will be ascertainable by one skilled in the art.

The preceding has demonstrated an electronic processor operable in response to an instruction to efficiently rotate a data argument in response to left and right shift count arguments, without the need to separately shift the entire data argument fully in response to a first shift count followed by then separately shifting the entire data argument fully in response to a second shift count. Given this functionality, additional embodiments of such a processor are now described and achieve additional functions in combination with specific types of left and/or right shift operations. Each of these functions is preferably selected in response to a processor instruction, that is, when a given instruction is issued to processor 100 and when, in response, data rotate unit 200 operates in response to that instruction. Alternatively, the following also may be implemented in still other embodiments using data rotate unit 200', but for sake of simplicity the remaining embodiments are shown in connection with data rotate unit 200. Accordingly, the following discussion first describes various different data manipulation instructions and then is followed by block diagram figures that further augment data rotate unit 200 so as to implement the desired function in response to each such instruction.

A first instruction that may be executed by data rotate unit 200 in one embodiment is referred to herein as an EXTRACT instruction, as that term has heretofore been used in connection with certain DSPs previously sold by Texas Instruments Incorporated. As its name suggests, the EXTRACT instruction operates to extract a number of contiguous bits from a 32-bit data quantity and to place them into a 32-bit result, where the extracted bits are optionally preceded in the result by sign extensions (could instead be zeros) and, as detailed below, in some instances are followed in the result by trailing zeros. Further, the number of bits extracted as well as their positioning in the result are determined in response to the 5-bit left shift argument L and the 5-bit right shift argument R.

Returning to FIG. 1, it illustrates one example of the EXTRACT instruction for the 32-bit data value $V_1$, where in that example the right shift R is greater than the left shift L and, more particularly, R=10 and L=6. In an effort to appreciate the preferred embodiment, for the EXTRACT instruction note then that in the second shift, that is, the right shift, the resulting MSBs are sign extension bits that duplicate the single MSB from the left-shifted value $VL_1$. In other words, each of those bits matches the MSB after the left shift; thus, in the example illustrated, each sign extension bit matches bit D25, which was the most significant bit in $VL_1$ after the left shift of L=6. Second, the number of sign extension bits equals R bits, as a result of the fact that the right shift of R bits, in effect, shifts in R sign extension bits.

Returning to FIG. 2, it illustrates another example of the EXTRACT instruction for the 32-bit data value $V_1$, where in that example the right shift R is less than the left shift L and, more particularly, R=8 and L=16. Also in an effort to appreciate the preferred embodiment, some additional observations are now made with respect to FIG. 2. First, for the EXTRACT instruction, for the first shift, that is, the left shift, the LSBs are filled with zeros, that is, the left-shifted value $VL_1$ includes a number of least significant zeros equal to L. Second, in the second shift, that is, the right shift, and when L>R, then a number of these zeros equal to R are shifted out to provide the result $VR_1$. Thus, from the initial data argument, $V_2$, to the result $VR_1$, and in the case where L>R, then the number of least significant zero bits in the result $VR_1$ equals L−R. Given this latter observation, it also may be stated with respect to the preceding FIG. 1 example, where R>L, that no added least significant zero bits are included in the final result $VR_1$. In other words, if $L-R \leq 0$, then no added least significant zero bits are included in the final result $VR_1$.

Figure 23:
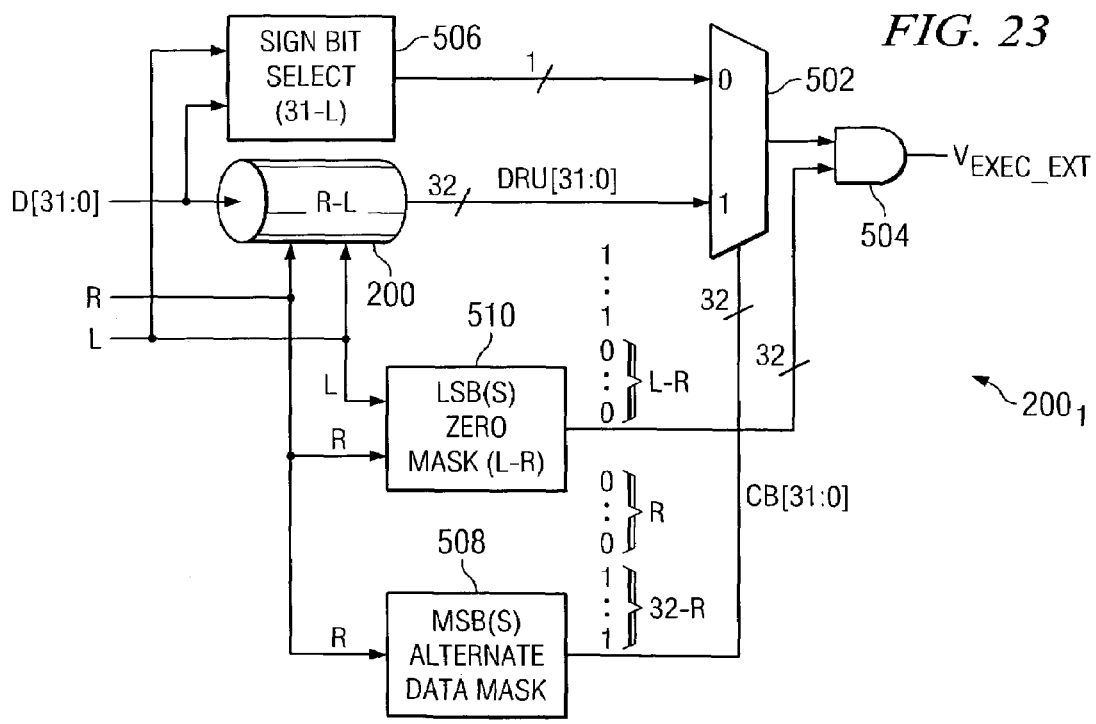
FIG. 23 illustrates a block diagram of a system for executing an EXTRACT instruction.

Given the preceding observations with respect to the EXTRACT instruction, FIG. 23 illustrates a block diagram of a preferred embodiment system $200_1$ for logically implementing those observations functionally in combination with data rotate unit 200 so as to achieve the desired results for the EXTRACT instruction. System $200_1$ includes data rotate unit $200_1$ which, as detailed above, rotates its input data argument D[31:0] a distance of R−L, where preferably the equivalent result of such rotation is achieved instead through a rotation of R+LX+1. The 32-bit output from data rotate unit $200_1$, DRU[31:0], is connected as a first data input to a 32-bit multiplexer 502, and adjacent this first input in the schematic of multiplexer 502 is shown a designation of "1"; this designation, as further borne out below, is intended to demonstrate that for each of the 32 control bits, CB[31:0], input to multiplexer 502 and equal to "1", then multiplexer 502 selects the data at the corresponding bit position of DRU[31:0] and that selected bit is output by multiplexer 502. For example, assume that the control bit input, CB[31:0], to multiplexer 502 has 10 MSBs equal to 0 (i.e., DRU[31:22]=0), and 22 LSBs equal to 1 (i.e., DRU[21:0]=0). In response to the 22 LSBs equal to 1, multiplexer 502 selects the respective least significant 22 bits of DRU[31:0] output by data rotate unit 200, that is, it selects DRU[21:0], and it outputs those bits as an input to an AND gate 504. Note that AND gate 504 is illustrated for simplicity as a single AND gate with two 32-bit inputs. In this regard, one skilled in the art should recognize that AND gate 504 is implemented as 32 AND circuits, where each AND circuit performs an AND operation between a pair of bits that are at a same bit position. Thus, AND gate 404 performs an AND between the MSB at one of its inputs with the MSB at the other of its inputs, and AND gate 504 performs an AND between the bit a position MSB-1 at one of its inputs with the bit at position MSB-1 at the other of its inputs, and so forth for all bits including an AND between the LSB at each of its inputs. The output of AND gate 504 provides the result, $V_{EXEC\_EXT}$, of executing the EXTRACT instruction.

System $200_1$ also includes a sign bit select block 506, which receives as inputs the values from the left shift argument, L, and the 32-bit data argument D[31:0]. Sign bit select block 506 selects and outputs the bit at position 31−L in the 32-bit data argument D[31:0]. This operation is for providing a sign bit that can fill one or more of the most significant bit positions in the EXTRACT instruction result because, as observed above, those positions are filled with the sign bit that is the most significant bit in the left-shifted result, $VL_1$. In connection with block 506, therefore, it is recognized that this same bit is at position 31−L in the original data argument D[31:0] and, therefore, block 506 selects that bit to be output. For example, returning to FIG. 1, where L=6, then block 506 selects the bit at position 31−L=31−6=D25, which can be seen is correctly the MSB of the left-shifted value, $VL_1$. The selected bit is then is output and connected as a second data input to the 32-bit multiplexer 502, and adjacent this second input in the schematic of multiplexer 502 is shown a designation of "0"; this designation, similar to but in complementary fashion to the "1" designation described above, is intended to demonstrate that for each of the 32 control bits, CB[31:0], input to multiplexer 502 and equal to "0", then multiplexer 502 selects the sign bit provided by block 506 and outputs it at the corresponding bit position of its output. For example, assume again that the control input to multiplexer 502 has 10 most significant bits equal to 0, and 22 least significant bits equal to 1. In response to the 10 most significant bits equal to 0, multiplexer 502 selects the single sign bit from block 506 and outputs it as the 10 MSBs in its output to AND gate 504. As further demonstrated below, this output therefore provides the sign extension bit in the most significant bit(s) of the result, $V_{EXEC\_EXT}$, that is provided from executing the EXTRACT instruction.

System $200_1$ also includes an MSB(s) alternate data mask block 508, which is so named because, as detailed later, causes multiplexer 502 to select alternative data, other than from DRU[31:0], to form part of the result, $V_{EXEC\_EXT}$. MSB(s) alternate data mask block 508 receives as an input the value of the right shift argument, R, and it outputs a 32-bit thermometer code as a control bit signal, CB[31:0], to multiplexer 502. As known in the thermometer code art, a thermometer code is a code that includes one set of contiguous zeros and one set of contiguous ones, where the term thermometer is used because of the analogy that the number of one binary state can represent a falling or rising magnitude as in the case of a thermometer. With respect to block 508, its thermometer code has the number R of its MSBs equal to a zero while any one or more of its LSBs are equal to a one. Further, as introduced above with respect to data rotate unit 200 and sign bit select block 506 and as now appreciated further, the thermometer code provides control bits CB[31:0] and, therefore, causes multiplexer 502 to select a respective bit from either the output of data rotate unit 200 or the output of sign bit select block 506, and each selected bit is output to AND gate 504. For example, recall again the example wherein the control bit input, CB[31:0], to multiplexer 502 has 10 MSBs equal to 0, then this control bit input, CB[31:0], is provided as a 32-bit thermometer code from block 508 such as in the form shown in the following Table 7:

TABLE 7

| Bit | | | | | | | | | | | | | | | |
|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 |
| 0 | 0 | 0 | 0 | 0 | 0 | 0 | 0 | 0 | 0 | 1 | 1 | 1 | 1 | 1 | 1 |

| Bit | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 1 | 1 | 1 | 1 | 1 | 1 | 1 | 1 | 1 | 1 | 1 | 1 | 1 | 1 | 1 | 1 |

FIG. 23 depicts an abbreviated version of such a code adjacent the output of block 508. As further demonstrated below, the Table 7 control bit code effectively provides a mask for selecting, as alternatives to the rotated data bits DRU[31:0], the sign extension bits, if any, for the MSBs in the final extract instruction result, $V_{EXEC\_EXT}$.

System $200_1$ also includes an LSB(s) zero mask block 510, which is so named because block 510 effectively provides a mask for selecting the zero bits, if any, in the LSB(s) for the final extract instruction result, $V_{EXEC\_EXT}$. LSB(s) zero mask block 510 receives as inputs the values of the right and left shift argument, R and L, respectively. Block 510 then determines the difference L–R, and if that difference is negative, then block 510 outputs a 32-bit value with all ones. However, if the difference of L–R is positive, then block 510 outputs a 32-bit thermometer code with a number, equal to L–R, of LSB positions having a value zero, while any remaining MSB positions in the code have a value of one. FIG. 23 depicts an abbreviated version of such a code adjacent the output of block 510. In either event, the output of block 510 is provided as a second input of AND gate 504.

Figure 24:
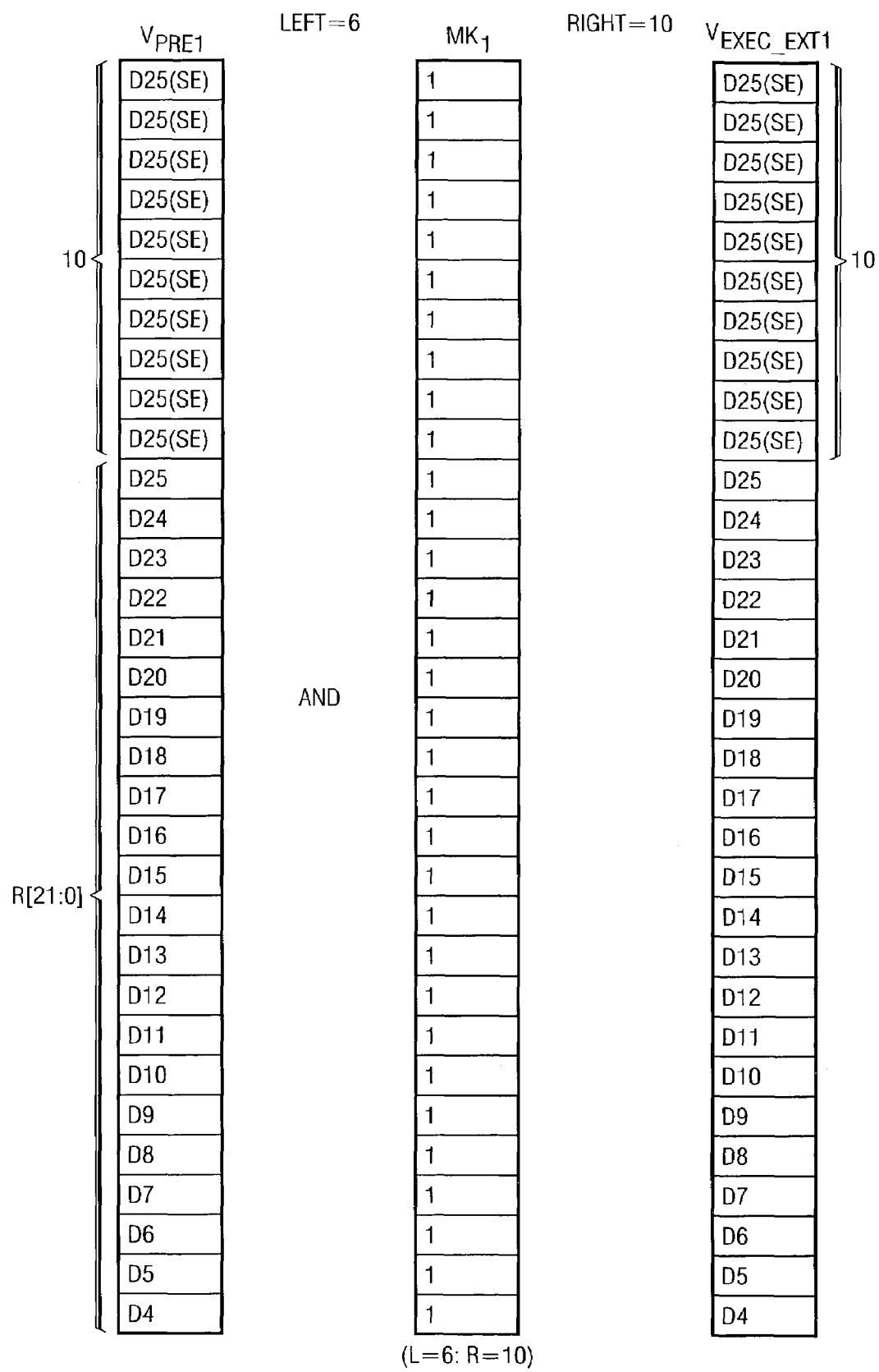
FIG. 24 illustrates an example of the operation of the system of FIG. 23 for a case where the right shift argument is larger than the left shift argument.

The operation of system $200_1$ is now described, and is first shown with respect to executing the EXTRACT instruction for the parameters illustrated in FIG. 1, that is, when R>L and for the particular example when R=10 and L=6. By way of introduction, note that the final EXTRACT instruction result, $V_{EXEC\_EXT}$, should match that shown as $VR_1$ in FIG. 1, where the 10 MSBs should include a sign extension bit that matches the MSB of $VL_1$. Looking first to sign bit select block 506, it selects bit 31–L=31–6, that is, bit 25 (i.e., D25) of the input data D[31:0] and outputs this single bit to the "0" input of multiplexer 502. Note from FIG. 1, therefore, that block 506 has successfully selected the MSB of the left shifted value, $VL_1$ and provided it as an input to multiplexer 502. Further, MSB(s) alternate data bit mask block 508 provides a thermometer code having R=10 MSBs equal to zeros and the remaining 32−R=32−10=22 LSB positions equal to ones. Accordingly, for this example, block 508 outputs the thermometer code of Table 7 as the control input to multiplexer 502, thereby providing a value of 0 in the 10 MSBs of that code. In response, multiplexer 502 selects the sign bit data as its "0" input to be the corresponding 10 MSBs in its output, and multiplexer 502 selects the 22 LSBs of DRU[31:0] at its "1" input to be the corresponding LSBs in its output. Accordingly, at this point in its operation, the output of multiplexer 502 is as shown by the preliminary value $V_{PRE1}$ to the left in FIG. 24, where for sake of illustration each sign extension bit is also shown with a label of "(SE)". Next, LSB(s) zero mask block 510 outputs a thermometer code with a number of LSBs equal to zero if the difference of L–R is positive; however, in the present example of L=6 and R=10, that difference is negative. In response to the negative difference, instead block 510 outputs a mask of 32 values of one as an input to AND gate 504, where this mask is shown in FIG. 24 as $MK_1$. As known in the art, such a mask when provided as an input to a two-input AND gate causes the gate to simply pass its other input, which in the example of FIG. 24 is $V_{PRE1}$. Thus, to the right of FIG. 24 is shown the result of this AND operation, which provides the result, $V_{EXEC\_EXT1}$, of the executed EXTRACT instruction. Accordingly, one skilled in the art may readily confirm that $V_{EXEC\_EXT1}$ matches the desired result $VR_1$ of FIG. 1, with sign extension bits as the top R=10 bits in result $V_{EXEC\_EXT1}$.

The operation of system $200_1$ is now further described by discussing its execution of the EXTRACT instruction for the parameters illustrated in FIG. 2, that is, when L>R and for the particular example when R=8 and L=16. By way of introduction, note that the final EXTRACT instruction result should match that shown as $VR_2$ in FIG. 2, where the 8 MSBs should include a sign extension bit that matches the MSB of $VL_2$. Looking to sign bit select block 506, it selects bit 31–L=31–16, that is, bit 15 (i.e., D15) of the input data D[31:0] and outputs this single bit to the "0" input of multiplexer 502. Note from FIG. 2, therefore, that block 506 has successfully selected the MSB of the left shifted value, $VL_2$ and provided it as an input to multiplexer 502. Further, MSB(s) alternate data bit mask block 508 provides a thermometer code having R=8 MSBs equal to zeros and the remaining 32−R=32−8=24 LSBs equal to ones. Accordingly, for this example, block 508 outputs the thermometer code of the following Table 8 as the control bit input, CB[31:0], to multiplexer 502.

TABLE 8

| Bit | | | | | | | | | | | | | | | |
|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 |
| 0 | 0 | 0 | 0 | 0 | 0 | 0 | 0 | 1 | 1 | 1 | 1 | 1 | 1 | 1 | 1 |

| Bit | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 1 | 1 | 1 | 1 | 1 | 1 | 1 | 1 | 1 | 1 | 1 | 1 | 1 | 1 | 1 | 1 |

Figure 25:
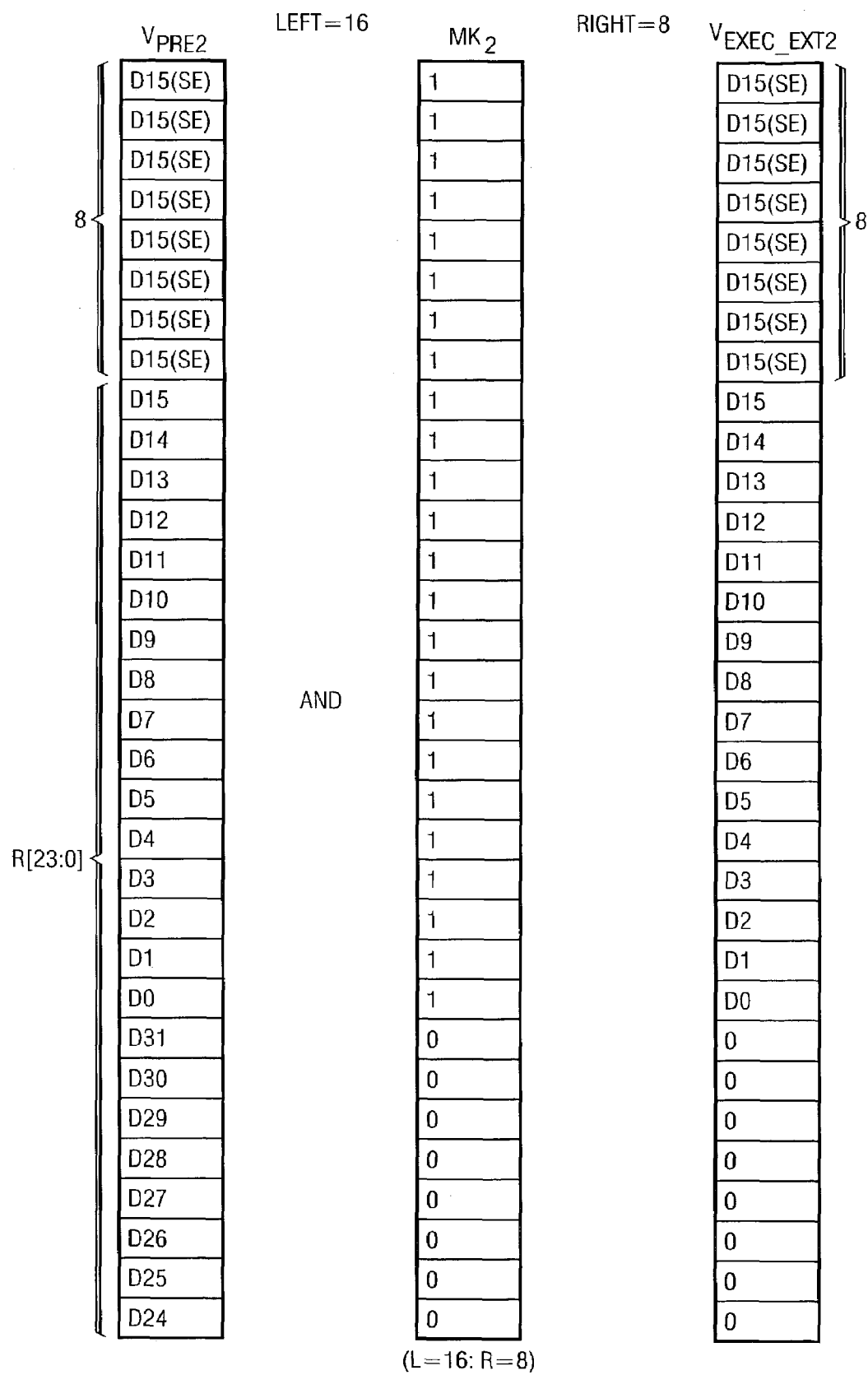
FIG. 25 illustrates an example of the operation of the system of FIG. 23 for a case where the left shift argument is larger than the right shift argument.

In response, multiplexer 502 selects the sign bit data as its "0" input to be output as the 8 MSBs and multiplexer 502 selects the 24 LSBs of DRU[31:0] at its "1" input to be output as the 24 LSBs. Accordingly, at this point in its operation, the output of multiplexer 502 is as shown by the preliminary value $V_{PRE2}$ to the left in FIG. 25, where again for sake of illustration each sign extension bit is also shown with a label of "(SE)". Next, LSB(s) zero mask block 510 outputs a thermometer code with L–R LSBs having a value of zero if that difference is positive and, indeed, in the present example of L=16 and R=8, that difference equals 8. In response to the positive difference, block 510 outputs a thermometer code mask having 8 LSBs equal to zeros and the remaining MSBs (i.e., 24 bits) equal to ones, where this mask is shown in FIG. 25 as $MK_2$. As known in the art, such a mask when provided as an input to a two-input AND gate causes the gate to zero its other input; as a result, therefore, of the entire 32-bit mask $MK_2$, the 24 most significant bits of $V_{PRE2}$ are passed while the 8 least significant bits or $V_{PRE2}$ are zeroed, leaving the result $V_{EXEC\_EXT2}$ shown to the right of FIG. 25. Accordingly, one skilled in the art may readily confirm that $V_{EXEC\_EXT2}$ matches the desired result $VR_2$ of FIG. 2, with sign extension bits as the top R=8 bits in result $V_{EXEC2}$.

From the preceding, one skilled in the art may readily confirm that system $200_1$ incorporates the rotation functionality of data rotate unit 200 into a system that provides the desired results for the EXTRACT instruction, given D[31:0] as well as the values of the left and right shift arguments, L and R, respectively. In still other embodiments, however, the present inventive scope may be further modified so as to accommodate still additional data manipulation instructions, as further explored below.

System $200_1$ may readily implement a SHIFT RIGHT instruction, where that instruction, as its name suggests, shifts the 32-bit data D[31:0] only to the right and where the extent of the shift is provided by the right shift argument, R. In this case, when the shift right instruction is to be executed, the extent of the left shift can be set to zero, by any of several techniques, such as by providing a hard-wired value of 0 for the left shift for this instruction. In response to the value of L=0, then LSB(s) zero mask block 510 will realize a negative value for L−R and, thus, it will provide a thermometer code of all ones, while at the same time MSB(s) alternate data mask block 508 will provide a thermometer code as described above, that is, with a value of 0 in the R MSB(s) combined with a value of 1 in the remaining LSB(s).

Figure 26:
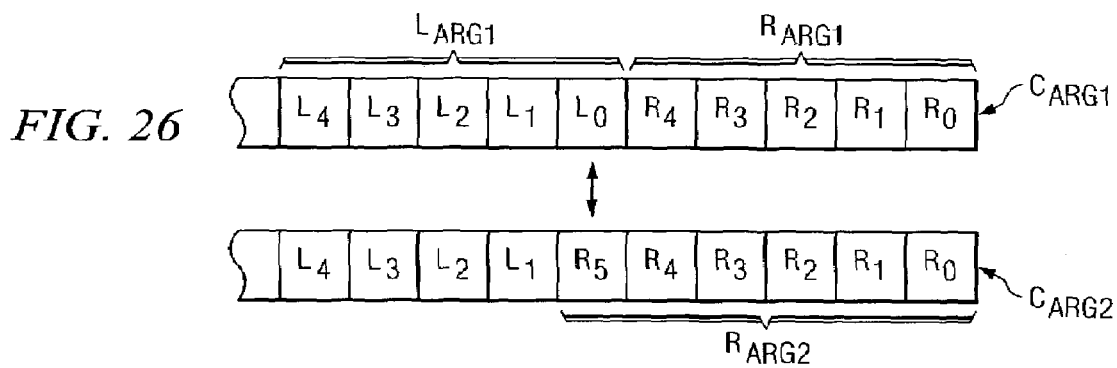
FIG. 26 illustrates a concatenated pin argument $C_{ARG1}$ that represents the actual physical pins that are input to data rotate unit 200 of FIG. 23.

As an additional observation with respect to using system $200_1$ to execute a SHIFT RIGHT instruction, note that in some processors the right and left shift arguments are sometimes provided on physical data pins as concatenated values in a single combined argument, as is now also explored in connection with FIG. 26. Specifically, FIG. 26 illustrates a first concatenated pin argument $C_{ARG1}$ that includes a 5-bit right shift pin argument $R_{ARG1}$ and a 5-bit left shift pin argument $L_{ARG1}$. In the preferred embodiment, concatenated pin argument $C_{ARG1}$ represents the actual physical pins that are input to data rotate unit 200 and, therefore, those pins provide to data rotate unit 200 the values of the shift arguments L and R for the EXTRACT instruction described earlier. However, FIG. 26 also illustrates a second concatenated pin argument $C_{ARG2}$ that includes a single 6-bit right shift argument $R_{ARG2}$. In some processors, this one bit larger arguments may be used as the pin inputs for the single argument instructions SHIFT RIGHT and SHIFT LEFT arguments, where any bits in more significant bit positions higher than the argument may be some constant value; in any event, the 6-bit argument provides one more bit in its shift indication as compared to the 5-bit arguments in concatenated argument $C_{ARG1}$ for the EXTRACT instruction. Note further, therefore, that in a bit-by-bit comparison, bit $L_0$ of concatenated argument $C_{ARG1}$ aligns with bit $R_5$ of concatenated argument $C_{ARG2}$. This alignment may need to be considered when implementing system $200_1$ to accommodate both the EXTRACT instruction as well as a SHIFT RIGHT instruction. In other words, if data rotate unit 200 were to receive second concatenated pin argument $C_{ARG2}$ with its 6-bit shift arguments along the same pins as it receives first pin concatenated argument $C_{ARG1}$ with its 5-bit shift arguments, then without further functionality, a set bit for $R_5$ in $C_{ARG2}$ may be erroneously interpreted as a set bit for $L_0$ in $C_{ARG1}$. To address this contingency, in one approach an additional circuit may be provided to override the output of LSB(s) zero mask block 510 by providing additional circuitry between its output and AND gate 504, where as shown below such circuitry also may provide other utility in connection with other instructions. In another approach, the sixth shift count bit could be provided on a different input pin that is not shared with the left argument. In either case, note that if the most significant bit in the 6-bit right shift argument is set for a SHIFT RIGHT instruction, then the desired right shift is at least 32, thereby shifting out all of the data D[31:0] from the desired result; accordingly, the output of MSB(S) alternate data mask block 508 must be modified such that it provides all zeros in its thermometer code to multiplexer 502, thereby causing multiplexer 502 to select the sign bit from block 506 and to provide it in all bit positions of its output to multiplexer 502. Further, because LSB(s) zero mask 510 will necessarily output all ones in its thermometer code for a SHIFT RIGHT instruction (because L−R is negative), then the same output from multiplexer 502 will appear as the ultimate output, $V_{EXEC\_EXT}$, of the executed instruction.

Figure 28:
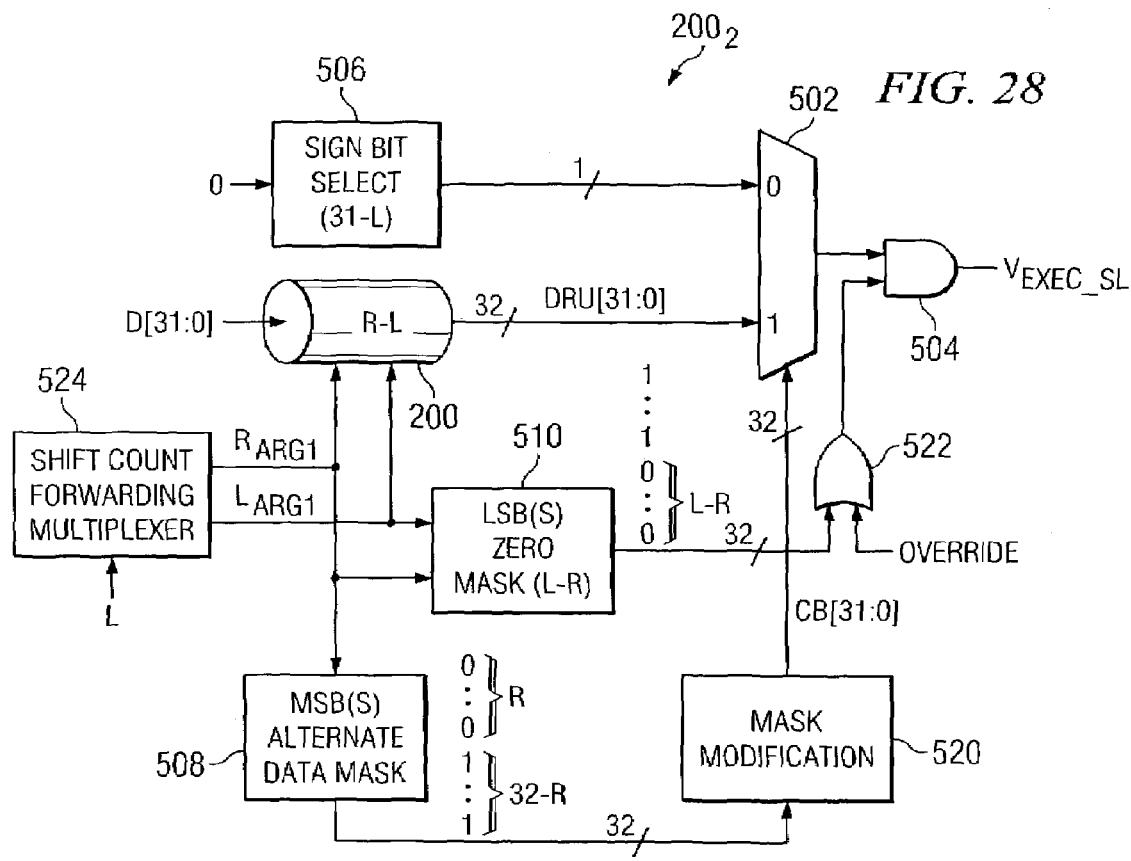
FIG. 28 illustrates a block diagram of a system for executing an SHIFT LEFT instruction.
Figure 27:
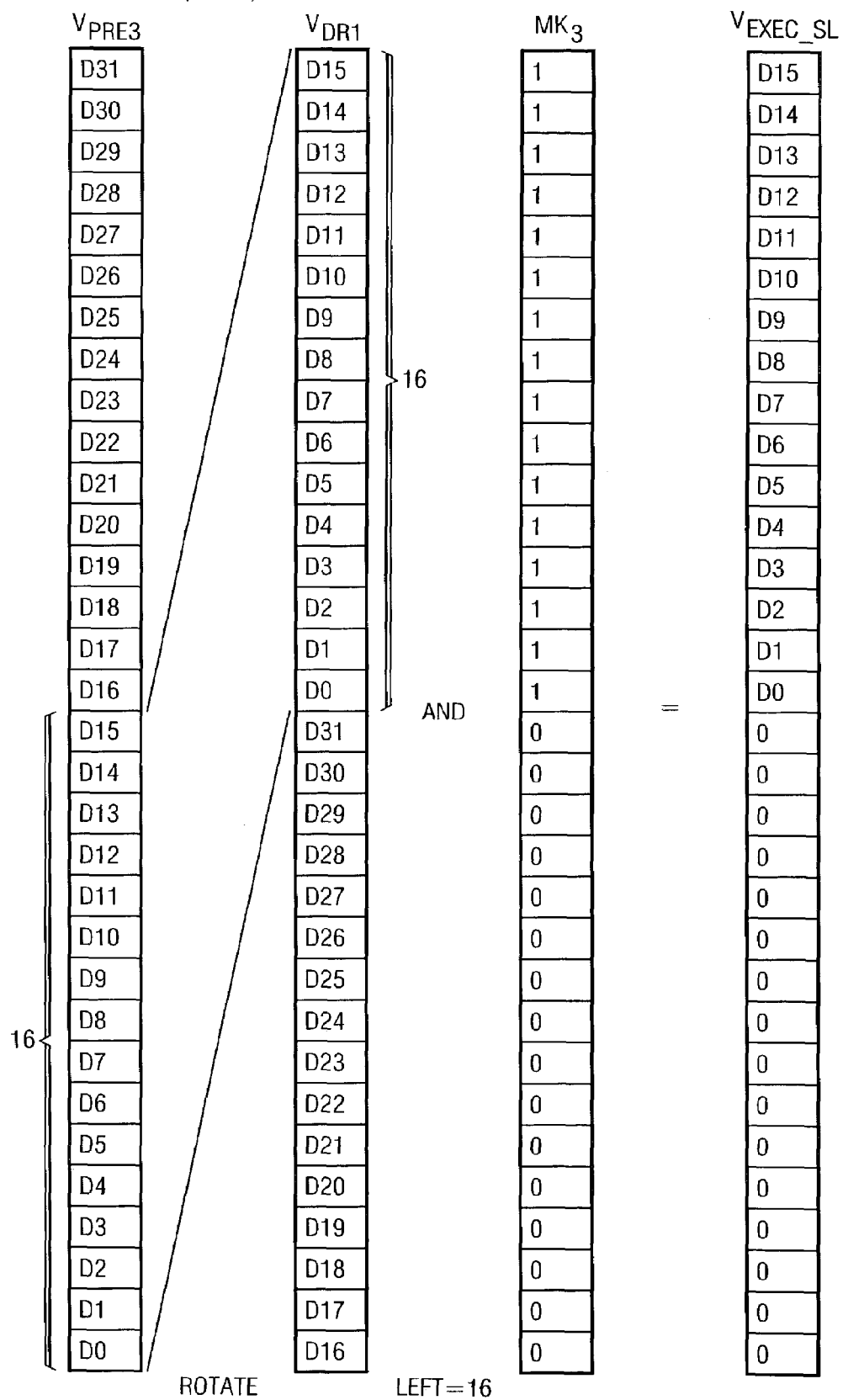
FIG. 27 illustrates an example of the operation of the system of FIG. 28.

System $200_1$ of FIG. 23 also may readily achieve the results of what is referred to in the prior art as a SHIFT LEFT instruction, with certain alterations as shown in FIG. 28 and which provide an alternative embodiment system $200_2$. Before discussing system $200_2$ of FIG. 28, and for sake of an example to be referenced later and to thereby further provide a greater understanding of various concepts in the preferred embodiment, FIG. 27 illustrates an example of the overall resulting operations of system $200_2$ as used for a SHIFT LEFT instruction. To the left of FIG. 27, it illustrates a preliminary value for D[31:0] indicated as $V_{PRE3}$, and assume that the desired operation of system $200_2$ is to shift $V_{PRE3}$ to the left 16 times. Thus, D[31:0] is provided to data rotate unit 200, and the value of a left shift argument, L, of 16 is provided to system $200_2$. In response to an intermediate function described below, data rotate unit 200 provides a data rotated value $V_{DR1}$, which as shown in FIG. 27 corresponds to a left rotation of 16. Recall, however, that data rotate unit 200 in the preferred embodiment actually performs right rotations; thus, the same value, $V_{DR1}$, may be described as a right rotation of −L, that is, of −16. Once value $V_{DR1}$ is provided, then system $200_2$ also provides a mask $MK_3$, where the generation of this mask is in connection with various blocks detailed below, and mask $MK_3$ is then logically ANDed with value $V_{DR1}$. This operation provides the result, $V_{EXEC\_SL}$, shown to the right of FIG. 27. Accordingly, one skilled in the art may readily confirm that $V_{EXEC\_SL}$ matches the desired result of a left shift of $V_{PRE3}$, leaving a binary value of zero in the 16 LSBs of $V_{EXEC\_SL}$. Thus, in contrasting the left-shifted result $V_{EXEC\_SL}$ of FIG. 27 with the EXTRACT instruction result $V_{EXEC\_EX2}$ of FIG. 25, which includes a right shift, note also that $V_{EXEC\_SL}$ includes a zero in one or more LSB positions, while $V_{EXEC\_EXT2}$ includes a sign extension bit in one or more MSB positions—this difference gives rise to a masking methodology of system $200_2$ that contrasts with that of system $200_1$, as further explored below.

Looking now to system $200_2$ in FIG. 28, it includes the same blocks as system $200_1$, with the following additional modifications. First, a "0" data input is shown to sign bit select block 506, which replaces the input to that block of data D[31:0]. Second, the output of MSB(s) alternate data bit mask block 508 is no longer directly connected as the control input to multiplexer 502, but instead that output is connected as an input to a mask modification block 520, which has its output connected to provide the control bit input, CB[31:0], to multiplexer 502. The 32-bit output of LSB(s) zero mask block 510 is connected as a first input to an OR gate 522 that provides a 32-bit output connected as an input to AND gate 504, and the second 32-bit input of OR gate 522 is connected to an OVERRIDE signal. The output of AND gate 504 provides the result of the executed SHIFT LEFT instruction, where that result is indicated in FIG. 28 as $V_{EXEC\_SL}$. The additional functionality of these various differences as well as newly-added mask modification block 520 is appreciated from the operational description, below. Lastly, for the SHIFT LEFT instruction, only the left shift argument need be provided to system $200_2$; however, for reasons detailed below, that argument is preferably manipulated first by a shift count forwarding multiplexer 524, which then outputs the manipulated value as also explained below.

The operation of system $200_2$ to achieve a left shift, in response to a SHIFT LEFT instruction, is now explored, looking first to an issue relating to the left shift argument and its receipt by system $200_2$. Specifically, when the SHIFT LEFT instruction is issued, shift count forwarding multiplexer 524 receives the corresponding left shift argument, L. However, in the preferred embodiment, recall that the physical pins of data rotate unit 200 take the form of either concatenated pin argument $C_{ARG1}$ or $C_{ARG2}$ in FIG. 26. Thus, since only a single shift argument, namely, the left shift argument, is provided to shift count forwarding multiplexer 524 with the SHIFT LEFT instruction, then without additional steps that argument would be provided to the least significant pins of the concatenated pin argument $C_{ARGx}$. Note, however, in FIG. 26 that those least significant pins correspond to the right, rather than the left, shift argument; thus, in the present example, the left shift argument, as provided to these least significant pin positions, will be perceived from the perspective of data rotate unit 200 as a right shift argument. For example, consider the FIG. 27 example where a left shift of 16 positions is desired; thus, when the SHIFT LEFT instruction is issued, a binary value of L=10000 is provided to shift count forwarding multiplexer 524, and without additional operation then that left shift value would be provided to the least significant pin positions of concatenated pin argument $C_{ARG1}$, thereby being received as a desired right shift argument. To compensate for this connectivity, in the preferred embodiment, shift count forwarding multiplexer 524 takes one step toward effectively converting the specified left shift value into a corresponding right shift value. More particularly, as known in the art, a right shift of a number of bit positions is equal to a negative left shift of that same number of bit positions. For the present example where a left shift of 16 bit positions is desired, then that is equivalent to achieving a right shift of negative 16 bit positions, as also observed above with respect to FIG. 27. Given these principles, it is desired in the preferred embodiment to convert the value of the left shift argument, L, into a negative right shift argument, R, and that may be achieved by forming a negative value of the received left shift argument, L. As known in the binary art, a negative value of a given binary number is formed by taking the twos complement of the given binary number, which is achieved by inverting the number and adding one. Toward this end, in the preferred embodiment, shift count forwarding multiplexer 524 inverts the value of the received left shift argument, L. In addition, as just stated, to form the twos complement then one also must be added to the inverted value. To achieve this additional aspect, recall that in the preferred embodiment, data rotate unit achieves the Equation 1 shift of R+LX+1, which thereby includes the addition of one as its final addend. Thus, data rotate unit 200 can be used to provide the "+1" aspect, and toward this end then shift count forwarding multiplexer 524 inverts the left data shift argument, L, and provides the inverted result to the right pin argument, $R_{ARG1}$. The result of the proper shifting in response is further appreciated from the remaining discussion, below.

In addition to the preceding, for a SHIFT LEFT instruction, shift count forwarding multiplexer 524 also provides the 5-bit value of L=11111 to the left pin argument, $L_{ARG1}$ (or L=111111 if a 6-bit, rather than 5-bit, input is used). Particularly, because data rotate unit 200 is to achieve the Equation 1 shift of R+LX+1, then it will therefore require the value of LX, that is, the complement of L. To facilitate the proper result for a SHIFT LEFT instruction, therefore, when shift count forwarding multiplexer 524 provides the value of L=11111 to the left pin argument, $L_{ARG1}$, then by definition the value of LX is LX=00000. Thus, when data rotate unit 200 in response performs a shift of R+LX+1 positions, then for the SHIFT LEFT instruction it is shifting an extent of R+0+1=R+1; as demonstrated above, R is derived for the SHIFT LEFT instruction as the complement of L, so the result of R+1 provides the twos complement of L and thereby results in a right shift a number of positions equal to that twos complement.

Before detailing additional aspects of the operation of system $200_2$ in connection with the SHIFT LEFT instruction, the numeric example of FIG. 27 is now examined in view of the concepts discussed above insofar as the operation of data rotate unit 200 is involved, where recall in that example a left shift of 16 bit positions is desired of $V_{PRE3}$. The SHIFT LEFT instruction is issued to the processor that includes system $200_2$, and at the same time the left shift argument, L=16, is provided to shift count forwarding multiplexer 524. In binary form, therefore, L=10000 and shift count forwarding multiplexer 524 determines its complement, 01111, and provides that complement value to the 5 least significant bits of concatenated pin argument $C_{ARG1}$ (or 6 bits to concatenated pin argument $C_{ARG2}$); thus, these bits are received by data rotate unit 200 as the right shift pin argument, $R_{ARG1}$. Additionally, in response to the SHIFT LEFT instruction, shift count forwarding multiplexer 524 provides the value L=11111 to the left shift pin argument, $L_{ARG1}$, such that its complement, $LX_{ARG1}$, is 00000. Next, data rotate unit 200 performs a right rotation a number of bit positions equal to R+LX+1, which in this example is 01111+00000+1, which equals a binary value of 10000 or a decimal value of 16. Accordingly, in this example, the desired result for a left shift of 16 is reached by effectively rotating right by 16 positions. Further, additional masking is also performed by system $200_2$ so as to achieve the final result, $V_{EXEC\_SL}$, of FIG. 27 for the desired left shift of 16, as further explored below.

Continuing now with additional operations of system $200_2$, recall that LSB(s) zero mask block 510 determines the difference L−R and outputs a responsive thermometer code; further, from the preceding discussion, for the SHIFT LEFT instruction, $L_{ARG1}$=11111 and, thus, the resulting thermometer code would not provide a proper mask to use in connection with the output of multiplexer 502. In this regard, instead, when the SHIFT LEFT instruction is executed, then OVERRIDE is asserted high, which provides 32 high inputs to OR gate 522 and that are OR'd with each output from block 510, thereby effectively overriding them in that the entire 32-bit output of OR gate 522 will be high. Moreover, because these high 32 bits are provided as inputs to AND gate 504, then they will cause the output of AND gate 504 to provide whatever values are received at its other input from the output of multiplexer 502. From the preceding, therefore, one skilled in the art will recognize that asserting the OVERRIDE signal effectively eliminates the output of block 510 from affecting the result to be produced by the SHIFT LEFT instruction.

Completing the discussion of the operation of system $200_2$, mask modification block 520 is provided to achieve the proper masking to include any necessary zero values in the LSB(s) of the final result of the shift operation. For example with reference to FIG. 27, block 520 from FIG. 28 provides mask $MK_3$ so that the 16 LSBs in $V_{EXEC\_SL}$ are provided with a value of zero. First, recall that MSB(s) alternate data mask block 508 receives a right shift argument, R, and it outputs a thermometer code with R most significant bit position(s) equal to a value of 0; for the EXTRACT and SHIFT RIGHT instructions those 0's thereby select the output of sign bit select block 506 to appear in the MSB(s) of the result. In contrast, for system $200_2$ to achieve a SHIFT LEFT instruction, it is desired for the LSB(s) of the result to include a value of zero. Toward this end, a value of zero is input as an input to sign bit select block 506 (or is wired into that circuit for use in response to the SHIFT LEFT instruction), so that value may be selected by multiplexer 502 for the appropriate LSB(s) in the instruction result. Since the zero value is for the LSB(s) rather than the MSB(s), then the thermometer code control bit input, CB[31:0], to multiplexer 502 must be modified, as is achieved by mask modification block 520. Particularly, in the preferred embodiment, mask modification block 520 receives the thermometer code from MSB(s) alternate data mask block 508, inverts that thermometer code and shifts it right by one bit, thereby outputting the resultant modified thermometer code as CB[31:0] to control multiplexer 502. Again, consider the example of FIG. 27 for a left shift of 16. In this case, recall that L=10000 and shift count forwarding multiplexer 524 determines its complement, 01111, and provides that as the right shift pin argument, $R_{ARG1}$, to data rotate unit 200. Thus, MSB(s) alternate data mask block 508 receives the binary value of $R_{ARG1}$=01111, which corresponds to a decimal value of 15. Accordingly, MSB(s) alternate data mask block 508 outputs a thermometer code with a zero located in each of its 15 MSBs and, consequently, with a one located in each of its remaining 17 LSBs. However, mask modification block 520 receives this input thermometer code and inverts it, thereby producing an intermediate modified thermometer code with a one located in each of its 15 MSBs and, consequently, with a zero located in each of its remaining 17 LSBs; next, block 520 shifts that intermediate modified thermometer code one position to the right (bringing in a "1" in the MSB of the shifted value), thereby producing a final modified thermometer code, corresponding to mask $MK_3$ in FIG. 27, that is, with a one located in each of its 16 MSBs and, consequently, with a zero located in each of its remaining 16 LSBs. However, unlike FIG. 27, the final modified thermometer code in the operation of system $200_2$ is not logically ANDed, but instead it controls multiplexer 502. Thus, in response to the one located in each of the 16 MSBs of the final modified thermometer code, multiplexer 502 selects and outputs the corresponding bit position value output by data rotate unit 200, thereby outputting bits D15:D0 in the 16 MSBs of the multiplexer output. At the same time, in response to the zero located in each of the 16 LSBs of the final modified thermometer code, multiplexer 502 selects and outputs the value of zero provided by sign bit select block 506, thereby outputting a value of zero in each of the 16 LSBs of the multiplexer output. Finally, the output of multiplexer 502 is connected to AND gate 504, but recall due to the assertion of the OVERRIDE signal concurrent with the execution of the SHIFT LEFT instruction, the output of multiplexer 502 simply passes through AND gate 504, thereby providing the same result as shown as the result, $V_{EXEC\_SL}$, shown to the right of FIG. 27. Lastly, note that if the left shift argument is a 6-bit argument, and if the most significant bit in that 6-bit shift argument is set for a SHIFT LEFT instruction, then the desired left shift at least 32 bit positions; accordingly, the operation of output of MSB(s) alternate data mask 508 and mask modification block 520 must be modified such that code bits CB[31:0] provides all zeros to multiplexer 502, thereby causing multiplexer 502 to select the value of "0" from block 506 and to provide it in all bit positions of its output to multiplexer 502.

Figure 29:
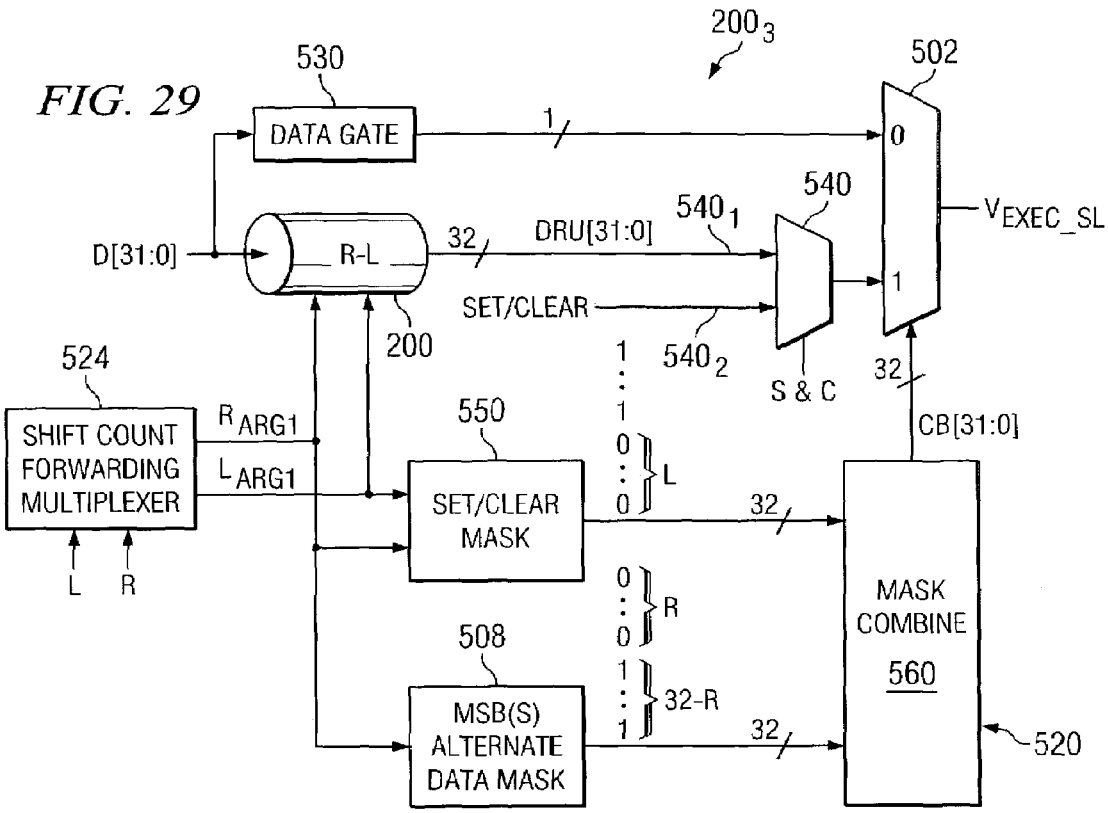
FIG. 29 illustrates a block diagram of a system for executing either a SET or CLEAR instruction.
Figure 30:
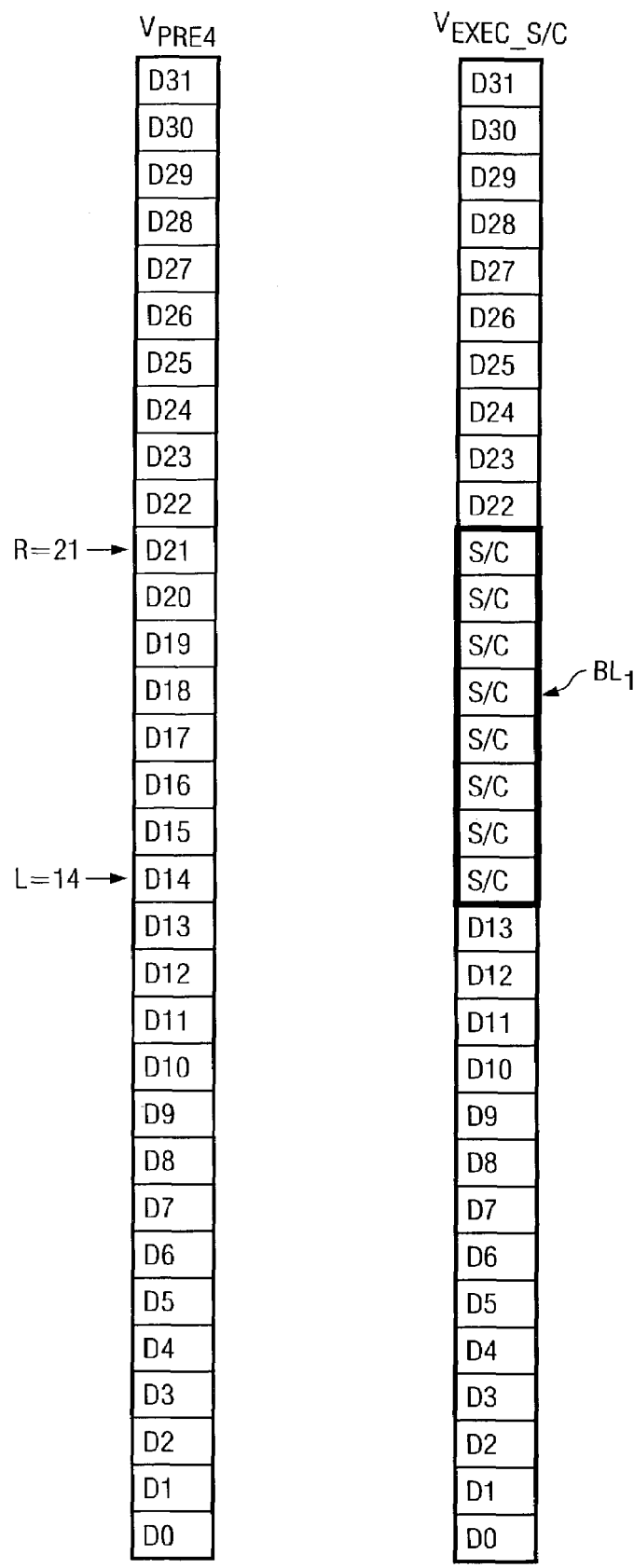
FIG. 30 illustrates an example of the operation of the system of FIG. 29.

System $200_1$ of FIG. 23 also may readily achieve the results of what are referred to in prior art processors as the SET and CLEAR instructions, with a few alterations as are shown in FIG. 29 and which provide an alternative embodiment system $200_3$. Before discussing system $200_3$ of FIG. 29, and for sake of an example to be referenced later and to thereby further provide a greater understanding of various concepts in the preferred embodiment, FIG. 30 illustrates an example of the overall resulting operations of system $200_3$ as used for either the SET or CLEAR instruction. In general, the SET instruction sets, and the CLEAR instruction clears, data bit positions between specified top and bottom locations in a data input, where those specified locations are indicated by the values of the shift arguments R and L, respectively. Thus, with respect to FIG. 30, to its left it illustrates a preliminary value for D[31:0] indicated as $V_{PRE4}$, and assume that the desired operation of system 2003 is to execute either a SET or CLEAR instruction. For either such instruction, the values of the R and L shift arguments indicate a respective top and bottom bit position within $V_{PRE4}$, where the data in the bit position at the specified bottom bit position and up to and including the top bit position are to be either set to one (for the SET instruction) or cleared to zero (for the CLEAR instruction), and where the remaining data, that is, starting above the top bit position, and below the bottom bit position, remains unchanged from the input data. By way of example, FIG. 30 illustrates an instance where L=14 and R=21. Thus, when the instruction is executed, the argument of L=14 causes the data D14 at bit position 14 to be set or cleared, indicated in result value $V_{EXEC\_S/C}$ by "S/C" in the corresponding bit position. Additionally, the argument of R=21 causes the data D21 at the bit position 21 to be set or cleared, as also indicated in result value $V_{EXEC\_S/C}$ by "S/C" in the corresponding bit position. Finally, in addition to setting or clearing the bit at positions 14 and 21, the data between those bit positions, that is, the remaining bits D15 through D20, are also set or cleared in response to whether the instruction is a SET or CLEAR instruction, respectively. Accordingly, result $V_{EXEC\_S/C}$ ultimately provides a block $BL_1$ of set/cleared bits, yet outside of those bits the remaining data from $V_{PRE4}$ is carried forward to the respective bit positions of $V_{EXEC\_S/C}$.

Having demonstrated the results of the SET and CLEAR instructions, attention is returned to system $200_3$ of FIG. 29, which includes certain modifications to system $200_1$ of FIG. 23 in a preferred embodiment for producing a corresponding executed result, $V_{EXEC\_S/C}$, for the SET and CLEAR instructions. System 2003 essentially bypasses the rotating function of data rotate unit 200 and instead may use unit 200 to provide either a one output for the SET instruction or a zero output for a CLEAR instructions, as is now explored. Looking then to system $200_3$ in detail, the data D[31:0] is input to a data gate 530, which gates that data and outputs it in unchanged from to the "0" input of multiplexer 502, which as described for earlier embodiments therefore selects this data at each bit position corresponding to a "0" in the same bit position of the 32-bit input control bit code, CB[31:0], to multiplexer 502. The data D[31:0] is also input to data rotate unit 200, but for reasons appreciated below unit 200, when executing the SET instruction outputs 32 values of one and when executing the CLEAR instruction outputs 32 zeros; thus, the input data D[31:0] is of no effect for data rotate unit 200 with respect to these two instructions. As an alternative to achieve this same result, FIG. 29 illustrates that the output of data rotate unit 200 is connected as a first input $540_1$ to a multiplexer 540, which has its second input $540_2$ connected to receive either a value of 1 for the SET instruction or a value of 0 for the CLEAR instruction. Multiplexer 540 also receives a control signal shown as S&C, which is asserted for both the SET and CLEAR instructions, thereby causing multiplexer 540 to select its second input $540_2$, thereby selecting either 1 or 0, respectively, and providing it at each bit position in a 32-bit output. The 5-bit left and right shift arguments, L and R, respectively are again input to a shift count forwarding multiplexer 524. In response, shift count forwarding multiplexer 524 couples the value of L to a 5-bit left shift pin argument $L_{ARG1}$; however, with respect to the value of R, shift count forwarding multiplexer 524 couples its complement to the 5-bit right shift pin argument $R_{ARG1}$, for reasons appreciated below.

System $200_3$ includes the MSB(s) alternate data mask block 508 of system $200_1$ and which receives the 5-bit right shift pin argument $R_{ARG1}$, but it does not include LSB(s) zero mask block 510. Instead, system $200_3$ includes a set/clear mask block 550 which in the preferred embodiment receives the 5-bit left shift pin argument $L_{ARG1}$, and in response block 550 outputs a 32-bit thermometer code that has a value of zero in its $L_{ARG1}$ LSBs, with a value of one in its remaining MSBs. Thus, consistent with the earlier illustrations, FIG. 29 depicts an abbreviated version of such a code adjacent the output of set/clear mask block 550. This code is connected to a mask combine block 560, which also receives the thermometer code output from MSB(s) alternate data mask block 508. In the preferred embodiment, mask combine block 560 performs a logical AND with each corresponding bit position from the two 32-bit thermometer codes it receives as inputs, that is, bit 31 of the two codes are ANDed together and the result is provided as bit 31 at output $560_{out}$, while similarly bit 30 of the two codes are ANDed together and the result is provided as bit 30 at output $560_{out}$, and so forth for the remaining respective bits in the two input thermometer codes. The resulting 32-bit code at output $560_{out}$ is connected as the control bit code, CB[31:0], to multiplexer 502.

The operation of system $200_3$ is now described, and by way of illustration the example of FIG. 30 is considered, which is repeated in FIG. 31 along with the thermometer codes $TC_1$ and $TC_2$ and mask $MK_4$ produced by system $200_3$, as are now examined. Set/clear mask block 550 receives the value of $L_{ARG1}=L=14$, and in response it outputs thermometer code $TC_1$, having the value zero in L=14 LSB positions, with a value of one in the remaining 18 MSB positions. MSB(s) alternate data mask block 508 receives $R_{ARG1}$, which recall for the SET or CLEAR instruction is provided by shift count forwarding multiplexer 524 as the complement of R. Thus, in the present example R=21 which is a binary value of 10101, and thus its complement of 01010, or decimal 10, is provided as $R_{ARG1}$ to MSB(s) alternate data mask 508. In response, block 508 outputs thermometer code $TC_2$, having the value zero in $R_{ARG2}=10$ (decimal) MSB positions, with a value of one in the remaining 22 LSB positions. Next, thermometer codes $TC_1$ and $TC_2$ are connected to mask combine block 508, which performs a bit-by-bit logical AND of each respective bit position; this operation produces and outputs mask $MK_4$ at output $560_{out}$. One skilled in the art may readily confirm, therefore, that mask $MK_4$ includes a value of one only in the bit positions that correspond to bits [D21:D14] from $V_{PRE4}$, where the remaining bit positions in mask $MK_4$ include a value of zero. Further, mask $MK_4$ is connected to control multiplexer 502. Thus, in response to the logical 1 at bit positions [21:14] in mask $MK_4$, multiplexer 502 selects from its "1" input the output from multiplexer 540, where multiplexer 540 provides either a zero for the CLEAR instruction or a one for the SET instruction. This value is selected and output by multiplexer 502 to bit positions [21:14] in the final executed result, $V_{EXEC\_S/C}$, which thereby forms block $BL_1$. In block $BL_1$, for sake of illustrating both the SET and CLEAR instructions, its bits are shown to include a set/clear designation "S/C" in the set/cleared bit positions. At all bit positions other than bit positions [21:14], mask $MK_4$ includes a logical zero; hence, for these other bit positions, multiplexer 502 selects from its "0" input the output from data gate 530, that is, the bits from the respective bit positions in D[31:0]. Thus, for the bit positions in the execution result, $V_{EXEC\_S/C}$, outside of block $BL_1$, those bit positions, $V_{EXEC\_S/C}[13:0]$ and $V_{EXEC\_S/C}[31:22]$, are equal to the data from the respective bit positions in D[31:0].

Figure 32:
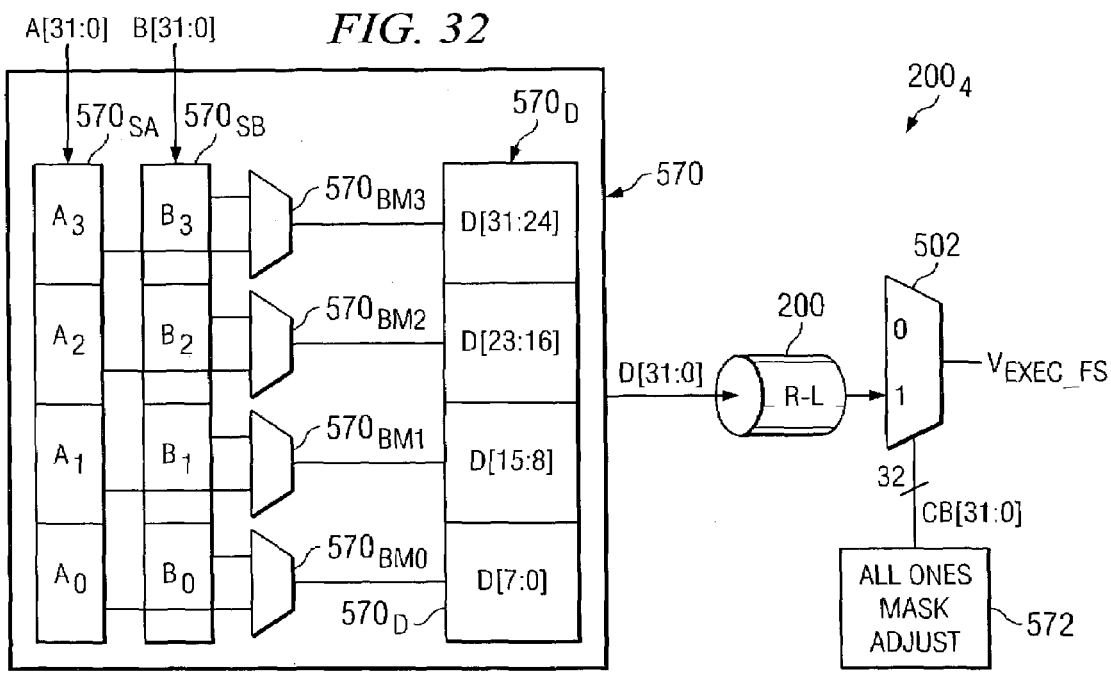
FIG. 32 illustrates a block diagram of a system for executing a FUNNEL SHIFT instruction.
Figure 33:
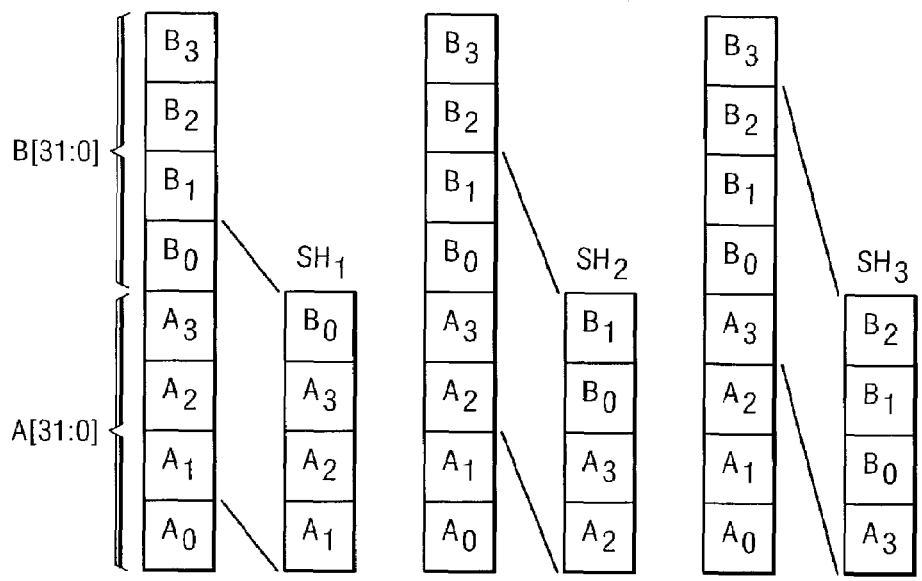
FIG. 33 illustrates an example of the prior art execution of the FUNNEL SHIFT instruction.

System $200_1$ of FIG. 23 also may readily achieve the results of what are referred to in prior art processors as the FUNNEL shift instruction, which performs a byte-granularity right shift of two concatenated 32-byte data arguments, where such an implementation is achieved with certain alterations shown in FIG. 32 and which provide an alternative embodiment system $200_4$. Before discussing system $200_4$ of FIG. 32, and for sake of later reference in discussing the preferred embodiment, FIG. 33 illustrates three different byte-based funnel shift results designated $SH_1$, $SH_2$, and $SH_3$. Starting to the left of FIG. 33, it shows two 32-bit data arguments, shown as A[31:0] and B[31:0], each broken into four respective bytes $A_0$ through $A_3$ and $B_0$ through $B_3$, where the two data arguments are concatenated to form a 64-bit quantity. This same quantity is repeated twice more in FIG. 33, but continuing with the first illustration of it to the left of the Figure, next to that illustration and to its right is an indication of the result a FUNNEL SHIFT instruction for a one byte shift, shown as $SH_1$. To obtain $SH_1$, the concatenated 64-bit quantity is shifted one byte to the right, and the least significant 32 bits form the result, $SH_1$. This same general technique is also illustrated for a FUNNEL SHIFT instruction executing a two-byte shift, $SH_2$ in the middle of FIG. 33, and for a FUNNEL SHIFT instruction executing a three-byte shift, $SH_3$, toward the right of FIG. 33. In each instance, therefore, the 64-bit concatenated value is right shifted a number of bytes (i.e., 1, 2, or 3 bytes), and the result $SH_x$ is the 32 LSBs after the right shift.

Having demonstrated the results of the FUNNEL SHIFT instruction, attention is returned to system $200_4$ of FIG. 32, which includes certain modifications to system $200_1$ of FIG. 23 in a preferred embodiment for implementing the FUNNEL SHIFT instruction and producing a corresponding executed result, $V_{EXEC\_FS}$. As further shown below, system $200_4$ requires only the right rotation operation of data rotate unit 200 and the selection of its output by multiplexer 502; thus, to simplify the figure other aspects from previous embodiments are not shown, while two additional aspects are included so as to support the FUNNEL SHIFT instruction. System $200_4$ includes a rotate data forwarding multiplexer 570, which is connected to receive two 32-bit arguments, shown as A[31:0] and B[31:0]. Logically, these two values are shown to be stored in respective storage devices $570_{SA}$ and $570_{SB}$, where those devices actually may merely represent the gating of such data as opposed to more complex storage circuitry. For sake of reference, each of storage devices $570_{SA}$ and $570_{SB}$ is shown to include four separate bytes from A[31:0] and B[31:0], respectively. Rotate data forwarding multiplexer 570 also includes four single-byte multiplexers $570_{BM0}$, $570_{BM1}$, $570_{BM2}$, and $570_{BM3}$, where each such multiplexer has one input connected to receive a byte from storage device $570_{SA}$ and another input connected to receive a like-positioned byte from storage device $570_{SB}$. Thus, byte multiplexer $570_{BM0}$ is connected to receive byte $A_0$ and byte $B_0$, byte multiplexer $570_{BM1}$ is connected to receive byte $A_1$ and byte $B_1$, byte multiplexer $570_{BM2}$ is connected to receive byte $A_2$ and byte $B_2$, and byte multiplexer $570_{BM3}$ is connected to receive byte $A_3$ and byte $B_3$. Rotate data forwarding multiplexer 570 also includes a data storage area $570_D$, again that may be implemented simply by gating data, and which receives a single byte from the output of each of byte multiplexers $570_{BM0}$, $570_{BM1}$, $570_{BM2}$, and $570_{BM3}$. The combined storage from area $570_D$ thus provides data D[31:0] to data rotate unit 200. Data rotate unit 200, in the same manner as described above, also receives the value of the R shift argument, which may come in the form of a right shift pin argument $R_{ARG1}$ (not shown); for reasons appreciated below, the value of the left shift argument, L, has no effect on system $200_4$ for realizing the FUNNEL SHIFT instruction and, thus, it is not shown in FIG. 32. System $200_4$ also includes an all ones mask adjust block 572, which in executing the FUNNEL SHIFT instruction outputs a 32-bit code $C_{FS}$ that includes all values of one. Thus, unlike previous systems, no thermometer code having both ones and zeros is required. Indeed, if system $200_4$ is combined with other previously-described systems, then any such thermometer codes may be input to all ones mask adjust block 572 which, in response, will in place of such a code(s) output the all-one-value code $C_{FS}$, where that output is connected to the control input of multiplexer 502. Moreover, because only ones are provided as a control input to multiplexer 502, then multiplexer 502 will necessarily select the entire 32 bits from its "1" input, thereby ignoring the value, if any, provided to its "0" input; for simplification, therefore, in FIG. 32 no input is shown to the "0" input of multiplexer 502, although an input may be provided yet it will be ignored during execution of the FUNNEL SHIFT instruction. Lastly, the output of multiplexer 502 provides the executed result, $V_{EXEC\_FS}$, for the FUNNEL SHIFT instruction.

The operation of system $200_4$ is now described. In general, system $200_4$ performs a right rotation of data D[31:0], where due to the byte granularity nature of the FUNNEL SHIFT instruction, the extent of the right shift, as indicated in R or $R_{ARG1}$, will be a number of bit positions equal to either 8, 16, or 24 bits (i.e., 1, 2, or 3 bytes). Moreover, because code $C_{FS}$ provides all ones to the control input of multiplexer 502, then the final executed result, $V_{EXEC\_FS}$, provides the entire rotated value of D[31:0] without any additional masking or changing of bits. To fully appreciate, however, that each such result can match that of the desired shift examples in FIG. 33, attention is further directed to the operation of rotate data forwarding multiplexer 570, as discussed immediately below.

Figure 34:
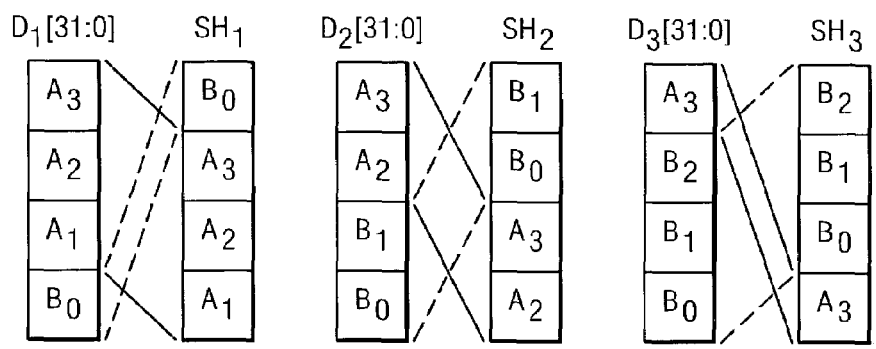
FIG. 34 illustrates an example of the preferred embodiment execution of the FUNNEL SHIFT instruction.

The operation of rotate data forwarding multiplexer 570 and the additional data manipulation of system $200_4$ using the FUNNEL SHIFT instruction is illustrated in connection with FIG. 34. In part, FIG. 34 illustrates the manner in which the A and B data arguments can be manipulated by rotate data forwarding multiplexer 570 prior to being right-byte rotated by data rotate unit 200 of system $200_4$. As a first example, looking to the left of FIG. 34, it illustrates a first instance of a value stored in storage area $570_D$ where the value is shown as $D_1[31:0]$. Value $D_1[31:0]$ is achieved by controlling byte multiplexer $570_{BM0}$ to select $B_0$ from storage area $570_{SB}$, while each of byte multiplexers $570_{BM1}$, $570_{BM2}$, and $570_{BM3}$ select respective bytes $A_1$, $A_2$, and $A_3$ from storage area $570_{SA}$. Immediately to the right of value $D_1[31:0]$, FIG. 34 also illustrates a right rotation for R=8, that is, 8 bit positions or 1 byte. Specifically, the value of R=8 is provided as a shift argument to data rotate unit 200, while value $D_1[31:0]$ is provided as data. The right rotation provides the result $SH_1$, which due to the all one values in code $C_{FS}$, passes through multiplexer 502 to provided $V_{EXEC\_FS}$. Now, comparing FIGS. 34 and 33, one skilled in the art will appreciate that the same result, $SH_1$, is realized in both figures. Thus, FIG. 34 has demonstrated that the result $SH_1$ may be achieved by first manipulating the data arguments A[31:0] and B[31:0] using rotate data forwarding multiplexer 570, followed by a right byte rotation using data rotate unit 200.

The remainder of FIG. 34 illustrates the two examples of a FUNNEL SHIFT instruction for 2 and 3 bytes, respectively. In the middle of FIG. 34, value $D_2[31:0]$ demonstrates the instance where byte multiplexers $570_{BM0}$ and $570_{BM1}$ select respective bytes $B_0$ and $B_1$ from storage area $570_{SB}$, while byte multiplexers $570_{BM2}$ and $570_{BM3}$ select respective bytes $A_2$ and $A_3$ from storage area $570_{SA}$. Immediately to the right of value $D_2[31:0]$, FIG. 34 also illustrates a right rotation for R=16, that is, 16 bit positions or 2 bytes. The right rotation provides the result $SH_2$, is provided as $V_{EXEC\_FS}$. Also, again comparing FIGS. 34 and 33, one skilled in the art will appreciate that the same result, $SH_2$, is realized in both figures. Completing FIG. 34 to its right, value $D_3[31:0]$ demonstrates the instance where byte multiplexers $570_{BM0}$, $570_{BM1}$, and $570_{BM2}$ select respective bytes $B_0$, $B_1$, and $B_2$ from storage area $570_{SB}$, while byte multiplexer $570_{BM3}$ selects byte $A_3$ from storage area $570_{SA}$. Immediately to the right of value $D_3[31:0]$, FIG. 34 also illustrates a right rotation for R=24, that is, 24 bit positions or 3 bytes. The right rotation provides the result $SH_3$, is provided as $V_{EXEC\_FS}$. Once more comparing FIGS. 34 and 33, one skilled in the art will appreciate that the same result, $SH_3$, is realized in both figures.

Figure 35:
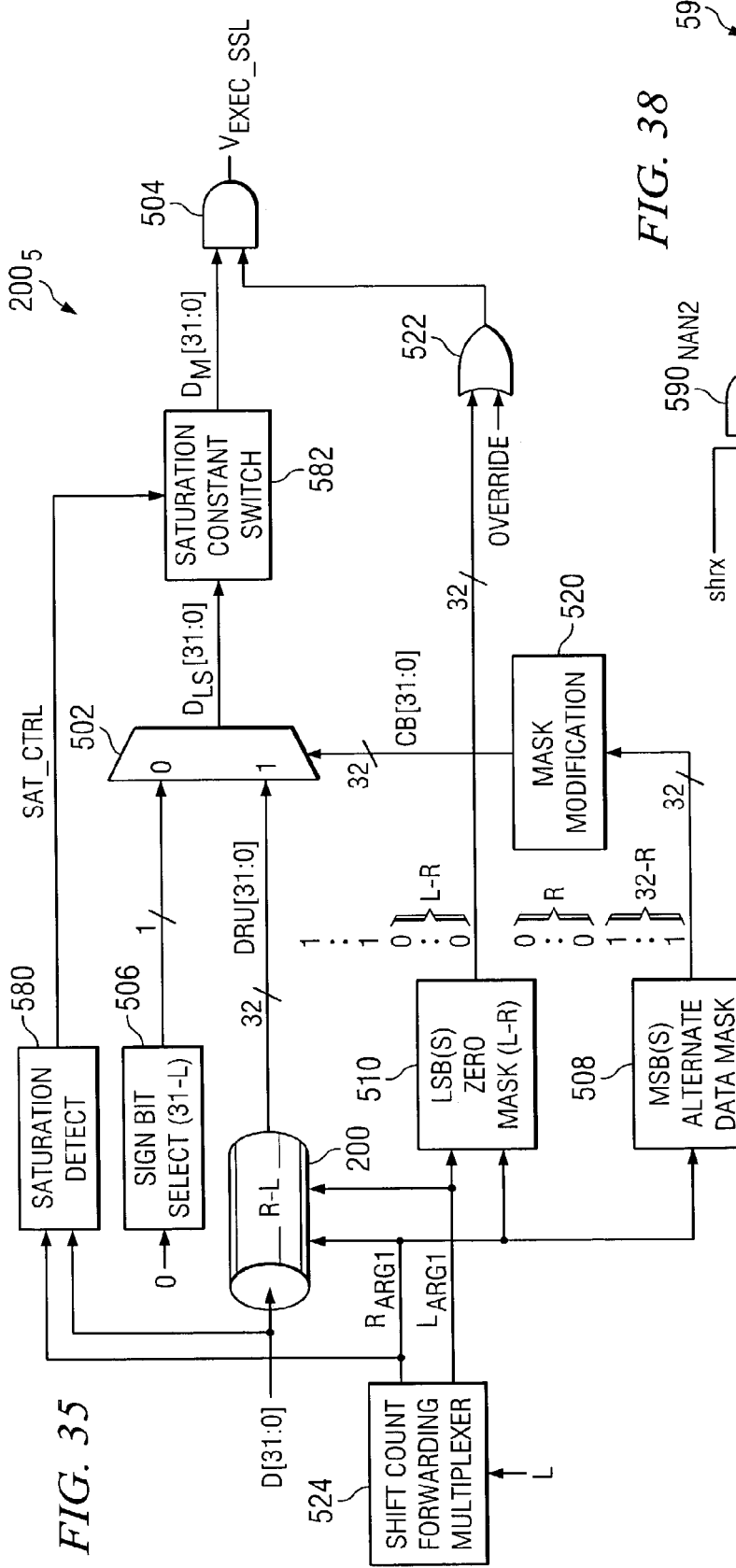
FIG. 35 illustrates a block diagram of a system for executing a SATURATING SHIFT LEFT instruction.

System $200_1$ of FIG. 23 also may be modified to readily achieve the results of what is referred to in prior art processors as a SATURATING SHIFT LEFT instruction, which as known in the art performs comparably to the SHIFT LEFT instruction, with the additional aspect that if a number is shifted to an extent that would reach or extend beyond the precision of the processor (i.e., cause saturation), then the result provided is not the shifted number but instead is a saturation constant. In the preferred embodiment, therefore, the SHIFT LEFT instruction system $200_2$ of FIG. 28 is modified to provide a system $200_5$, shown in FIG. 35, which is operable to execute the SATURATING SHIFT LEFT instruction. Generally, system $200_5$ includes many of the same aspects of system $200_2$, and the reader is assumed familiar with those aspects due to the earlier explanation of them in connection with system $200_2$. Where system $200_5$ differs from system $200_2$, is in the addition of a saturation detect block 580 that is connected to receive both the data to be rotated, D[31:0], as well as the 5-bit right shift pin argument $R_{ARG1}$, which recall for a SHIFT LEFT instruction actually provides the value of the desired left shift argument, L, as received on the five least significant pins of the concatenated pin argument $C_{ARG1}$. Saturation detect block 580 provides a control signal to a saturation constant switch 582. Saturation constant switch 582 is also connected to receive the left-shifted data, $D_{LS}[31:0]$, from the output of multiplexer 502, and to output a corresponding and potentially modified value, $D_M[31:0]$, to an input of AND gate 504.

The operation of system $200_5$ to execute a SATURATING SHIFT LEFT instruction is now explored, first by looking to saturation detect block 580. Saturation detect block 580 determines from both D[31:0] and the desired amount of left shift (as provided by $R_{ARG1}$) whether the result following the desired shift will exceed the 32-bit precision of system $200_5$. Such a device may be constructed in various manners by one skilled in the art. In the preferred embodiment, block 580 determines whether the most significant digit ("MSD") in D[31:0], if shifted left the desired amount, would reach the MSB position (i.e., bit position 31) of data rotate unit 200 or higher. Note here that the term "most significant digit" depends on whether the data D[31:0] is positive or negative; if positive, then the MSD is the most significant bit position containing a value of one, whereas if negative then the MSD is the most significant bit position containing a value of zero. If the desired shift will bring that MSD into bit position 31, or higher, of data rotate unit 200, then that shift will violate the requirement that the MSB position be reserved to provide a sign bit, thereby exceeding the precision of data rotate unit 200. In this case, saturation detect block 580 asserts its control signal, SAT_CTRL, to saturation constant switch 580, where in contrast if saturation would not occur after the desired shift, then saturation detect block 580 does not assert SAT_CTRL.

In general, saturation constant switch 582 either passes its input directly to its output when no saturation is occurring, or alternatively it outputs the appropriate saturation constant when saturation is occurring. More specifically, when SAT_CTRL is asserted, then switch 582 is informed that saturation is occurring. In response, it outputs either a positive or negative saturation constant, based respectively on whether the data to be rotated, D[31:0], is positive or negative. If D[31:0] is positive, then for a 32-bit number, the positive saturation constant is 0x7fffffff, that is, the largest magnitude positive number permissible for 32-bit precision. If D[31:0] is negative, then for a 32-bit number, the negative saturation constant is 0x80000000, that is, the largest magnitude negative number permissible for 32-bit precision. Thus, when positive saturation exists, then $D_M[31:0]=$ 0x7fffffff, when negative saturation exists, then $D_M[31:0]=$ 0x80000000, and if no saturation exists, then $D_M[31:0]=D_{LS}$ [31:0] (i.e., the input passes unchanged to the output). In any event, the remainder of system $200_5$ operates in the same manner as system $200_2$ in connection with the SHIFT LEFT instruction. Thus, once $D_M[31:0]$ is provided, and recall that OVERRIDE is asserted high for the SHIFT LEFT instruction, then $D_M[31:0]$ is passed by AND gate 504 to provide the result, $V_{EXEC\_SSL}$, for having executed the SATURATING SHIFT LEFT instruction.

Figure 36:
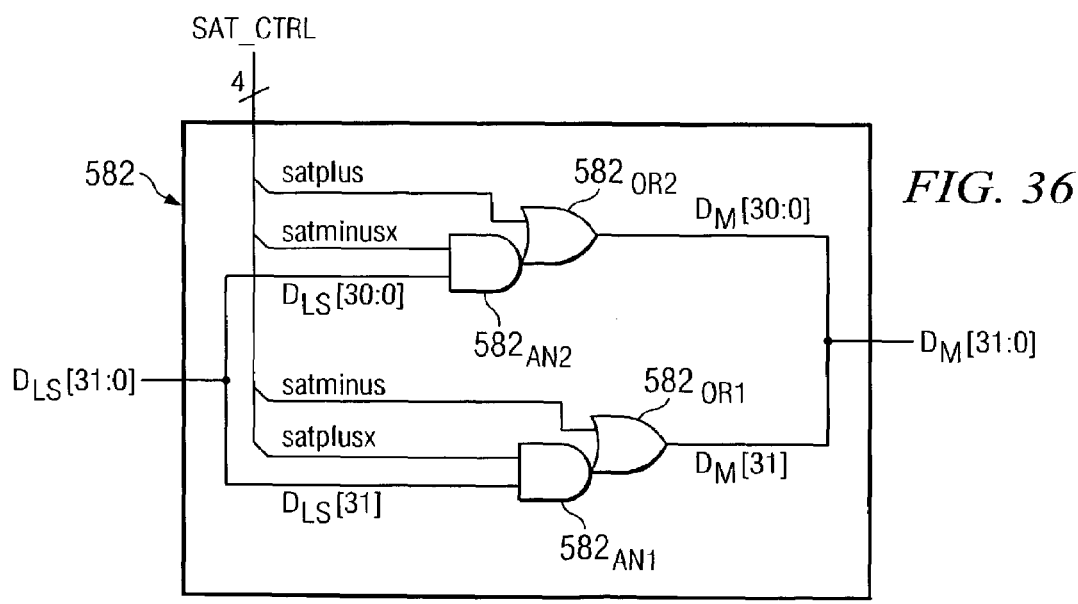
FIG. 36 illustrates a block diagram of a preferred embodiment for implementing the saturation switch of FIG. 35.

FIG. 36 illustrates a block diagram of a preferred embodiment for implementing saturation switch 582 of system $200_5$. By way of introduction, note that the functionality of alternatively permitting $D_{LS}[31:0]$ to either pass through switch 582 or be replaced with a saturation constant could be implemented using a multiplexer. However, such an approach may be undesirably slow in some applications. Accordingly, in the preferred embodiment, switch 582 is implemented using logic. More particularly, FIG. 36 illustrates that the control signal SAT_CTRL consists of four separate control signals, satplus, satminus, and their respective complements satplusx and satminusx (where the "x" a the end of these and other signal names herein indictes that the signal is a complement). The signals satplus and satminus are asserted by saturation detect block 580 when positive or negative saturation, respectively, occurs, and consequently the complements, satplusx and satminusx are asserted by saturation detect block 580 when positive or negative saturation, respectively, does not occur. The most significant bit, $D_{LS}[31]$, of the input $D_{LS}[31:0]$ to switch 528, is connected as a first input to an AND gate $582_{AN1}$, which has its output connected to a first input of an OR gate $582_{OR1}$, where gates $582_{AN1}$ and $582_{OR1}$ are preferably formed as a single complex OR-after-AND gate. A second input of AND gate $582_{AN1}$ is connected to receive the satplusx signal, and a second input of OR gate $582_{OR1}$ is connected to receive the satminus signal. The remaining 31 LSBs, $D_{LS}[30:0]$, of $D_{LS}[31:0]$, are connected to a same type of circuit, one of which is shown by way of example in FIG. 36 with it understood that such circuit is duplicated for a total of 31 similar circuits for each of the remaining 31 LSBs, $D_{LS}[30:0]$. Specifically, each of those bits is connected as a first input to an AND gate $528_{AN2}$, which has its output connected to a first input of an OR gate $582_{OR2}$, where gates $582_{AN2}$ and $582_{OR2}$ are preferably formed as a single complex OR-after-AND gate. A second input of AND gate $582_{AN2}$ is connected to receive the satminusx signal, and a second input of OR gate $582_{OR2}$ is connected to receive the satplus signal.

The operation of switch 582 is now described. In general, when saturation is detected, switch 582, using logic circuitry, effectively transforms the input to the appropriate one of either the positive or negative saturation constant, whereas when saturation is not detected, switch 582, using the same logic circuitry, allows the input $D_{LS}[31:0]$ to pass to the output and become $D_M[31:0]$. Each of these instances is now explored in greater detail. By way of further appreciation of switch 582, the following Table 9 provides the various alternative states of the control signal in switch 582 based on whether saturation occurs and, if so, whether that saturation is positive or negative.

TABLE 9

| Signal | Positive saturation value | Negative saturation value | No saturation value |
|---|---|---|---|
| satplus | 1 | 0 | 0 |
| satplusx | 0 | 1 | 1 |
| satminus | 0 | 1 | 0 |
| satminusx | 1 | 0 | 1 |

Looking at the operation of switch 582 when positive saturation is detected, then the four control signals in SAT_CTRL as provided by saturation detect block 580 are as shown in the first value column of Table 9. In response to satplus=1, the output of OR gate $582_{OR2}$ equals one regardless of the output of AND gate $582_{AN2}$ and, thus, each of the bits in $D_M[30:0]$ equals 1. At the same time, in response to satplusx=0, the output of AND gate $582_{AN1}$ equals 0, while at the same time satminus=0; thus, the output of OR gate $582_{OR1}$, that is, bit $D_M[31]$, equals 0. Accordingly, when positive saturation is detected, $D_M[31:0]$ equals the desired positive saturation constant of 0x7fffffff.

Looking at the operation of switch 582 when negative saturation is detected, then the four control signals in SAT_CTRL as provided by saturation detect block 580 are as shown in the second value column of Table 9. In response to satminus=1, the output of OR gate $582_{OR1}$ equals one regardless of the output of AND gate $582_{AN1}$ and, thus, bit $D_M[31]$, equals 1. At the same time, in response to satminusx=0, the output of AND gate $582_{AN2}$ equals 0, while at the same time satplus=0; thus, the output of OR gate $582_{OR2}$ equals 0, and, hence, each of the bits in $D_M[30:0]$ equals 0. Accordingly, when negative saturation is detected, $D_M[31:0]$ equals the desired negative saturation constant of 0x80000000.

Looking at the operation of switch 582 when no saturation is detected, then the four control signals in SAT_CTRL as provided by saturation detect block 580 are as shown in the third value column of Table 9. In response to satplusx=1, the output of AND gate $582_{AN1}$ passes the data $D_{LS}[31]$, and in response to satminus=0, the output of OR gate $582_{OR1}$ passes the output of AND gate $582_{AN1}$, which is passing $D_{LS}[31]$. Thus, when no saturation is detected, $D_M[31]$ equals $D_{LS}[31]$. Additionally when no saturation is detected, in response to satminusx=1, the output of AND gate $582_{AN2}$ passes the data $D_{LS}[30:0]$, and in response to satplus=0, the output of OR gate $582_{OR2}$ passes the output of AND gate $582_{AN2}$, which is passing $D_{LS}[30:0]$. Thus, when no saturation is detected, $D_M[30:0]$ equals $D_{LS}[30:0]$. The preceding therefore demonstrates that again the desired result is reached, that is, when no saturation is detected, $D_M[31:0]$ equals $D_{LS}[31:0]$.

Figure 37:
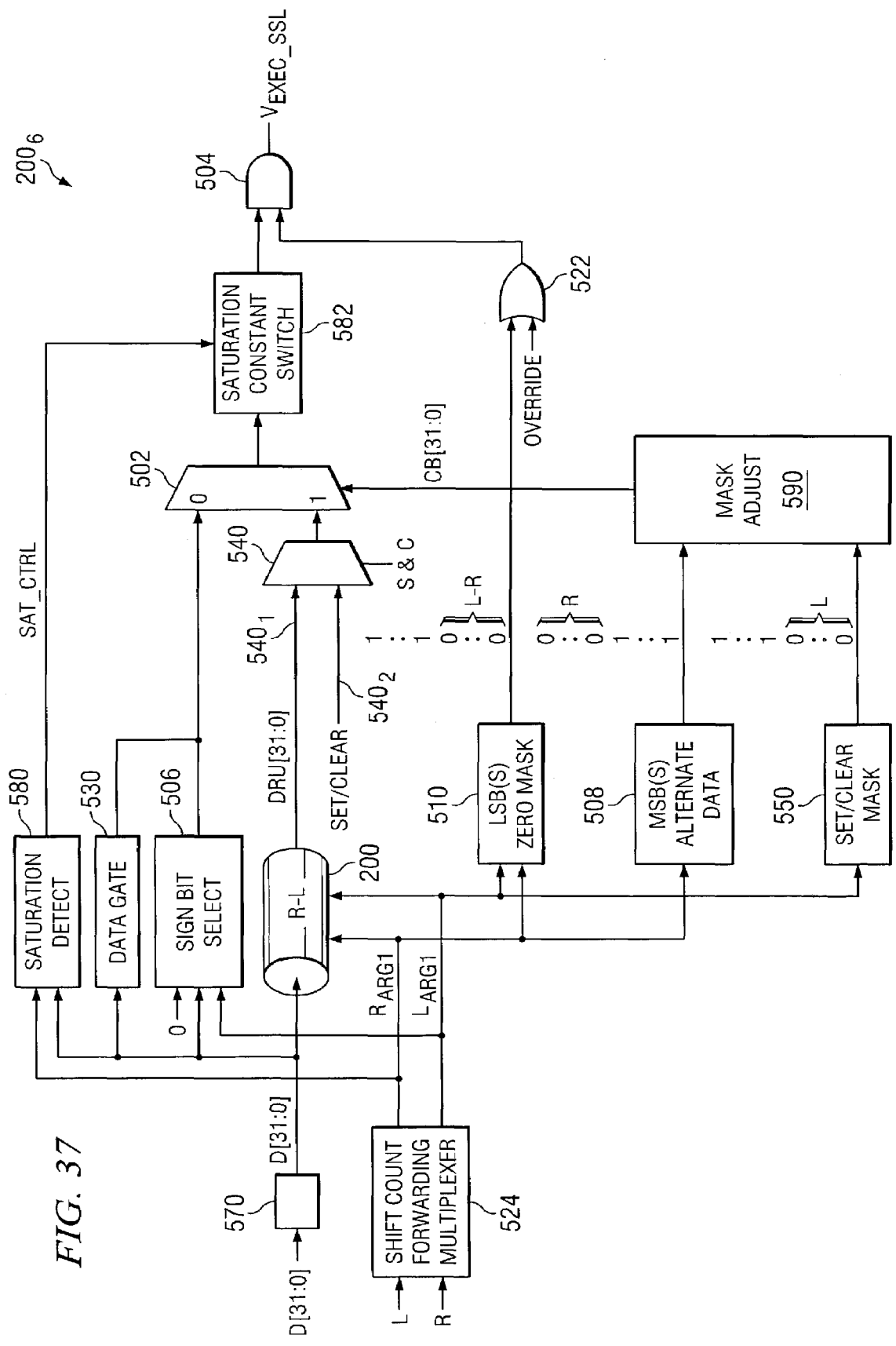
FIG. 37 illustrates a block diagram of a combined system for executing each of the following instructions: EXTRACT, SHIFT RIGHT, SHIFT LEFT, SET, CLEAR, FUNNEL SHIFT, and SATURATING SHIFT LEFT.

Having described various systems $200_1$ through $200_5$, FIG. 37 illustrates that those systems all may be combined into a single system $200_6$ with a common data rotate unit 200 to achieve all of the above-described instructions, namely: EXTRACT, SHIFT RIGHT, SHIFT LEFT, SET, CLEAR, FUNNEL SHIFT, and SATURATING SHIFT LEFT. From comparing FIG. 37 to the Figures illustrating the previously-described systems, one skilled in the art will confirm the various mutual connections as having been combined into a single system. Further, for sake of simplicity, note that mask adjustments were made in some of the above-described systems, such as through mask modification block 520 of system $200_2$ in FIG. 28, mask combine block 560 of system $200_3$ in FIG. 29, and all ones mask adjust block 572 of system $200_4$ in FIG. 32. Since each of these mask-adjusting blocks may respond to a thermometer code provided by either or both of MSB(s) alternate data block 508 and set/clear mask block 550, then FIG. 37 combines each of these possible adjustments into a single mask adjustment block 590, where that block is therefore intended to encompass all of the above-described potential mask adjustments, and in which case the adjusted value is used to provide the control bit signal, CB[31:0], to control multiplexer 502. Moreover, also in connection with multiplexer 502, the various alternative data inputs are shown with respect to its "0" input, such as the possibility of receiving the sign bit or a value of zero from sign bit select block 506, or the input data D[31:0] from data gate 530. Also in connection with multiplexer 502 are shown the various alternative data inputs with respect to its "1" input, including the output from data rotate unit 200 or a set or clear bit, the selection of these being controlled by multiplexer 540. Lastly, the output of multiplexer 502 may pass directly through, or be adjusted by, saturation constant switch 582, and is then ANDed via AND gate 504 with the output of LSB(s) zero mask block 510, unless that block's output is overridden by assertion of the OVERRIDE signal to OR gate 522, in which case AND gate 504 passes its other input to its output. Finally, therefore, the output of AND gate 504 produces the resulting value, $V_{EXEC\_F}$, corresponding to the execution of whatever one of the above-described selected instructions.

Figure 38:
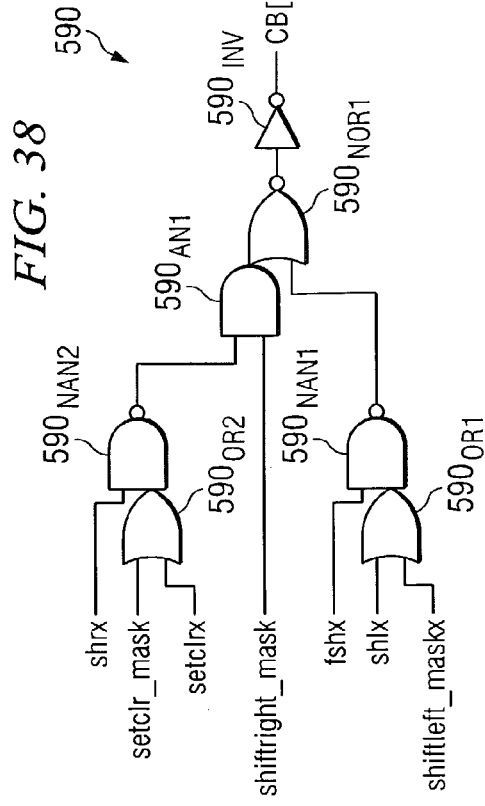
FIG. 38 illustrates a schematic of one bit of mask adjust block of FIG. 37.

FIG. 38 illustrates a schematic of one bit of mask adjust block 590 of FIG. 37 and implemented using static logic, where in the preferred embodiment the one-bit schematic is duplicated for a total of 32 bits to accommodate the 32-bit thermometer codes and to output the control bit code, CB[31:0], to multiplexer 502 for various instructions. By way of introduction, recall that mask adjust block 590 combines the functions of various of the mask adjusting blocks described above. Block 590 includes an OR gate $590_{OR1}$ having one input for receiving a signal shlx, which as an active low signal, is low when the SHIFT LEFT instruction is executed, and OR gate $590_{OR1}$ includes another input for receiving shiftleft_maskx, the active low mask corresponding to the SHIFT LEFT instruction. The output of OR gate $590_{OR1}$ is connected as one input to an NAND gate $590_{NAN1}$, where OR gate $590_{OR1}$ and NAND gate $590_{NAN1}$ are preferably constructed as a single complex gate. Another input of NAND gate $590_{NAN1}$ receives the signal fshx, which is an active low signal asserted low for execution of the FUNNEL SHIFT instruction. The output of NAND gate $590_{NAN1}$ is connected as an input to a NOR gate $590_{NOR1}$, which has its other input connected to the output of an AND gate $590_{AN1}$. One input of AND gate $590_{AN1}$ receives the shiftright_mask signal, which represents a bit from the mask from MSB(S) alternate data mask block 508 and where shiftleft_maskx is created by downshifting shiftright_mask one bit. The other input of AND gate $590_{AN1}$ receives the output of a NAND gate $590_{NAN2}$. One input of NAND gate $590_{NAN2}$ is connected to the output of an OR gate $590_{OR2}$, and the other input of NAND gate $590_{NAN2}$ is connected to receive a signal shrx, an active low signal asserted low for the SHIFT RIGHT instruction. One input of OR gate $590_{OR2}$ is connected to receive the signal setclrx, which is an active low signal asserted low for execution of either the SET or CLEAR instruction. The other input of OR gate $590_{OR2}$ is connected to receive the setclr_mask, which represents a bit from the set/clear mask block 550. Lastly, the output of NOR gate $590_{NOR1}$ is connected through an inverter $590_{INV}$, and the output of inverter $590_{INV}$ provides the control bit signal, CB[31:0].

The operation of the schematic of FIG. 38 to implement mask adjust block 590 should be readily understood given the earlier description of the block functionality as well as the signal definitions provided with respect to FIG. 38, and will vary based on the different instructions. Thus, such operation is briefly described for various instructions below.

With respect to FIG. 38 and when the SHIFT RIGHT instruction is executed, then shrx is low thereby forcing the output of NAND gate $590_{NAN2}$ to be high and this high is connected as an input to AND gate $590_{AN1}$, which causes AND gate $590_{AN1}$ to pass to its output the value at its other input, shiftright_mask; at the same time, shlx is high which forces a high output out of OR gate $590_{OR1}$, and that high is combined with the high of fshx causing the output of NAND gate $590_{NAN1}$ to be low. This low is connected as an input to NOR gate $590_{NOR1}$, which as a result outputs the complement of its other input, which as shown above is the shift right_mask as passed by AND gate $590_{AN1}$. This complement is then inverted by inverter $590_{INV}$, thereby passing the shift right_mask bit to multiplexer 502.

With respect to FIG. 38 and when the SHIFT LEFT instruction is executed, then shlx is low, which causes OR gate $590_{OR1}$ to output the value of its other input, namely, shiftleft_maskx, that is, the complement of the left shift mask bit. At the same time, fshx is high, thereby causing NAND gate $590_{NAN1}$ to pass to its output its other input, namely, the value of shiftleft_maskx and, further, NAND gate $590_{NAN1}$ forms the complement of that data, thereby providing the actual value shiftleft_mask as an input to NOR gate $590_{NOR1}$. At the same time, setclrx is high causing OR gate $590_{OR2}$ to output a high as one input to NAND gate $590_{NAN2}$, and the other input to that NAND gate $590_{NAN2}$, shrx, is also high, thereby causing NAND gate $590_{NAN2}$ to output a low to AND gate $590_{AN1}$ and, hence, also causing that AND gate $590_{AN1}$ also to output a low to NOR gate $590_{NOR1}$. This low received by NOR gate $590_{NOR1}$ causes it to pass to its output the value at its other input, which recall has been shown to be the actual value shiftleft_mask, and as a NOR gate, that value is complemented when it is ouput. However, the complement, shiftleft_maskx, then is inverted again as it passes through inverter $590_{INV}$, in which case inverter $590_{INV}$ then outputs the value of shiftleft_mask to multiplexer 502.

With respect to FIG. 38 and when either the SET or CLEAR instruction is executed, then setclrx is low, which causes OR gate $590_{OR2}$, to output the value of its other input, namely, setclr_maskx, that is, the complement of the set/clear mask bit. At the same time, shrx is high, causing NAND gate $590_{NAN2}$ to output the complement of its other input, where that input has been shown to be setclr_maskx; thus, NAND gate $590_{NAN2}$ outputs setclr_mask to AND gate $590_{AN1}$, which is receiving shiftright_mask at its other input. Also at the same time, shlx is high thereby forcing the output of OR gate $590_{OR1}$ high, and this high input is provided to NAND gate $590_{NAN1}$ along with another high input, fshx; thus, the output of NAND gate $590_{NAN1}$ is forced low by these two high inputs, and this low is connected to NOR gate $590_{NOR1}$, thereby causing it to output the complement of its other input. That other input has been shown above to be setclr_mask, which is inverted by NOR gate $590_{NOR1}$ and, thus, output as setclr_maskx. However, that inverted value is then inverted again by inverter $590_{INV}$, thereby outputting the value of setclr_mask ANDed with shiftright_mask to multiplexer 502.

With respect to FIG. 38 and when the FUNNEL SHIFT instruction is executed, then fshx is low thereby forcing the output of NAND gate $590_{NAN1}$ to be high. This high is input to NOR gate $590_{NOR1}$, thereby forcing its output to be low, and that low is then inverted by inverter $590_{INV}$ to output a one to multiplexer 502. Thus, for each of the 32 bits in CB[31:0], then each circuit similar to the schematic of FIG. 38 likewise outputs a one, thereby serving the function described above in connection with all ones mask adjust block 572, as used for the FUNNEL SHIFT instruction.

Figure 39:
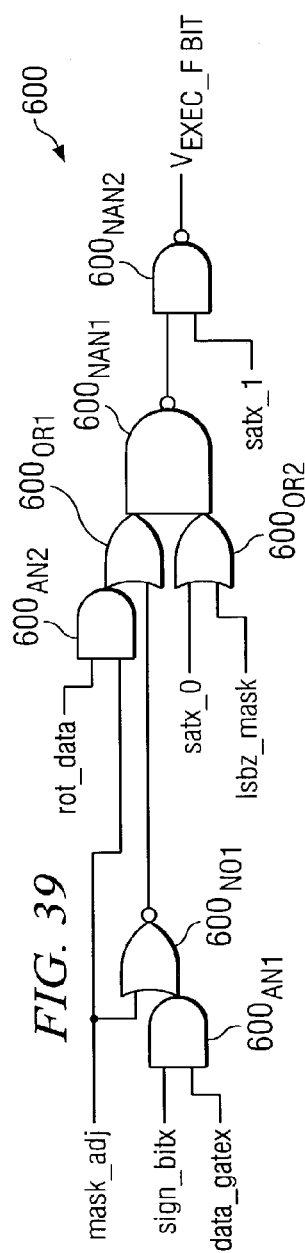
FIG. 39 illustrates a static logic circuit system 600 for implementing various of the signal selectivity provided by multiplexer 502, saturation constant switch 582, and AND gate 504 of FIG. 37 and to thereby output one bit for the output signal $V_{EXEC\_F}$.

FIG. 39 illustrates a static logic circuit system 600 for implementing various of the signal selectivity provided by multiplexer 502, saturation constant switch 582, and AND gate 504 of FIG. 37, to thereby output one bit for the output signal $V_{EXEC\_F}$; thus, system 600 is in the preferred embodiment duplicated for a total of 32 like-design circuits, one for each bit in $V_{EXEC\_F}$. Turning to the signals and devices in circuit 600, a signal sign_bitx, representing an active low output of sign bit select block 506, is connected as an input to an AND gate $600_{AN1}$. Another input of AND gate $600_{AN1}$ is connected to receive a signal data_gatex, an active low signal representing the output of data gate 530. The output of AND gate $600_{AN1}$ is connected as an input to a NOR gate $600_{NO1}$, which has another input connected to receive a signal mask_adj, which is one bit of the control bit code, CB[31:0], output by mask adjust block 590. The signal mask_adj is also connected as an input to an AND gate $600_{AN2}$, which also receives a signal, rot_data, representing a single bit of the output signal, DRU[31:0], from data rotate unit 200. The output of AND gate $600_{AN2}$ is connected as an input to an OR gate $600_{OR1}$, which receives as another input the output of NOR gate $600_{NO1}$. The output of OR gate $600_{OR1}$ is connected as an input to an NAND gate $600_{NAN1}$. Another input of NAND gate $600_{NAN1}$ is connected to the output of an OR gate $600_{OR2}$. One input of OR gate $600_{OR2}$ is connected to receive a signal satx_0, which is asserted active low when a saturation output bit of 0 is desired, and another input of OR gate $600_{OR2}$ is connected to a signal, lsbz_mask, representing one bit of the output of LSB(s) zero mask block 510. The output of NAND gate $600_{NAN1}$ is connected as an input to a NAND gate $600_{NAN2}$, which has a another input connected to receive a signal satx_1, which is asserted active low asserted when a saturation output bit of 1 is desired.

The operation of circuit system 600 will be understood by one skilled in the art given the above-described signal definitions as well as the functional descriptions provided earlier and, thus, only certain aspects are briefly observed here. First, note that the signal lsbz_mask is valid only for an EXTRACT instruction and, for all other instructions, it is a value of zero (comparable to the complement of the effect of the above-described OVERRIDE signal). Next, looking to the instances of saturation, when it is desired for the output bit of $V_{EXEC\_F}$ to be a 1 (e.g., for the MSB in negative saturation or for all bits other than the MSB in positive saturation), then satx_1 is asserted low and satx_0 is high. The former forces the output $V_{EXEC\_F}$ of NAND gate $600_{NAN2}$ to be high, thereby accomplishing the desired result. In the opposite saturation case, when it is desired for the output bit of $V_{EXEC\_F}$ to be a 0 (e.g., for the MSB in positive saturation or for all bits other than the MSB in negative saturation), then satx_0 is asserted low and satx_1 is asserted high. During this time, lsbz_mask is low because this is not a case of the EXTRACT instruction and, thus, there are two low signals input to OR gate $600_{OR2}$, forcing its output low and, thus, also forcing the output of NAND gate $600_{NAN1}$ high. This high is coupled with the high value of satx_1 into NAND gate $600_{NAN2}$ produces a low value of $V_{EXEC\_F}$, thereby accomplishing the desired result.

Consider now the operation of circuit system 600 for the EXTRACT instruction where recall that the MSB(s) of $V_{EXEC\_F}$ will include the sign bit while some the remaining LSB(s) of $V_{EXEC\_F}$ will include rotated data. Toward this end, to provide a sign bit, mask_adj is low, and this low is input to NOR gate $600_{NO1}$, thereby causing it to output the complement of its other input. The other input is provided by the output of AND gate $600_{AN1}$, which for the EXTRACT instruction outputs sign_bitx because during that instruction data_gate is high, which therefore causes it to output sign_bit (i.e., the complement of sign_bitx), and sign_bit is thus an input to OR gate $600_{OR1}$. The other input of OR gate $600_{OR1}$ receives a low value from the output of AND gate $600_{AN2}$, due also to the low value of mask_adj as input to AND gate $600_{AN2}$; thus, OR gate $600_{OR1}$ passes the value of sign_bit to an input of NAND gate $600_{NAN1}$, which receives at its other input a value of one because lsbz_mask is high (where its other input, satx_0, is low for the EXTRACT instruction). Thus, NAND gate $600_{NAN1}$ outputs the complement of sign_bit and, thus, this output is again sign_bitx, which is connected as an input to NAND gate $600_{NAN2}$, which receives a high value at its other input because satx_1 is also high for the EXTRACT instruction. Thus, NAND gate $600_{NAN2}$ complements the input of sign_bitx, thereby outputting the value of sign_bit for $V_{EXEC\_F}$. Also in connection with the EXTRACT instruction but to provide the rot_data as the output bit (i.e., as $V_{EXEC\_F}$), then mask_adj is asserted high, thereby causing AND gate $600_{AN2}$ to output rot_data to OR gate $600_{OR1}$ as one input, while the other input of OR gate $600_{OR1}$ will be low because it is provided by NOR gate $600_{NO1}$, which is forced to a low output by its high input value of mask_adj. Thus, OR gate $600_{OR1}$ passes rot_data as an input to NAND gate $600_{NAN1}$, which will receive a high at its other input from OR gate $600_{OR2}$ which receives a high input from lsbz_mask. Thus, NAND gate $600_{NAN1}$ outputs rot_datax, the complement of rot_data, but that complement is then inverted again by NAND gate $600_{NAN2}$ because its input satx_1 is also high for the EXTRACT instruction. Thus, rot_data is output as $V_{EXEC\_F}$.

Consider now the operation of circuit system 600 for the EXTRACT instruction in the case where L>R in which case the LSB(s) will include a value of zero due to the output of LSB(s) zero mask block 510. This output is achieved in circuit system 600 by setting the lsbz_mask bit equal to zero; again, since satx_0 is held low for the EXTRACT instruction, then the zero value of lsbz_mask together with the low satx_0 cause OR gate $600_{OR2}$ to output a low to NAND gate $600_{NAN1}$, thereby causing its output to be high. That his is ANDed with satx_1, which for the EXTRACT instruction is high, thereby providing a low output of NAND gate $600_{NAN2}$ and, thus, providing the zero for the LSB(s) zero mask block 510.

Completing the operation of circuit system 600, the value of the data_gatex also may be provided as $V_{EXEC\_F}$ in the same manner as described above with respect to outputting the sign_bitx bit. From the above, therefore, one skilled in the art will appreciate that this can be achieved by setting mask_adj to a low value and by providing sign_bitx as a high value.

Figure 40:
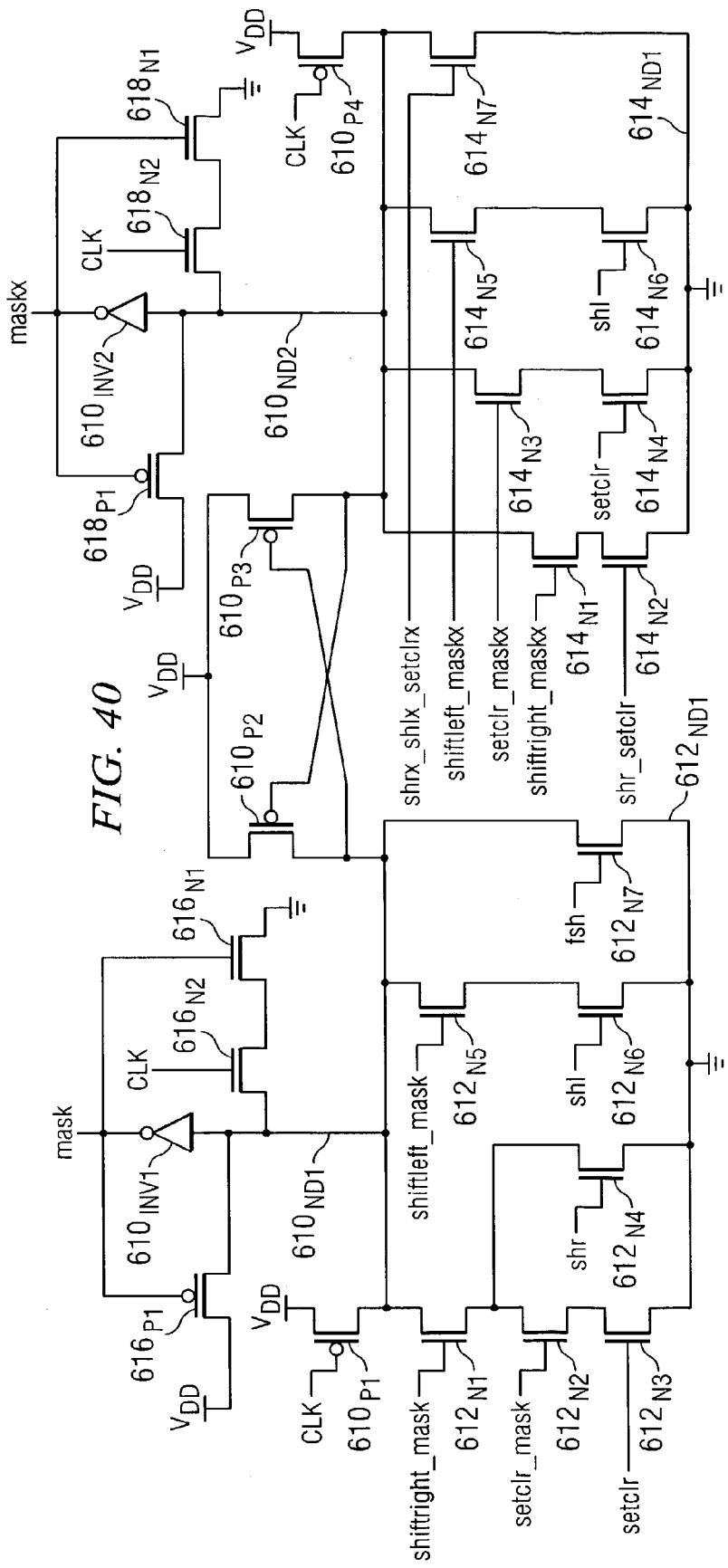
FIG. 40 illustrates a schematic of one bit of mask adjust block 590 of FIG. 37

FIG. 40 illustrates a schematic of one bit of mask adjust block 590 of FIG. 37 and designated as $590_{DL}$ because it implements dynamic logic, where the schematic is therefore repeated for a total of 32 bits to accommodate the 32-bit thermometer codes and to output the control bit code, CB[31:0], to multiplexer 502 for various instructions. In general, block $590_{DL}$ receives dual rail input signal of the various mask signals and it provides dual rail outputs, mask and maskx, where those signals provide dual rail signals for the control bit code, CB[31:0]. Looking first to the devices and connections of block $590_{DL}$, and beginning toward the bottom left of the Figure, a node $610_{ND1}$ is connected to the drain of a p-channel transistor $610_{P1}$, and node $610_{ND1}$ is also connected to the drain of a p-channel transistor $610_{P2}$, the gate of a p-channel transistor $610_{P3}$, and an input of an inverter $610_{INV1}$. The sources of p-channel transistors $610_{P1}$, $610_{P2}$ and $610_{P3}$ are all connected to $V_{DD}$, and the gate of p-channel transistor $610_{P1}$ is connected to receive the clock signal, CLK. The gate of p-channel transistor $610_{P2}$ is connected to a node $610_{ND2}$, and node $610_{ND2}$ is also connected to the drain of p-channel transistor $610_{P3}$, the drain of a p-channel transistor $610_{P4}$, and to the input of an inverter $610_{INV2}$. The source of p-channel transistor $610_{P4}$ is connected to $V_{DD}$ and its gate is connected to receive CLK.

Returning to node $610_{ND1}$, it is connected to various conditional discharge paths as follows. Between node $610_{ND1}$ and a node $612_{ND1}$ are connected, in series, the source/drain paths of three n-channel transistors $612_{N1}$, $612_{N2}$, and $612_{N3}$, having their respective gates connected to receive the shift_righ_mask, setclr_mask, and setclr signals, the last of which is asserted during the evaluate phase of block $590_{DL}$ when the SET or CLEAR instruction is executed. Between node $612_{ND1}$ and the source of n-channel transistor $612_{N1}$ is connected the source/drain path of an n-channel transistor $612_{N4}$, having it source connected to an shr signal, which is asserted during the evaluate phase of block $590_{DL}$ when the SHIFT RIGHT instruction is executed. Also between nodes $610_{ND1}$ and $612_{ND1}$ are connected, in series, the source/drain paths of two n-channel transistors $612_{N5}$ and $612_{N6}$, having their respective gates connected to receive the shiftleft_mask and shl signals, the last of which is asserted during the evaluate phase of block $590_{DL}$ when the SHIFT LEFT instruction is executed. Still further, between nodes $610_{ND1}$ and $612_{ND1}$ is connected the source/drain path of an n-channel transistor $612_{N7}$, having its gate connected to receive the fsh signal, which is asserted during the evaluate phase of block $590_{DL}$ when the FUNNEL SHIFT instruction is executed.

Returning to node $610_{ND2}$, it is connected to various conditional discharge paths as follows. Between node $610_{ND2}$ and a node $614_{ND1}$ are connected, in series, the source/drain paths of two n-channel transistors $614_{N1}$ and $614_{N2}$, having their respective gates connected to receive the shiftright_maskx and shr_setclr signals, the last of which is asserted during the evaluate phase of block $590_{DL}$ when any of the SHIFT RIGHT, SET, or CLEAR instructions is executed. Also between nodes $610_{ND2}$ and $614_{ND1}$ are connected the source/drain paths of two n-channel transistors $614_{N3}$ and $614_{N4}$, having their respective gates connected to receive the setclr_maskx and setclr signals, the last of which is asserted during the evaluate phase of block $590_{DL}$ when either the SET or CLEAR instructions is executed. Also between nodes $610_{ND2}$ and $614_{ND1}$ are connected the source/drain paths of two n-channel transistors $614_{N5}$ and $614_{N6}$, having their respective gates connected to receive the shiftleft_maskx and shl signals, the latter of which is asserted during the evaluate phase of block $590_{DL}$ when the SHIFT LEFT instruction is executed. Lastly and once more between nodes $610_{ND2}$ and $614_{ND1}$ is connected the source/drain path of an n-channel transistor $614_{N7}$, having its gate connected to receive the shrx_shlx_setclrx signal, which is asserted low when any one of the SHIFT RIGHT, SHIFT LEFT, SET, or CLEAR instructions is executed.

Finally, each inverter $610_{INV1}$ and $610_{INV2}$ has three transistors connected in association with the respective inverter. With respect to inverter $610_{INV1}$, its output is connected to the gate of a p-channel transistor $616_{P1}$, which has its source connected to $V_{DD}$ and its drain connected to the input of inverter $610_{INV1}$. The output of inverter $610_{INV1}$ is also connected to the gate of an n-channel transistor $616_{N1}$, which has its source connected to ground and its drain connected to the source of an n-channel transistor $616_{N2}$. The gate of n-channel transistor $616_{N2}$ is connected to receive CLK, and the drain of n-channel transistor $616_{N2}$ is connected to the input of inverter $610_{INV1}$. With respect to inverter $610_{INV2}$, its output is connected to the gate of a p-channel transistor $618_{P1}$, which has its source connected to $V_{DD}$ and its drain connected to the input of inverter $610_{INV2}$. The output of inverter $610_{INV2}$ is also connected to the gate of an n-channel transistor $618_{N1}$, which has its source connected to ground and its drain connected to the source of an n-channel transistor $618_{N2}$. The gate of n-channel transistor $618_{N2}$ is connected to receive CLK, and the drain of n-channel transistor $618_{N2}$ is connected to the input of inverter $610_{INV2}$.

The operation of block $590_{DL}$ is comparable in a logic sense to that described of the static logic implementation of block 590 and discussed above with respect to FIG. 37. Thus, one skilled in the art is referred to that earlier discussion, with the additional appreciation of the dynamic nature of block $590_{DL}$. In addition, the shiftleft_mask input signal is derived from the shiftright_mask input by swapping (i.e., inverting) the dual rail signals and downshifting by one bit. The positive rail of the dynamic logic of block $590_{DL}$ (i.e., to the bottom left of FIG. 40) has the same transfer function as the static logic of FIG. 37, while the negative rail has a simplified OR function of the input masks.

Figure 41:
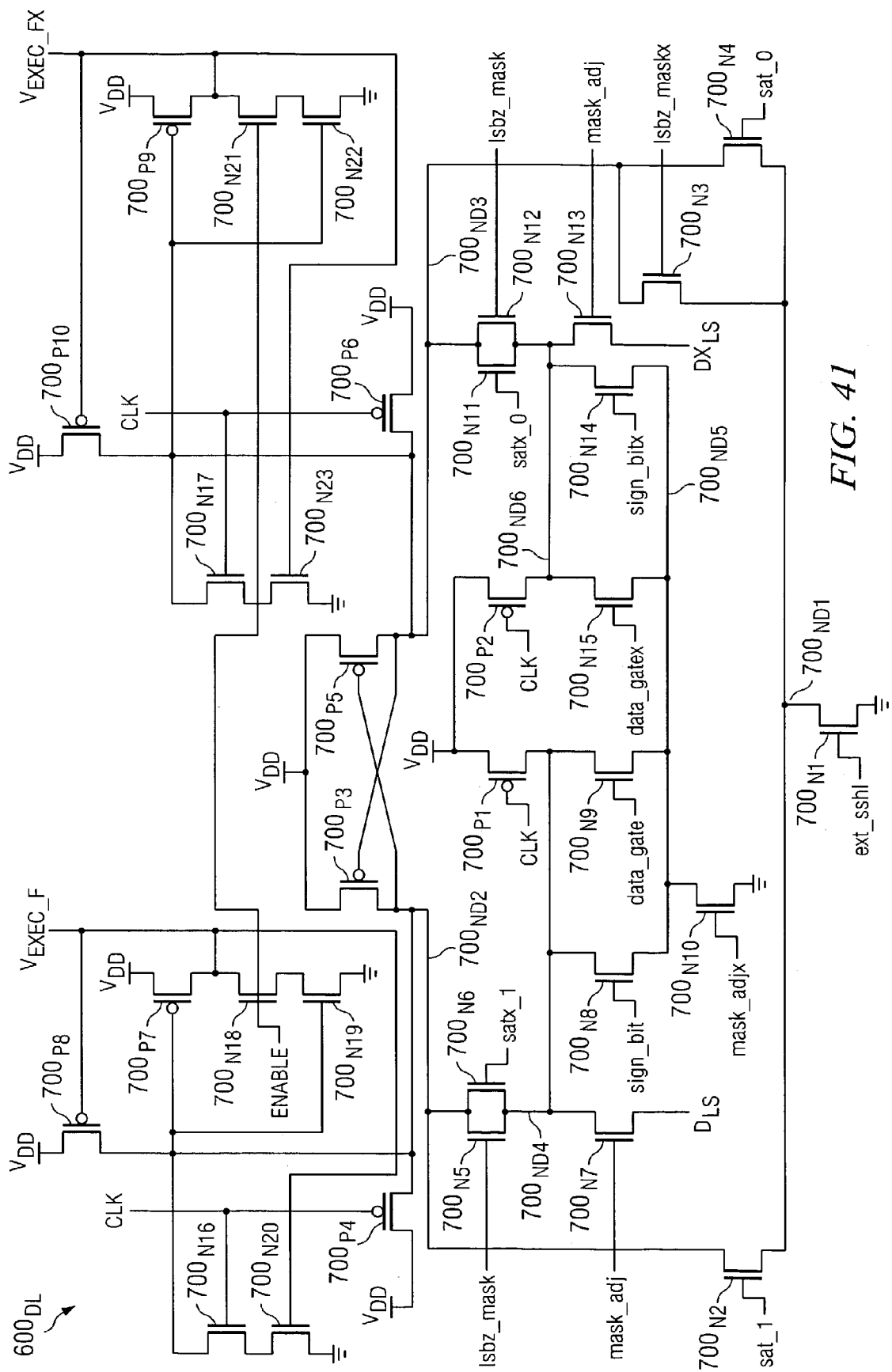
FIG. 41 illustrates a dynamic logic circuit system $600_{DL}$ for implementing various of the signal selectivity provided by multiplexer 502, saturation constant switch 582, and AND gate 504 of FIG. 37 and to thereby output one bit for the output dual rail signals $V_{EXEC\_F}$ and $V_{EXEC\_FX}$.

FIG. 41 illustrates a dynamic logic circuit system $600_{DL}$ for implementing various of the signal selectivity provided by multiplexer 502, saturation constant switch 582, and AND gate 504 of FIG. 37 and to thereby output one bit for the output dual rail signals $V_{EXEC\_F}$ and $V_{EXEC\_FX}$; thus, system $600_{DL}$ in the preferred embodiment is duplicated for a total of 32 like-design circuits. Looking to the devices and connections in FIG. 41 and starting toward its bottom, a node $700_{ND1}$ is connected to the drain of an n-channel transistor $700_{N1}$, which has its source connected to ground and its gate connected to receive a signal ext_sshl, which is asserted for execution of the SATURATING SHIFT LEFT instruction. Node $700_{ND1}$ is also connected to the source of an n-channel transistor $700_{N2}$, the source of an n-channel transistor $700_{N3}$, and the source of an n-channel transistor $700_{N4}$. The gate of n-channel transistor $700_{N2}$ is connected to receive a signal sat_1, which is asserted during saturation if a one output is desired, and the drain of n-channel transistor $700_{N2}$ is connected to a node $700_{ND2}$. The drains of n-channel transistors $700_{N3}$ and $700_{N4}$ are connected to a node $700_{ND3}$, and their respective gates are connected to receive signals lsbz_maskx and sat_0, where lsbz_maskx is only valid during an EXTRACT instruction and for other instructions is not enabling and where sat_0 is disabling for the EXTRACT instruction and is asserted during saturation, for the SATURATING SHIFT LEFT instruction, if a zero output is desired. Returning to node $700_{ND2}$, between it and a node $700_{ND4}$ are connected, in parallel, the source/drain paths of two n-channel transistors $700_{N5}$ and $700_{N6}$, with their gates connected, respectively, to signals lsbz_mask and satx_1. Node $700_{ND4}$ is also connected to the source/drain path of three n-channel transistors, $700_{N7}$, $700_{N8}$, and $700_{N9}$, having their respective gates connected to receive the signals mask_adj, sign_bit, and data_gate. The source of n-channel transistor $700_{N7}$ is connected to receive a bit of the active low data $D_{LS}$ (i.e., data from data rotate unit 200), while the sources of n-channel transistors $700_{N8}$ and $700_{N9}$ are connected to a node $700_{ND5}$. Between node $700_{ND5}$ and ground is connected the source/drain path of an n-channel transistor $700_{N10}$, which has its gate connected to receive a signal mask_adjx. Returning to node $700_{ND3}$, connected between it and a node $700_{ND6}$, in parallel, are two n-channel transistors $700_{N11}$ and $700_{N12}$, having their respective gates connected to receive the signals satx_0 and lsbz_mask. Node $700_{ND6}$ is also connected to the drain of three n-channel transistors $700_{N13}$, $700_{N14}$, and $700_{N15}$. N-channel transistor $700_{N13}$ has its gate connected to receive mask_adj and it source connected to receive an inverse of a bit from data rotate unit 200, indicated in FIG. 41 as $DX_{LS}$, while n-channel transistors $700_{N14}$ and $700_{N15}$ have their respective gates connected to receive signals sign_bitx and data_gatex, both of which represent negative rail signals corresponding to the output of sign bit select block 506 and data gate block 530. The sources of n-channel transistors $700_{N14}$ and $700_{N15}$ are connected to node $700_{ND5}$. Completing the bottom of FIG. 41, two p-channel transistors $700_{P1}$ and $700_{P2}$ have their sources connected to $V_{DD}$, their gates connected to receive a clock signal, CLK, and their drains connected respectively to nodes $700_{ND5}$ and $700_{ND6}$.

Looking toward the top left of FIG. 41 and retuning to node $700_{ND2}$, it is connected to the drains of two p-channel transistors $700_{P3}$ and $700_{P4}$, both having their sources connected to $V_{DD}$, and where the gate of p-channel transistor $700_{P4}$ is connected to the gate of an n-channel transistor $700_{N16}$ and to CLK, and the gate of p-channel transistor $700_{P3}$ is connected to node $700_{ND3}$. Node $700_{ND3}$ is comparably connected to the drains of two p-channel transistors $700_{P5}$ and $700_{P6}$, both having their sources connected to $V_{DD}$, and where the gate of p-channel transistor $700_{P6}$ is connected to the gate of an n-channel transistor $700_{N17}$ and to CLK, and the gate of p-channel transistor $700_{P5}$ is connected to node $700_{ND2}$. Continuing from node $700_{ND2}$, it is connected to the gate of a p-channel transistor $700_{P7}$, having its source connected to $V_{DD}$ and its drain connected to both the output $V_{EXEC\_F}$ and to the drain of an n-channel transistor $700_{N18}$, which has its gate connected to an enable signal and its source connected to the drain of an n-channel transistor $700_{N19}$, which has it gate connected to the gate of p-channel transistor $700_{P7}$ and its source is connected to ground. The output, $V_{EXEC\_F}$, is also connected to the gate of a p-channel transistor $700_{P8}$, having its source connected to $V_{DD}$ and its drain connected to node $700_{ND2}$, which is also connected to the drain of n-channel transistor $700_{N16}$. The source of n-channel transistor $700_{N16}$ is connected to the drain of an n-channel transistor $700_{N20}$, which has its source connected to ground and its gate connected to the output, $V_{EXEC\_F}$.

Looking toward the top right of FIG. 41 and retuning to node $700_{ND3}$, it is connected to the gate of a p-channel transistor $700_{P9}$, having its source connected to $V_{DD}$ and its drain connected to both the complement output $V_{EXEC\_FX}$ and to the drain of an n-channel transistor $700_{N21}$, which has its gate connected to the enable signal and its source connected to the drain of an n-channel transistor $700_{N22}$, which has it gate connected to the gate of p-channel transistor $700_{P9}$ and its source connected to ground. The complementary output, $V_{EXEC\_FX}$, is also connected to the gate of a p-channel transistor $700_{P10}$, having its source connected to $V_{DD}$ and its drain connected to node $700_{ND3}$, which is also connected to the drain of n-channel transistor $700_{N17}$. The source of n-channel transistor $700_{N17}$ is connected to the drain of an n-channel transistor $700_{N23}$, which has its source connected to ground and its gate connected to the complementary output, $V_{EXEC\_FX}$.

The operation of dynamic logic circuit system $600_{DL}$ should be appreciated by one skilled in the art given the comparable signals presented in it relative to the static approach set forth in FIG. 39 as well as the functional description set forth above. Briefly then summarizing various aspects, generally the positive rail is on the left side of FIG. 41 with the negative (i.e., complementary) rail on the right side of FIG. 41. Starting at n-channel transistor $700_{N7}$, it receives mask_adj at its gate, which recall is one bit of the control bit code, CB[31:0], output by mask adjust block 590. Thus, if mask_adj is asserted high, then n-channel transistor $700_{N7}$ is enabled and the rotated data bit, $D_{LS}$, is connected to node $700_{ND4}$. Further, for the EXTRACT instruction, satx_1 is zeroed and lsbz_mask is one bit of the output of block 510, thereby potentially enabling n-channel transistor $700_{N5}$ (while for all other instructions lsbz_mask is zeroed). Thus, in the cases when the one bit of lsbz_mask is high, the $D_{LS}$ data at node $700_{ND4}$ data passes to node $700_{ND2}$.

Further, assuming the enable signal is also asserted at this time (as is the case unless it is desired to place circuit $600_{DL}$ in a tri-state setting), then the rotated data bit, $D_{LS}$, at node $700_{ND5}$ is inverted by the combination of p-channel transistor $700_{P7}$ and n-channel transistor $700_{N19}$, and that inverted data is therefore provided as the output $V_{EXEC\_F}$. At this same time and relative to the complementary output, $V_{EXEC\_FX}$, it provides the complement of $DX_{LS}$, because n-channel transistor $700_{N13}$ is also enabled, as is n-channel transistor $700_{N12}$, thereby connecting $DX_{LS}$ to node $700_{ND3}$, and the data at that node is inverted by the combination of p-channel transistor $700_{P9}$ and n-channel transistor $700_{N22}$. Looking now to n-channel transistor $700_{N10}$, it receives at its gate mask_adjx, which is asserted high in the instance corresponding to an output of "0" for mask_adj, thereby enabling n-channel transistor $700_{N10}$. In response, either n-channel transistor $700_{N8}$ or n-channel transistor $700_{N9}$ may be enabled based on the state of its corresponding gate signal sign_bit and data_gate (where only one of those can be high at a time based on the instruction being executed), with a complementary operation occurring for n-channel transistors $700_{N14}$ and $700_{N15}$, respectively. Thus, one of nodes $700_{ND2}$ or $700_{ND3}$ is discharged through the enabled transistors, and that discharged state is inverted and output at one of $V_{EXEC\_F}$ or $V_{EXEC\_FX}$, with the complementary state being output at the other of those outputs. Looking also at the operation of circuit $600_{DL}$ for the SATURATING SHIFT LEFT instruction, if there is saturation and a 1 output is desired then sat_1 is asserted high while satx_0 is low, whereas if there is saturation and a 0 output is desired then sat_0 is asserted high while satx_1 is low. A high value of sat_1 enables n-channel transistor $700_{N2}$ thereby discharging node $700_{ND2}$ and providing $V_{EXEC\_F}$ high, whereas a high value of sat_0 enables n-channel transistor $700_{N4}$ thereby discharging node $700_{ND3}$ and providing $V_{EXEC\_FX}$ high (and, at the same time, $V_{EXEC\_F}$ is low).

From the above, it may be appreciated that the above embodiments provide for various improvements over the prior art. As one benefit, the preferred embodiments provide an electronic processor operable in response to an instruction to efficiently shift a data argument in response to respective left and right shift count indicators, without the need to separately shift the entire data argument fully in response to a first shift count followed by then separately shifting the entire data argument fully in response to a second shift count. As another benefit, the electronic processor may be further modified to accommodate any one or more of numerous data manipulation instructions. As another benefit, various implementation details for the preferred embodiments have been provided, including approaches using either static or dynamic logic. As still another benefit, while the present embodiments have been described in detail, various substitutions, modifications or alterations could be made to the descriptions set forth above without departing from the inventive scope. For example, while a 32-bit data argument has been shown, the inventive teachings may be applied to other sizes of data argument. As another example, while the ROTATE STAGEs have been shown in a particular order, that order is only to simplify an understanding of the operation with respect to the order of the bit positions in the shift arguments; however, since certain shifts are independent of others, some STAGEs may be placed in different orders. Thus, from these many benefits as well as the preceding details, one skilled in the art should further appreciate the inventive scope, as is defined by the following claims.

The invention claimed is:
1. An integrated circuit device, comprising:
   an input for receiving an initial data argument comprising a plurality of bits;
   circuitry for providing a first shift argument indicating a number of shift positions in a first direction, the first shift argument comprising a plurality of bits;
   circuitry for providing a second shift argument indicating a number of shift positions in a second direction, the second shift argument comprising a plurality of bits;
   a plurality of rotate stages, each comprising an input and an output;
   wherein one rotate stage, in the plurality of rotate stages, is coupled to receive the initial data argument;
   wherein each rotate stage, in the plurality of rotate stages, other than the one rotate stage, is coupled to receive a data argument from an output of another one of the rotate stages in the plurality of rotate stages;
   wherein a first rotate stage, in the plurality of rotate stages, is operable to rotate the data argument input into the corresponding rotate stage in response to a least significant bit in the first shift argument;
   wherein a second rotate stage, in the plurality of rotate stages, is operable to rotate the data argument input into the corresponding rotate stage in response to a least significant bit in the second shift argument;
   wherein a third rotate stage, in the plurality of rotate stages, is operable to rotate the data argument input into the third rotate stacie in response to a sum of respective second and third bit positions of the first and second shift arguments; and
   wherein a fourth rotate stage, in the plurality of rotate stages, is operable to rotate the data argument input into the fourth rotate stage in response to a sum of respective fourth and fifth bit positions of the first and second shift arguments.

2. The device of claim 1 wherein each of the first and second shift arguments consists of an odd number of bits.

3. The device of claim 1 wherein each of the first and second shift arguments comprises five bits.

4. The device of claim 1 and further comprising:
   circuitry for providing the sum of respective second and third bit positions of the first and second shift arguments; and
   circuitry for providing the sum of respective fourth and fifth bit positions of the first and second shift arguments.

5. The device of claim 4 wherein both the circuitry for providing the sum of respective second and third bit positions of the first and second shift arguments and the circuitry for providing the sum of respective fourth and fifth bit positions of the first and second shift arguments comprises static logic circuitry.

6. The device of claim 5:
   wherein the circuitry for providing the sum of respective second and third bit positions comprises circuitry for providing a first decoded sum in a form of a first multi-bit control output;
   wherein only one bit of the first multi-bit control output is asserted for a single decode operation and corresponding to a respective sum of the respective second and third bit positions; and
   wherein an assertion of each bit of the first multi-bit control output causes a different and respective number of bit position rotations of the data argument by the third rotate stage.

7. The device of claim 6:
wherein the circuitry for providing the sum of respective fourth and fifth bit positions comprises circuitry for providing a second decoded sum in a form of a second multi-bit control output;
wherein only one bit of the second multi-bit control output is asserted for a single decode operation and corresponding to a respective sum of the respective fourth and fifth bit positions; and
wherein an assertion of each bit of the second multi-bit control output causes a different and respective number of bit position rotations of the data argument by the fourth rotate stage.

8. The device of claim 4 wherein both the circuitry for providing the sum of respective second and third bit positions of the first and second shift arguments and the circuitry for providing the sum of respective fourth and fifth bit positions of the first and second shift arguments comprises dynamic logic circuitry.

9. The device of claim 8:
wherein the circuitry for providing the sum of respective second and third bit positions comprises circuitry for providing a first decoded sum in a form of a first multi-bit control output;
wherein only one bit of the first multi-bit control output is asserted for a single decode operation and corresponding to a respective sum of the respective second and third bit positions; and
wherein an assertion of each bit of the first multi-bit control output causes a different and respective number of bit position rotations of the data argument by the third rotate stage.

10. The device of claim 9:
wherein the circuitry for providing the sum of respective fourth and fifth bit positions comprises circuitry for providing a second decoded sum in a form of a second multi-bit control output;
wherein only one bit of the second multi-bit control output is asserted for a single decode operation and corresponding to a respective sum of the respective fourth and fifth bit positions; and
wherein an assertion of each bit of the second multi-bit control output causes a different and respective number of bit position rotations of the data argument by the fourth rotate stage.

11. The device of claim 10 wherein the circuitry for providing a first decoded sum in a form of a first multi-bit control output comprises:
a plurality of transistor levels:
wherein a bottom level, of the plurality of transistor levels, is connected to a reference voltage;
wherein each transistor level, of the plurality of transistor levels, is responsive to a different one of the second and third bit positions of the first and second shift arguments;
wherein a top level, of the plurality of transistor levels, provides a number of nodes equal to a number of bits in the first multi-bit control output; and
wherein during an evaluate phase only one of the number of nodes is coupled through each of the plurality of transistor levels to the reference voltage such that the only one coupled node represents assertion of only one bit of the first multi-bit control output.

12. The device of claim 10 wherein the circuitry for providing a second decoded sum in a form of a second multi-bit control output comprises:
a plurality of transistor levels:
wherein a bottom level, of the plurality of transistor levels, is connected to a reference voltage;
wherein each transistor level, of the plurality of transistor levels, is responsive to a different one of the fourth and fifth bit positions of the first and second shift arguments;
wherein a top level, of the plurality of transistor levels, provides a number of nodes equal to a number of bits in the second multi-bit control output; and
wherein during an evaluate phase only one of the number of nodes is coupled through each of the plurality of transistor levels to the reference voltage such that the only one coupled node represents assertion of only one bit of the first multi-bit control output.

13. The device of claim 1 wherein the fourth stage is further operable to rotate the data argument input into the fourth rotate stage in response to a carry resulting from the sum of respective second and third bit positions of the first and second shift arguments.

14. The device of claim 13 and further comprising circuitry for selectively providing the carry.

15. The device of claim 14 wherein the comprising circuitry for selectively providing the carry comprises static logic circuitry.

16. The device of claim 14 wherein the comprising circuitry for selectively providing the carry comprises dynamic logic circuitry.

17. The device of claim 13 wherein the initial data argument consists of 32 bits.

18. The device of claim 1:
wherein the first shift argument comprises a right shift argument; and
wherein the second shift argument comprises a complement of a left shift argument.

19. The device of claim 18 wherein the third rotate stage is further operable to rotate the data argument input into the third rotate stage a distance of one bit position right in addition to a distance equal to the sum of respective second and third bit positions of the first and second shift arguments.

20. The device of claim 1 wherein the device is part of a processor.

21. The device of claim 1 wherein the device is part of a digital signal processor.

22. A method of operating an integrated circuit device, comprising:
providing a first shift argument indicating a number of shift positions in a first direction, the first shift argument comprising a plurality of bits;
providing a second shift argument indicating a number of shift positions in a second direction, the second shift argument comprising a plurality of bits;
a plurality of rotate stages, each comprising an input and an output;
receiving an initial data argument in one rotate stage in a plurality of rotate stages, the initial data argument comprising a plurality of bits;
for each rotate stage, in the plurality of rotate stages, other than the one rotate stage, receiving a data argument from an output of another one of the rotate stages in the plurality of rotate stages;
operating a first rotate stage, in the plurality of rotate stages, to rotate the data argument input into the first rotate stage in response to a least significant bit in the first shift argument;

operating a second rotate stage, in the plurality of rotate stages, to rotate the data argument input into the second rotate stage in response to a least significant bit in the second shift argument;

in a third rotate stage, in the plurality of rotate stages, rotating the data argument input into the third rotate stage in response to a sum of respective second and third bit positions of the first and second shift arguments; and in a fourth rotate stage, in the plurality of rotate stages, rotating the data argument input into the fourth rotate stage in response to a sum of respective fourth and fifth bit positions of the first and second shift arguments.

23. The method of claim 22 wherein each of the first and second shift arguments consists of an odd number of bits.

24. The method of claim 22 wherein each of the first and second shift arguments comprises five bits.

25. The method of claim 22 and further comprising:
providing the sum of respective second and third bit positions of the first and second shift arguments; and
providing the sum of respective fourth and fifth bit positions of the first and second shift arguments.

26. The method of claim 25:
wherein the step of providing the sum of respective second and third bit positions comprises providing a first decoded sum in a form of a first multi-bit control output;
wherein only one bit of the first multi-bit control output is asserted for a single decode operation and corresponding to a respective sum of the respective second and third bit positions; and
wherein an assertion of each bit of the first multi-bit control output causes a different and respective number of bit position rotations of the data argument by the third rotate stage.

27. The method of claim 26:
wherein the step of providing the sum of respective fourth and fifth bit positions comprises circuitry for providing a second decoded sum in a form of a second multi-bit control output;
wherein only one bit of the second multi-bit control output is asserted for a single decode operation and corresponding to a respective sum of the respective fourth and fifth bit positions; and
wherein an assertion of each bit of the second multi-bit control output causes a different and respective number of bit position rotations of the data argument by the fourth rotate stage.

28. The method of claim 22 and further comprising, in the fourth stage, rotating the data argument input into the fourth rotate stage in response to a carry resulting from the sum of respective second and third bit positions of the first and second shift arguments.

29. The method of claim 28 wherein the initial data argument consists of 32 bits.

30. The method of claim 22:
wherein the first shift argument comprises a right shift argument; and
wherein the second shift argument comprises a complement of a left shift argument.

31. The method of claim 30 and further comprising, with the third rotate stage, rotating the data argument input into the third rotate stage a distance of one bit position right in addition to a distance equal to the sum of respective second and third bit positions of the first and second shift arguments.

* * * * *